United States Patent

Ohtsu et al.

[11] Patent Number: 5,908,562
[45] Date of Patent: Jun. 1, 1999

[54] METHOD FOR PRODUCING OPTICAL FIBER HAVING CORE WITH SHARPENED TIP PROTRUDING FROM LIGHT-SHIELDING COATING

[75] Inventors: Motoichi Ohtsu, Tokyo; Shuji Mononobe; Takuya Matsumoto, both of Kanagawa; Toshiharu Saiki, Tokyo, all of Japan

[73] Assignee: Kanagawa Academy of Science and Technology, Kanagawa, Japan

[21] Appl. No.: 09/076,880

[22] Filed: May 12, 1998

Related U.S. Application Data

[62] Division of application No. 08/737,605, Feb. 25, 1997, Pat. No. 5,812,724.

[30] Foreign Application Priority Data

| May 31, 1994 | [JP] | Japan | 6-117766 |
| Sep. 17, 1994 | [JP] | Japan | 6-248863 |
| Sep. 17, 1994 | [JP] | Japan | 6-248864 |
| Nov. 22, 1994 | [JP] | Japan | 6-287780 |

[51] Int. Cl.$^6$ ............................ C03C 15/00; C03C 25/00
[52] U.S. Cl. ................................ 216/11; 216/24; 216/49; 385/128; 385/43
[58] Field of Search ........................ 216/11, 24, 49, 216/97, 52, 46; 385/128, 43, 123, 117; 65/429

[56] References Cited

U.S. PATENT DOCUMENTS

| 5,480,049 | 1/1996 | Marchman | 216/24 |
| 5,531,343 | 7/1996 | Filas et al. | 216/11 |
| 5,662,817 | 9/1997 | Honmou | 216/24 |
| 5,676,852 | 10/1997 | Filas et al. | 216/11 |
| 5,709,803 | 1/1998 | Filas et al. | 216/11 |

*Primary Examiner*—Phan T.H. Palmer
*Attorney, Agent, or Firm*—Jay H. Maioli

[57] ABSTRACT

An optical fiber made up of a core for propagating the light and a cladding covering the core for interrupting light propagated within the core. The optical fiber includes a tip formed by sharpening an end of the core in a tapering fashion, a light-shielding coating layer formed on the surface of the tip and an aperture formed by exposing the foremost part of the tip from the light-shielding coating layer to outside. The light-shielding coating layer operates as a light shielding portion for interrupting the light radiated on other than the aperture and light enters or exits only at the aperture and light is propagated in the core as it is repeatedly reflected at a core-cladding boundary and is collected at the tip so as to be radiated via the aperture. The light entering the tip via the aperture is conducted into the core via the tip.

38 Claims, 75 Drawing Sheets

METHOD FOR PRODUCING OPTICAL FIBER HAVING CORE WITH SHARPENED TIP PROTRUDING FROM LIGHT-SHIELDING COATING

This is a division of prior application Ser. No. 08/737,605 filed Feb. 25, 1997 now U.S. Pat. No. 5,812,724.

TECHNICAL FIELD

This invention relates to an optical fiber made up of a core for propagating the light and a cladding covering the core for shielding the light propagated within the core, and a method for producing the same. The optical fiber has a sharpened end for light entrance and exit.

BACKGROUND ART

A photon scanning microscope, detecting evanescent light localized in an area smaller than the wavelength of light on a surface of a material for measuring the shape of the material, is known as an ultra-high resolution optical microscope having the resolution exceeding the diffraction limit of a conventional optical microscope.

If the sample surface is irradiated from the back surface of a sample 1 under a condition of total reflection, the field of evanescent light is generated depending upon the shape of the sample surface.

With the photon scanning microscope, the strength of the evanescent light is detected by a light probe 3 having a detection end 2 having an aperture of a size on the order of the wavelength of the evanescent light, as shown for example in FIG. 2, for producing the resolution exceeding the diffraction limit of the conventional optical microscope.

The resolution of the photon scanning type microscope is determined by the effective aperture diameter of the light probe, on the other hand, since the strength of the evanescent light is decreased exponentially with the distance from the sample surface, the aperture diameter of the light probe can be equivalently reduced simply by sharpening the end of the light probe.

The light probe shaped as shown in FIG. 1 has a cladding diameter D (approximately 60 μm) much larger than the length L of the detecting end 2 (approximately 2 to 6 μm). Thus there was a risk that an edge portion 4 of the cladding be struck against the surface of a sample 1 thus destructing the sample or the optical probe 5 itself.

The inventors hereof have proposed an optical fiber for overcoming these problems and filed JP Patent Application Nos. 5-291829, 6-53626 and 6-55697 and PCT/JP 94/00906. In these applications, a core protruded from a cladding on one end of an optical fiber is sharpened to form a tapered detection end, on the proximal end of which is formed a small-diameter portion formed by reducing the diameter of the cladding, or both the detection end and the cladding are tapered at the distal ends, for preventing the edge portions of the cladding from impinging against the sample surface.

Moreover, with the above-described photon scanning tunneling microscope, since the evanescent light is extremely small in strength, it is necessary to avoid the effect of the scattered light to raise the detection efficiency of the evanescent light. For example, it may be envisaged to form a light-shielding coating layer on the surface of the detection end of the light probe and to form an aperture on the order of the wavelength of the detection light on the distal end of the evanescent light to be detected at the distal end of the light probe. The evanescent light to be detected is caused to be incident only at the aperture for shielding the light irradiated on an area other than the aperture for diminishing the effect of the scattered light.

To this end, with the optical fiber according to the above-mentioned JP patent applications, the optical fiber is rotated in a vacuum about its own axis and the vapor of a light-shielding material is supplied from the lateral or rear side of the detection end for forming a coating layer of the light-shielding material on the surface of the detection end and for exposing the distal end of the detection end via the coating layer of the light-shielding material for forming an aperture.

However, there are involved difficulties in uniformly forming the light-shielding coating layer and informing a small-sized aperture on the order of the light wavelength or with good reproducibility.

Meanwhile, there is known an optical fiber sensor on the distal end of which is deposited a functional material which is changed in optical characteristics depending on the surrounding environment, such as fluorescent substance or reagent. Such an optical fiber sensor is shown for example in FIG. 3 in which a light-shielding coating layer 7 is formed on the surface of a tip formed by sharpening a core, the light-shielding coating layer 7 is formed on the surface of the tip 6 and a functional substance 8, such as the fluorescent substance or the reagent, is affixed on an aperture formed by exposing the distal end of the tip 6 from the light-shielding coating layer 7 (eds. W. Pohl and D. Courjon, Near Field Optics (Book) 1993, pages 17 to 24).

In such optical fiber sensor 5, the functional substance 8 at the distal end of the tip 6 is changed in optical characteristics, such as light emission spectrum or in light absorption spectrum, depending on environmental conditions, such as intensity of the ambient light or pH values. These changes in the optical characteristics are detected at the opposite end of the tip 6 for detecting the surrounding environment of the tip 6. It is possible with the optical fiber sensor 5 to reduce the size of the functional substance 8 deposited on the distal end of the tip 6 for improving the spatial resolution for detection and expediting the response as compared to the conventional electrical sensor.

With such optical fiber sensor, there are involved difficulties in depositing the functional substance on the distal end of the optical fiber with a high exfoliation strength for improving durability.

DISCLOSURE OF THE INVENTION

For solving the above problems, it is an object of the present invention to provide an optical fiber in which there is no risk of the edge portion of the cladding impinging on the sample surface and which has a high detection efficiency.

It is another object of the present invention to provide a method for producing an optical fiber in which there is no risk of the edge portion of the cladding impinging on the sample surface and which has a high detection efficiency.

It is yet another object of the present invention to provide an optical fiber improved in spatial resolution of detection and having high durability.

The present invention, proposed for solving the above problems, resides in an optical fiber having a core for propagating the light and a cladding covering the core for shielding light propagated within the core. The optical fiber includes a tip formed by conically sharpening an end of the core protruded from the cladding at one end of the optical fiber, a light-shielding coating layer formed on the surface of the tip, and an aperture formed by exposing the foremost part of the tip from the light-shielding coating layer to outside.

With such optical fiber, the tip operates as a light collecting portion for collecting the light propagated in the core, while the light-shielding coating layer operates as a light shielding portion for interrupting the light at other than the aperture so that light enters and exits at the aperture.

The present invention also provides an optical fiber having a core for propagating the light and a cladding for shielding the core for interrupting light propagated within the core. A reduced-diameter portion of the cladding is formed at an end of the optical fiber. The core protruded from the foremost part of the reduced-diameter portion is tapered to form a tip on the surface of which a light-shielding coating layer is formed. The foremost part of the tip has an aperture exposed at the light-shielding coating layer which is not larger than the wavelength of the detection light.

With such optical fiber, the protrusion operates as a light collecting portion for collecting the light propagated in the core, while the light-shielding coating layer operates as a light shielding portion for interrupting the light at an area other than the aperture so that light propagated within the core can be collected and radiated efficiently via such aperture.

With such optical fiber, the light shielding coating layer operates as a light shielding portion for interrupting the light radiated to an area other than the aperture, while the tip operates as a coupling portion for conducting the light incident via the aperture to the inside of the core. The optical fiber is used as a light probe in a photon scanning tunneling microscope detecting the evanescent light localized in an area smaller than the wavelength of the light on the surface of a sample of a material under inspection in proximity to the sample surface for scattering and detecting the evanescent light.

When in the present optical fiber, the foremost part of the tip exposed from the light-shielding coating layer is in proximity to the sample surface, the evanescent light on the sample surface is scattered and guided to the core. The detection light radiated to an area other than the aperture of the optical fiber is interrupted by the light-shielding coating layer. The optical fiber has a small cone angle and can detect the detection light only via such aperture so that it operates as a light probe having high detection efficiency.

The present invention also provides an optical fiber having a core for propagating the light and a cladding for shielding the core for the purpose of interrupting light propagated within the core. The optical fiber includes a tip formed by sharpening the core at an end of the optical fiber, a light-shielding coating layer formed on the surface of the tip, and a pit formed by exposing the foremost part of the tip from the light-shielding coating layer and by recessing the foremost part of the tip relative to the light-shielding coating layer.

With the present optical fiber, the functional material in the pit has its optical properties changed in response to the surrounding environment. These changes in the optical properties can be detected at the opposite end of the optical fiber, thus assuring detection with improved spatial resolution in measurement. The functional substance is charged into the pit recessed from the foremost part of the light-shielding coating layer, so that, if the foremost part of the optical fiber impinges on the article being measured, the dye can be protected against direct collision against the article, thus assuring improved durability.

For producing the above-described optical fiber according to the present invention, the foremost part of the core is sharpened for forming a tip, and a light-shielding coating layer is formed on the tip surface and etched for exposing the foremost part of the tip from the light-shielding coating layer for forming an aperture.

With the method for producing the optical fiber, the aperture can be formed easily by exposing the foremost part of the tip completely from the light-shielding coating layer for easily forming an optical fiber having a high detection efficiency.

The present invention also provides a method for producing an optical fiber wherein the core is formed of quartz doped with germanium dioxide to a high concentration, the cladding formed of quartz covers the core and shields the light propagated within the core. The sharpening step is made up of a first etching step, a second etching step, a first coating step, a second coating step and an aperture forming step. The first etching step is a step of etching one end of the optical fiber using an etching solution composed of an aqueous solution of ammonium fluoride, hydrogen fluoride and water for forming a reduced-diameter portion which is a tapered portion of the quartz cladding, while the second etching step is a step of etching the reduced-diameter portion using an etching solution composed of an aqueous solution of ammonium fluoride, hydrogen fluoride and water for forming a protrusion which is the tapered foremost part of the protrusion. The first coating step is a step of forming a light-shielding coating layer on the surface of the protrusion, the second coating step is a step of forming a light-shielding coating layer on the surface of other than the foremost part of the light-shielding coating layer, and the aperture forming step is a step of etching the light-shielding coating layer of the protrusion for the purpose of exposing the distal end of the protrusion from the light-shielding coating layer for forming an aperture.

With such method for producing the optical fiber, the aperture can be formed easily by exposing the foremost part of the tip completely from the light-shielding coating layer for easily forming an optical fiber having a high detection efficiency.

Other objects, effects and other specified structure of the present invention will become apparent from the following description of the preferred embodiments of the invention.

BEST MODE FOR CARRYING OUT THE INVENTION

An optical fiber according to the present invention, having a center core and a clad sheathing the core, is configured as an elongated linear member. The optical fiber has, on its end, a sharpened portion formed by sharpening the tip end of a core. A light-shielding coating layer is formed on the surface of the sharpened portion and an aperture is formed at the tip end of the sharpened core by being exposed from the light-shielding coating layer. With the optical fiber, the light-shielding coating layer operates as a light interrupting portion for interrupting the light radiated on other than the aperture in order to permit the light entrance and light exit only via the aperture.

The light propagated in the core is propagated within the core by being repeatedly reflected at a boundary between the core and the cladding and is condensed at the sharpened core so as to be radiated at the aperture to outside. The light entering the sharpened end via the aperture is conducted into the inside of the core via the sharpened end so as to be propagated within the core. The propagated light is detected at the opposite end of the optical fiber.

Figure 1:
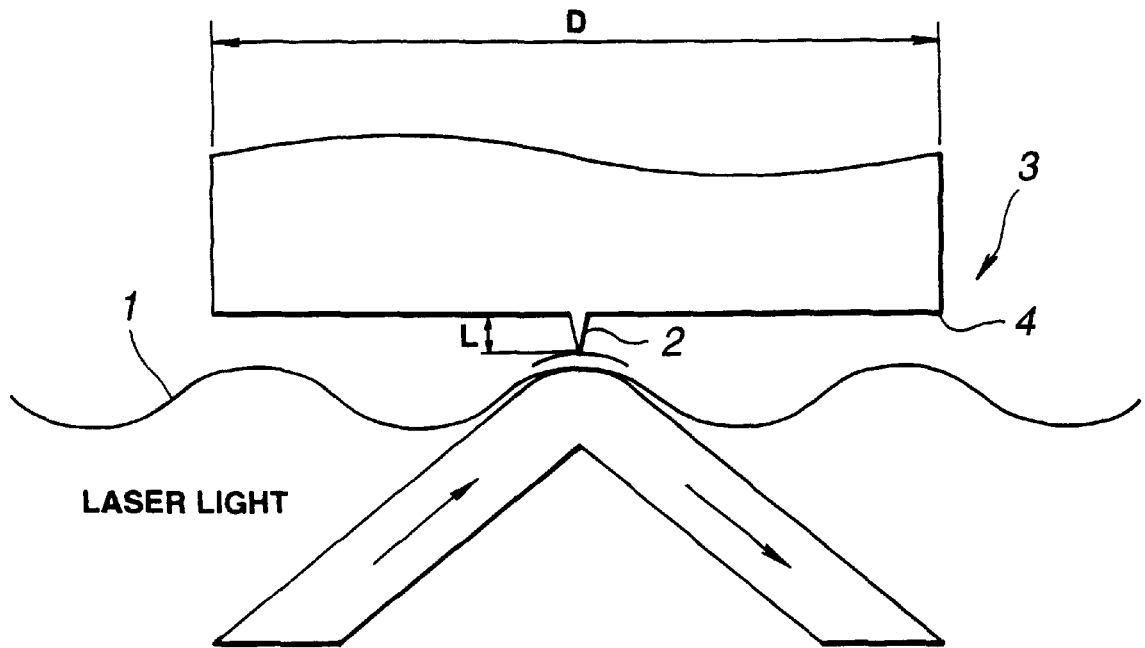
FIG. 1 schematically illustrates the principle of a photon scanning tunneling type microscope.
Figure 2:
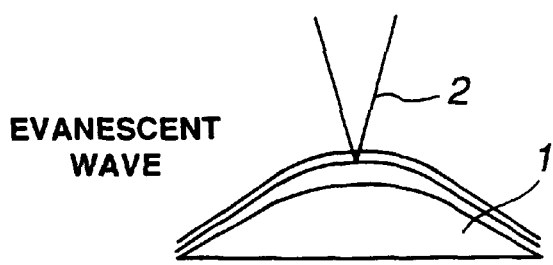
FIG. 2 illustrates the operation of detection of an evanescent wave by the photon scanning tunneling type microscope shown in FIG. 1.
Figure 3:
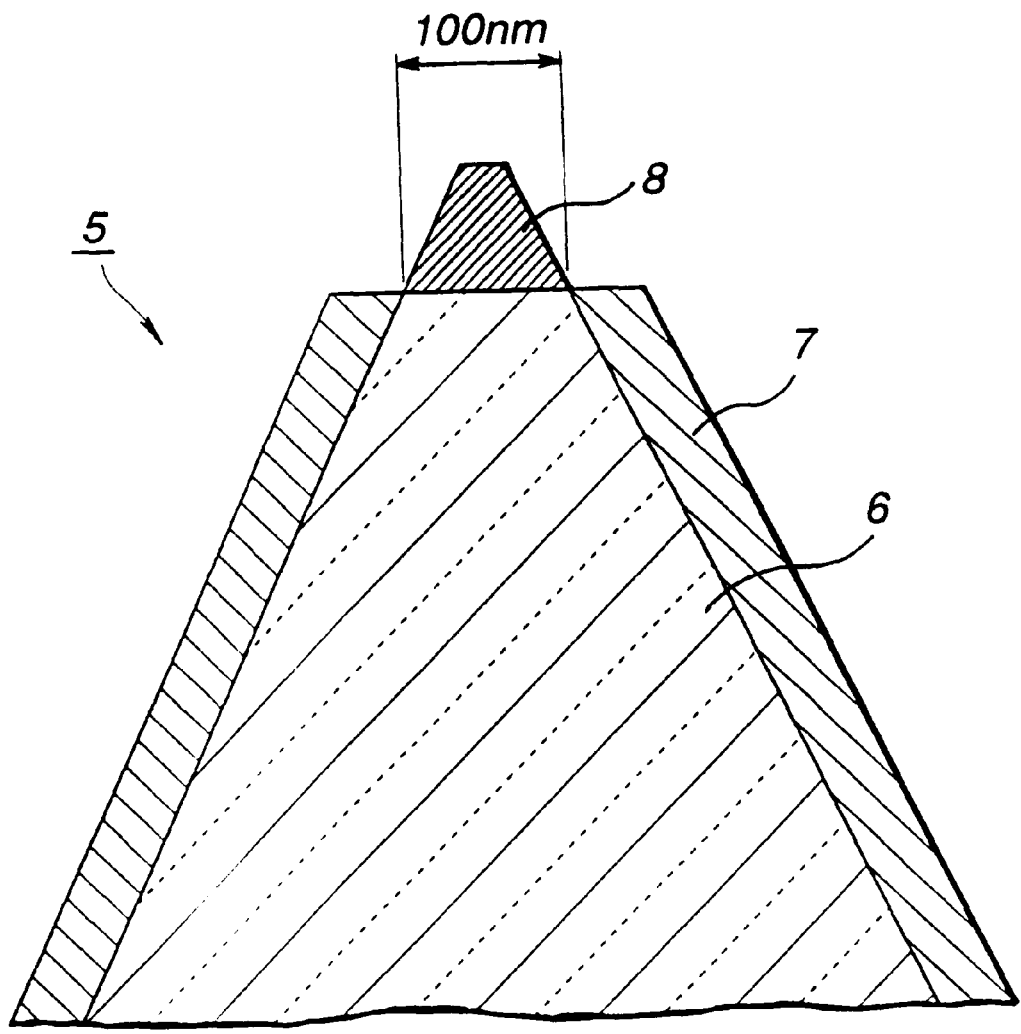
FIG. 3 illustrates the structure of an end of a conventional optical fiber.
Figure 4:
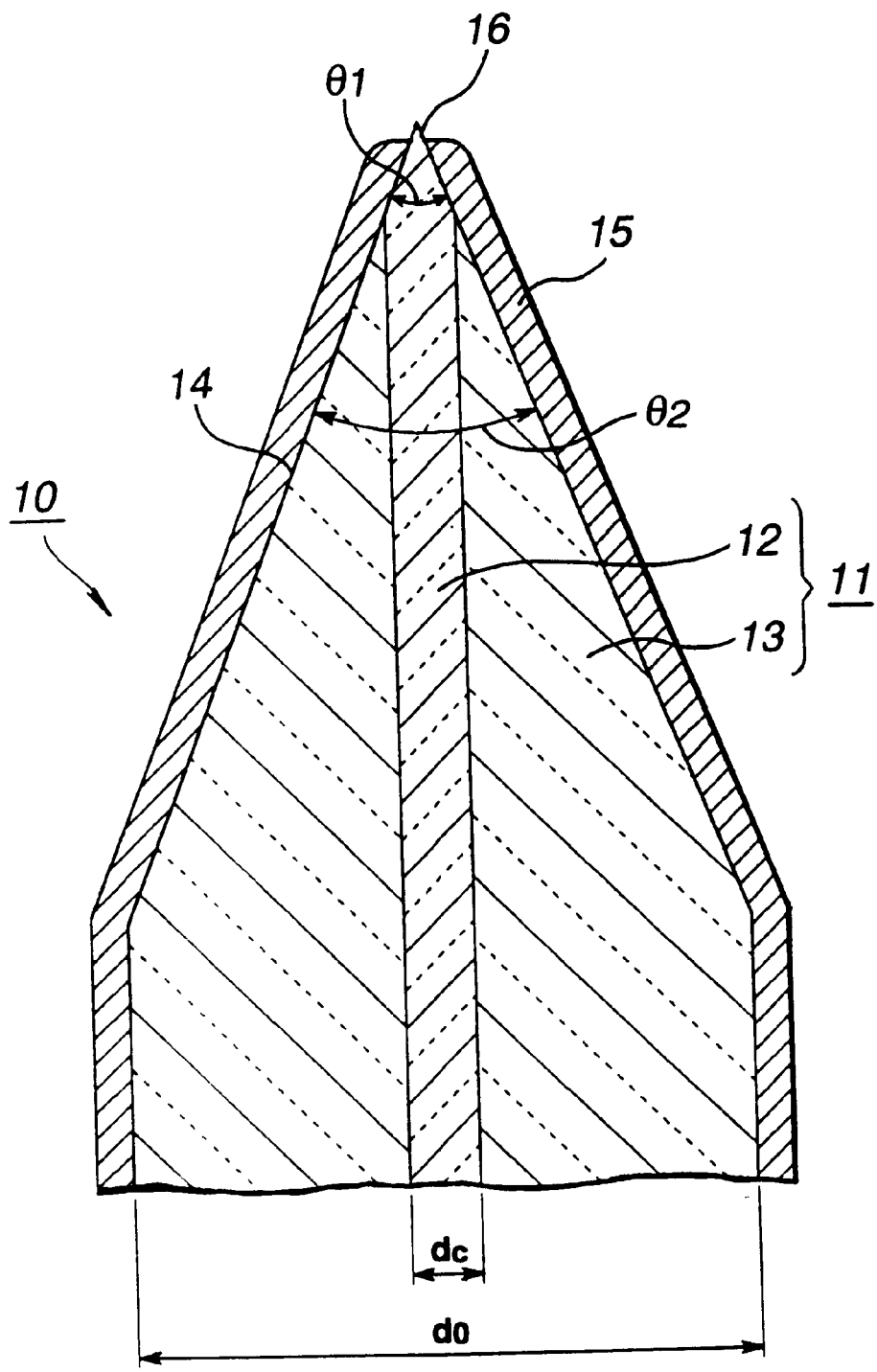
FIG. 4 illustrates the structure of an optical fiber according to a first embodiment of the present invention.

An optical fiber according to a first embodiment of the present invention has a optical fiber 11 having a diameter of $d_c$ of a core 12 and a diameter $d_o$ of a cladding 13, with a sharpened end 14 at an end of the optical fiber 11 which is conically sharpened from the outer periphery of the cladding 13 to the center of the core 12, as shown in FIG. 4. This optical fiber 10 has a light-shielding coating layer 15 on the surface of the sharpened tip 14 and an aperture 16 exposed from the light-shielding coating layer 15 at the foremost part of the sharpened tip 14.

Figure 5:
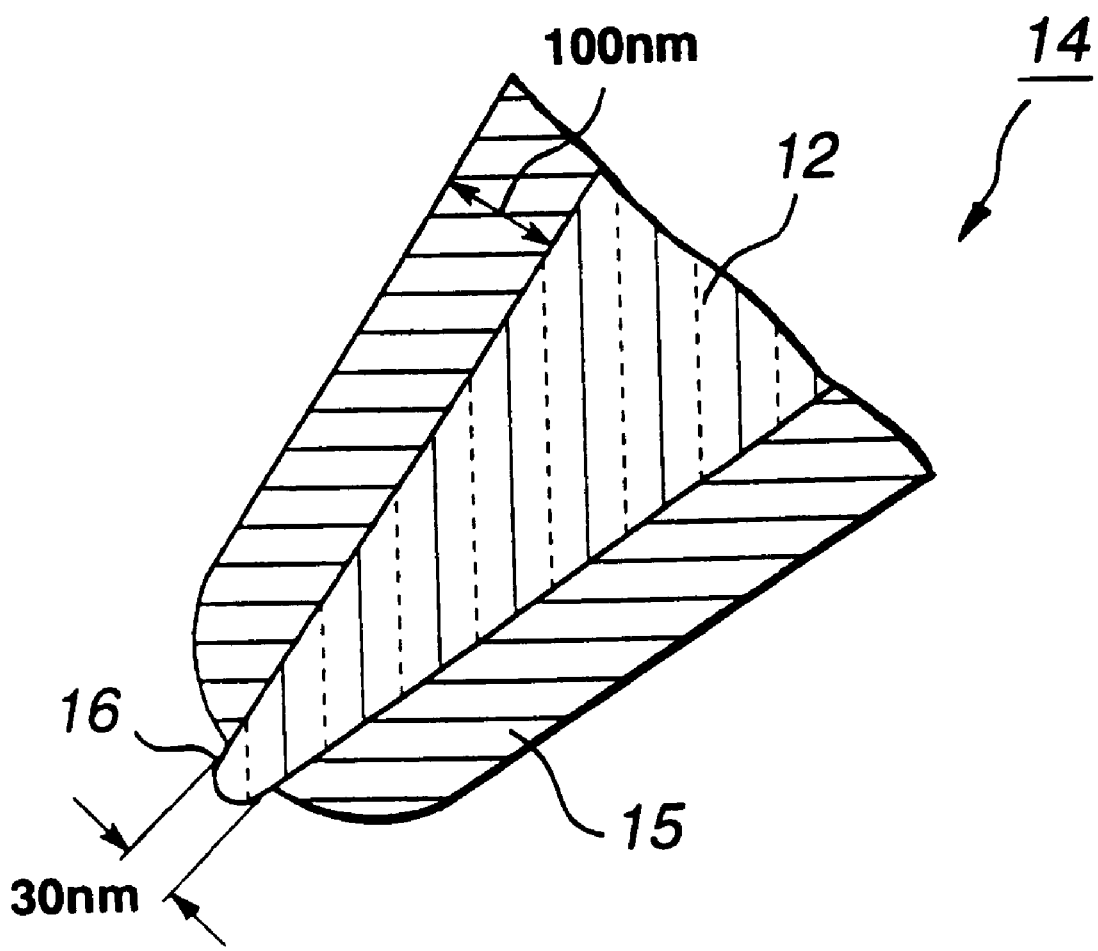
FIG. 5 illustrates a specified structure of a distal portion of an optical fiber according to the first embodiment.

Specifically, the core has the diameter $d_c$ of the core 12 equal to 3.4 μm and the diameter $d_o$ of the cladding 13 equal to 125 μm. The core 12 are formed of quartz $SiO_2$ doped with germanium dioxide $SiO_2$ while the cladding 13 is formed of quartz $SiO_2$. The sharpened tip 14 has an tip angle $\theta_1$ equal to, for example, 20 to 25°. The light-shielding coating layer 15 is formed of a substance having excellent light-shielding properties, such as gold, silver or aluminum, and is of a thickness on the order of 100 nm, as shown in FIG. 5 showing the tip end of the sharpened tip 14 to an enlarged scale. The aperture 16 has a diameter of 30 nm which is smaller than the wavelength of the detection light. The distal end of the sharpened tip 14 has a radius of curvature of not more than 5 nm, that is, the diameter of the distal and of the sharpened core 14 is not more than 10 nm.

The optical fiber 10 having the above-described structure is used as a light probe for detecting the evanescent light in a photon scanning tunneling microscope designed for detecting the evanescent light for measuring the shape of an object. The photon scanning tunneling microscope scans the surface of the object with the sharpened tip 14 being kept in proximity to the object surface. The evanescent light present in the vicinity of the object surface is scattered by the foremost part of the sharpened end 14 so as to be conducted via the tip 14 into the inside of the core 12.

Since the intensity of the evanescent light is attenuated in proportion to the distance from the object surface, the intensity of the evanescent light scattered by the foremost part of the tip 14 is changed in proportion to the distance between the object surface and the foremost part of the tip 14. Thus, by measuring the intensity distribution of the detection light of the evanescent light in the above-described scanning, the shape of the object surface can be measured.

With the above-described optical fiber 10, since the coating layer 15 operates as a light interrupting portion, the light radiated to an area other than the aperture 16 can be prevented from entering the core 12. Thus it becomes possible to take out the detection light having a wavelength close to the size of the aperture 16 selectively at the aperture 16 at the foremost part of the tip 14. Thus it becomes possible to suppress the effect of the scattered light, to raise the detection efficiency, and to permit the evanescent light of extremely low intensity to be detected reliably.

Since the optical fiber 10 has the tip 14 sharpened conically from the outer periphery of the cladding 13 towards the center of the core 12, there is no likelihood of the peripheral end portion of the cladding 13 to be collided against the sample surface to prevent damage to the sample surface or to the optical fiber 10.

Similarly to the optical fiber 10 of the above-described first embodiment, an optical fiber of the second embodiment of the present invention has, on one end of the optical fiber 11, a tip 24 sharpened conically from the outer periphery of the cladding 13 towards the center of the core 12. This optical fiber 20 has a coating layer 25 on the surface of the tip 24 and a corrosion-resistant coating layer 26 on an area of the surface of the light-shielding coating layer 25 other than the foremost part of the surface of the light-shielding layer 25. The foremost part of the sharpened tip 24 has an aperture 27 which is exposed from the light-shielding coating layer 25 and the corrosion-resistant coating layer 26.

Figure 7:
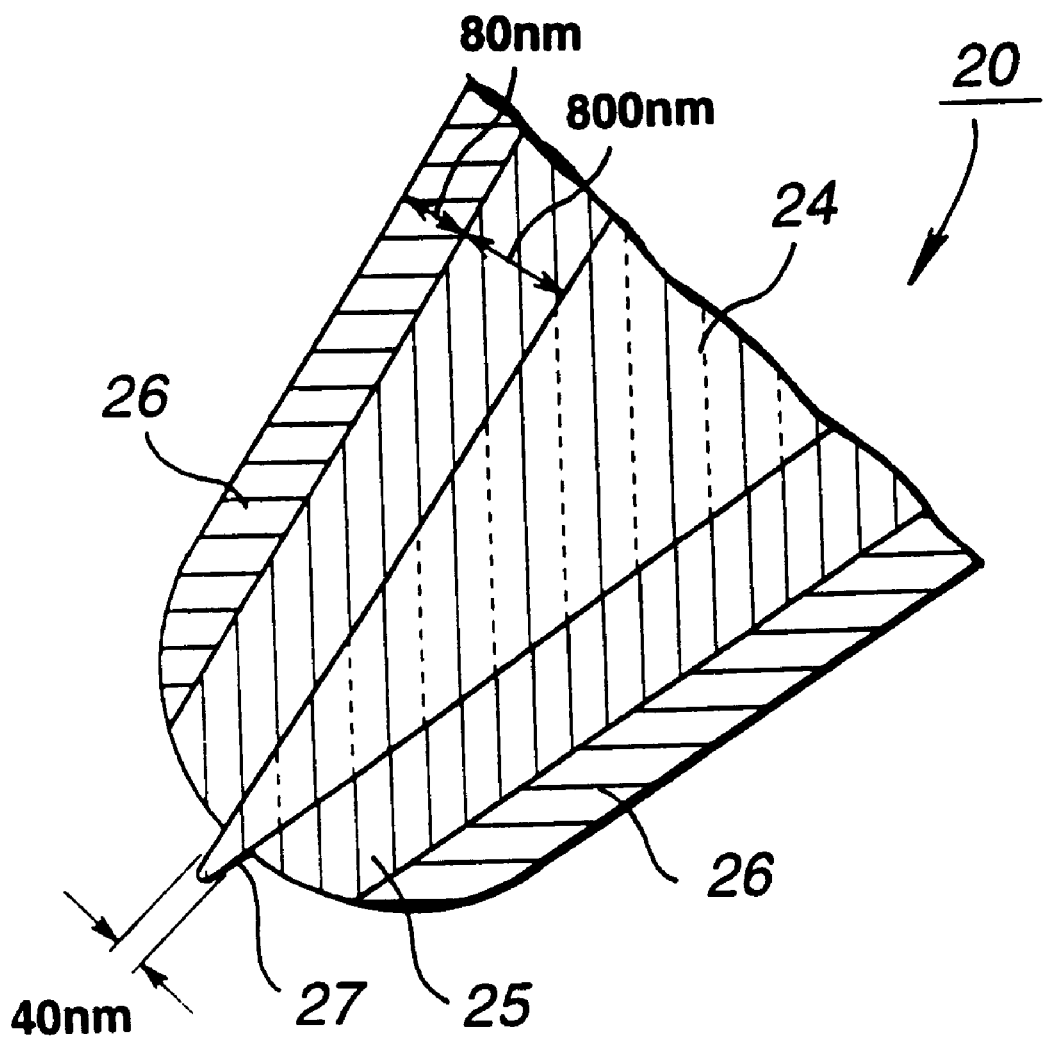
FIG. 7 illustrates a structure of a distal portion of an optical fiber according to the second embodiment.

The foremost part of the sharpened tip 24 has a radius of curvature of not more than 5 nm as shown in FIG. 7 showing the foremost part of the sharpened tip 24 to an enlarged scale. The light-shielding coating layer 25 is formed of, for example, aluminum, and has a thickness on the order of 800 nm. The aperture 27 has a diameter of, for example, 40 nm.

Similarly to the optical fiber 10 of the above-described first embodiment, the optical fiber 29 is used in a photon scanning tunneling microscope as an optical probe for detecting the evanescent light. Since the light-shielding coating layer 25 is formed of aluminum having high light shielding performance, and high electrical conductivity, measurement can be realized without being affected by noise due to extraneous factors. Although aluminum is available at low cost and hence is suitable as a light-shielding coating layer 25, not only aluminum but also other materials having high light shielding properties and high electrical conductivity, such as gold, silver or platinum, may also be employed.

Figure 8:
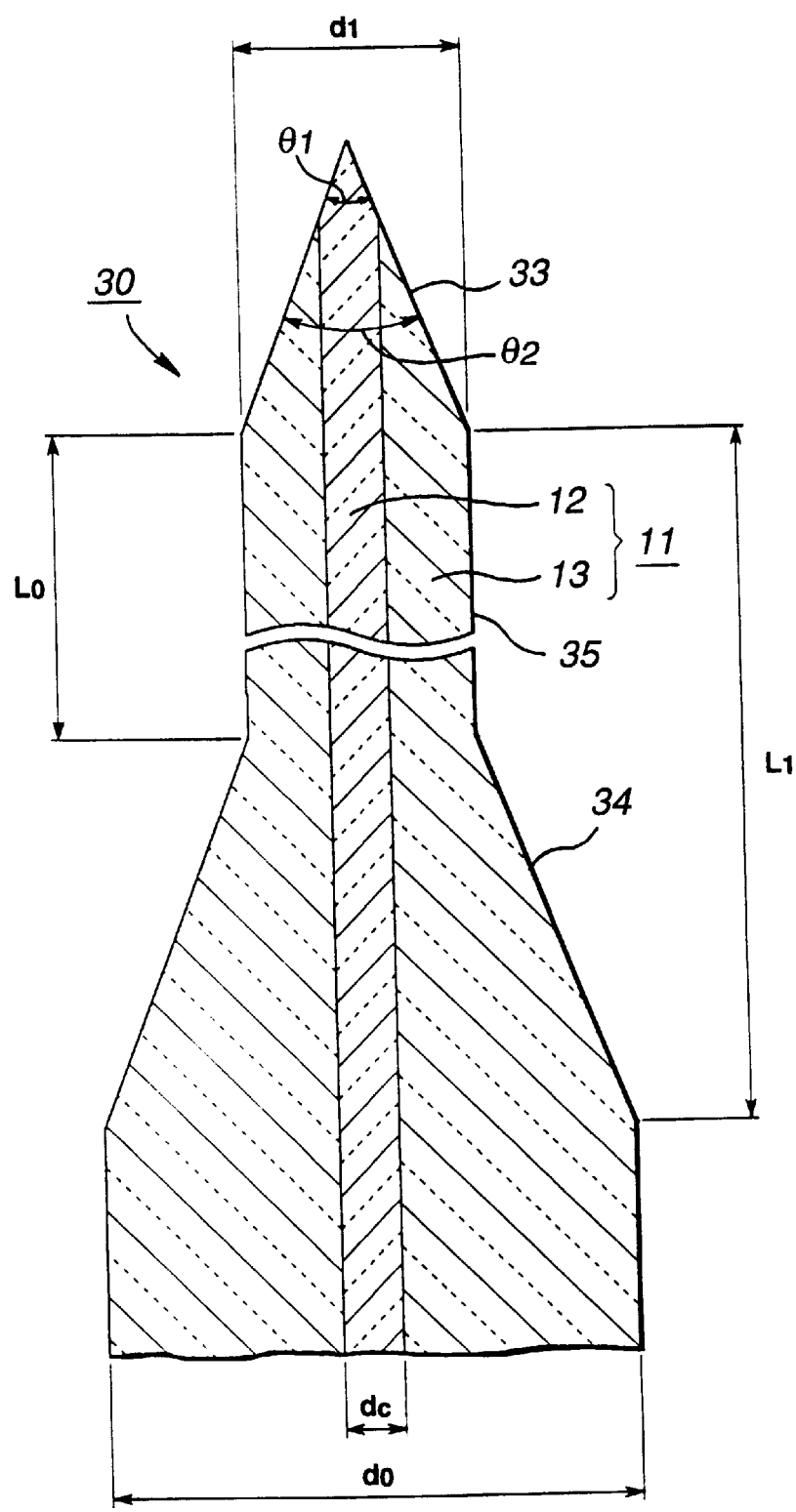
FIG. 8 illustrates a structure of an optical fiber according to a third embodiment of the present invention.

An optical fiber according to a third embodiment of the present invention has a conical sharpened tip 33 at the foremost part thereof, as shown in FIG. 8. The optical fiber of the third embodiment has a tapered portion 34 of the cladding 13 at a proximal end of the optical fiber 11 and a reduced-diameter portion 35 with a diameter of $d_1$ between the sharpened tip 33 and the tapered portion 34 ($d_c < d_1 < d_o$).

With the optical fiber 30, since the diameter of the reduced-diameter portion 35 of the cladding 13 of a length $L_0$ is reduced as shown in FIG. 8, the optical fiber 30 can be flexed radially under the smallest force acting thereon.

Therefore, if the optical fiber 30 is used as a probe for measuring the atomic force in an atomic force microscope designed for detecting the force acting between atoms making up a substance and a probe, the microscope is set in proximity to the object surface in the state of resonance at the resonant frequency for measuring amplitude changes caused by the atomic force, so that the atomic force can be detected with high detection sensitivity.

The optical fiber 30 can also be used as a light probe for the photon scanning tunneling microscope. In this case, by supplying the detection light from one end of the optical fiber 30 to a detection unit of the photon scanning microscope, the above-mentioned atomic force and the evanescent light can be detected simultaneously.

Figure 9:
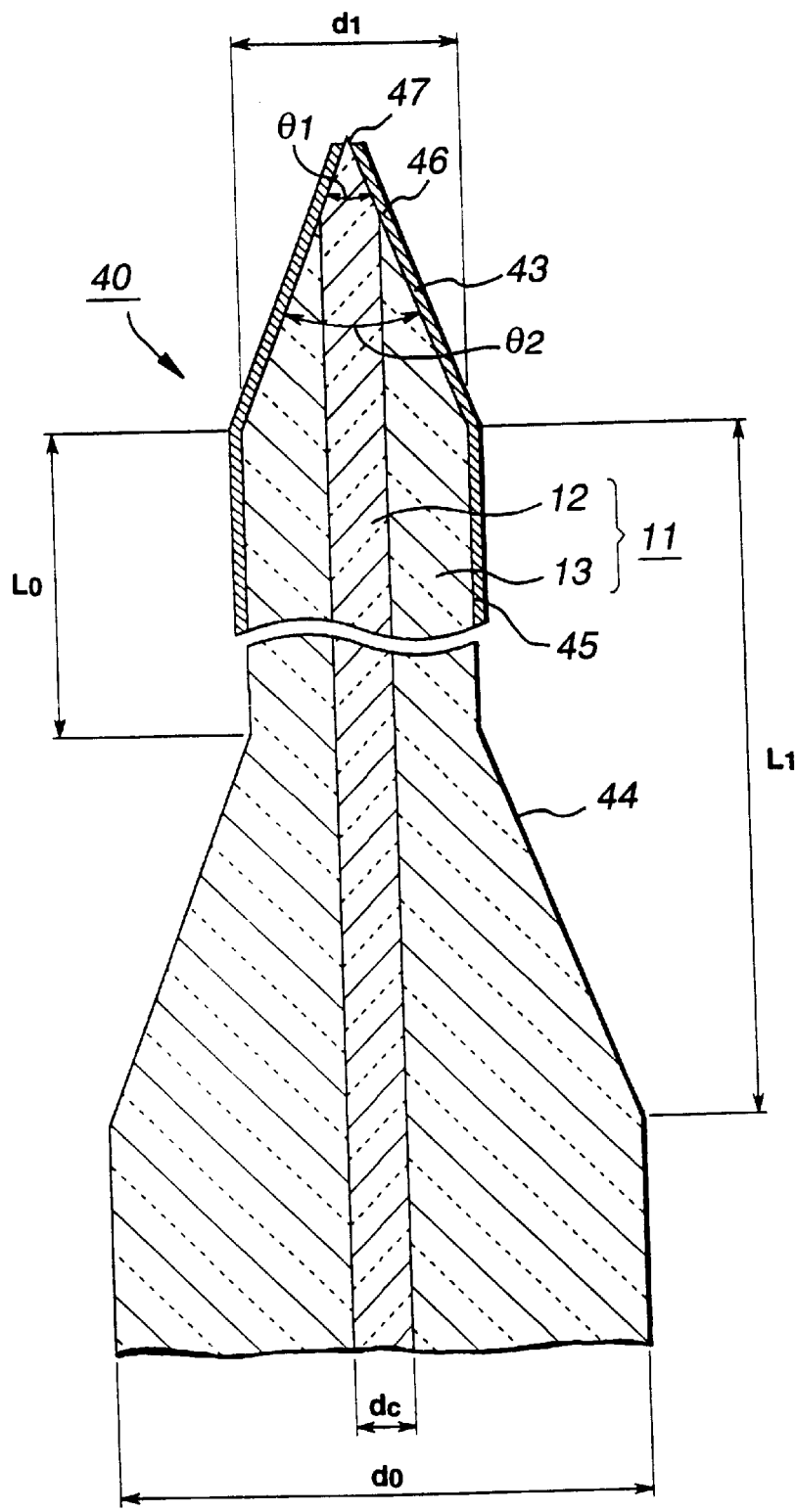
FIG. 9 illustrates a structure of an optical fiber according to a fourth embodiment of the present invention.

Similarly to the optical fiber 30 of the above-described third embodiment, an optical fiber of a fourth embodiment of the present invention has a conically sharpened tip 43 at the foremost part of the optical fiber 11, as shown in FIG. 9. The optical fiber of the fourth embodiment has a tapered portion 43 of the cladding 13 at a proximal end of the optical fiber 11 and a reduced-diameter portion 45 with a diameter of $d_1$ between the sharpened tip 33 and the tapered portion 44 ($d_c < d_1 < d_o$). In addition, the optical fiber 40 has a light-shielding coating layer 46 on the surface of the sharpened tip 43 and an aperture 47, formed by the exposed foremost part of the core 12, at the distal end of the light-shielding coating layer 46.

Similarly to the optical fiber 30 shown in FIG. 8, the above-described optical fiber 40 can be used as an optical probe for measuring the atomic force in the atomic force microscope. That is, by supplying the detection light from one end of the optical fiber 40 to the detection unit of the above-described photon scanning tunneling microscope, the optical fiber can be as an optical probe for measuring the atomic force and the evanescent light simultaneously. In this case, the detection sensitivity of the evanescent light can be improved since the light-shielding coating layer 47 functions as a light shielding portion confining the light incident in the core from an area other than the aperture 47.

Figure 10:
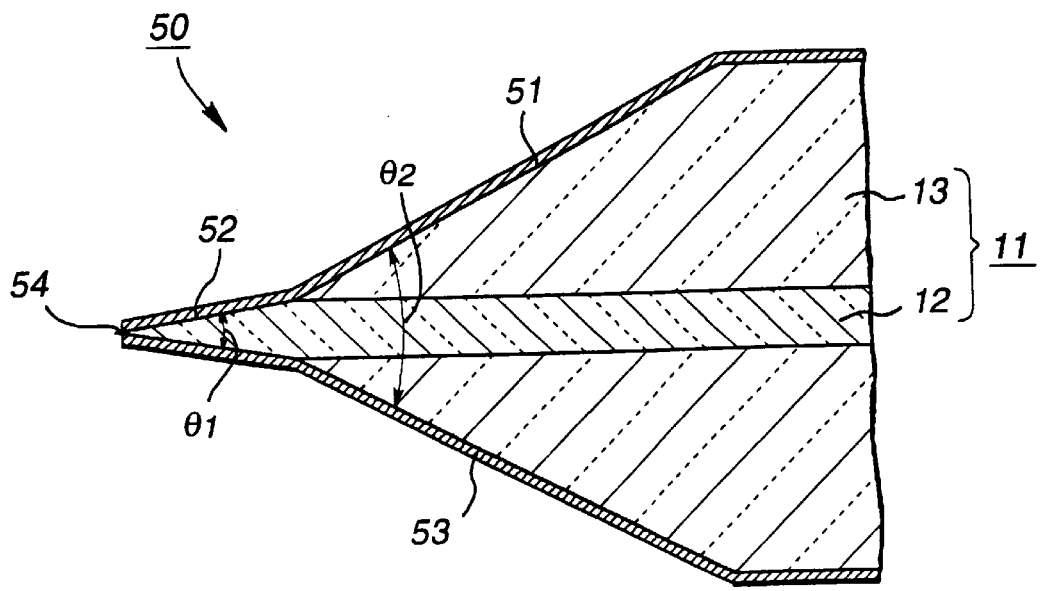
FIG. 10 illustrates a structure of an optical fiber according to a fifth embodiment of the present invention.

Similarly to the optical fibers of the above-described first and second embodiments, an optical fiber of a fifth embodiment of the present invention has a sharpened tip 51 formed by sharpening the cladding 13 at one end of the optical fiber 11, as shown in FIG. 10. The core 12 protruded from the foremost part of the sharpened tip 51 is sharpened to form a protrusion 52, and a light-shielding coating layer 53 is formed on the surface of the sharpened end 52. An aperture 54 exposed from the light-shielding coating layer 53 is formed at the foremost part of the sharpened protrusion 52.

Figure 6:
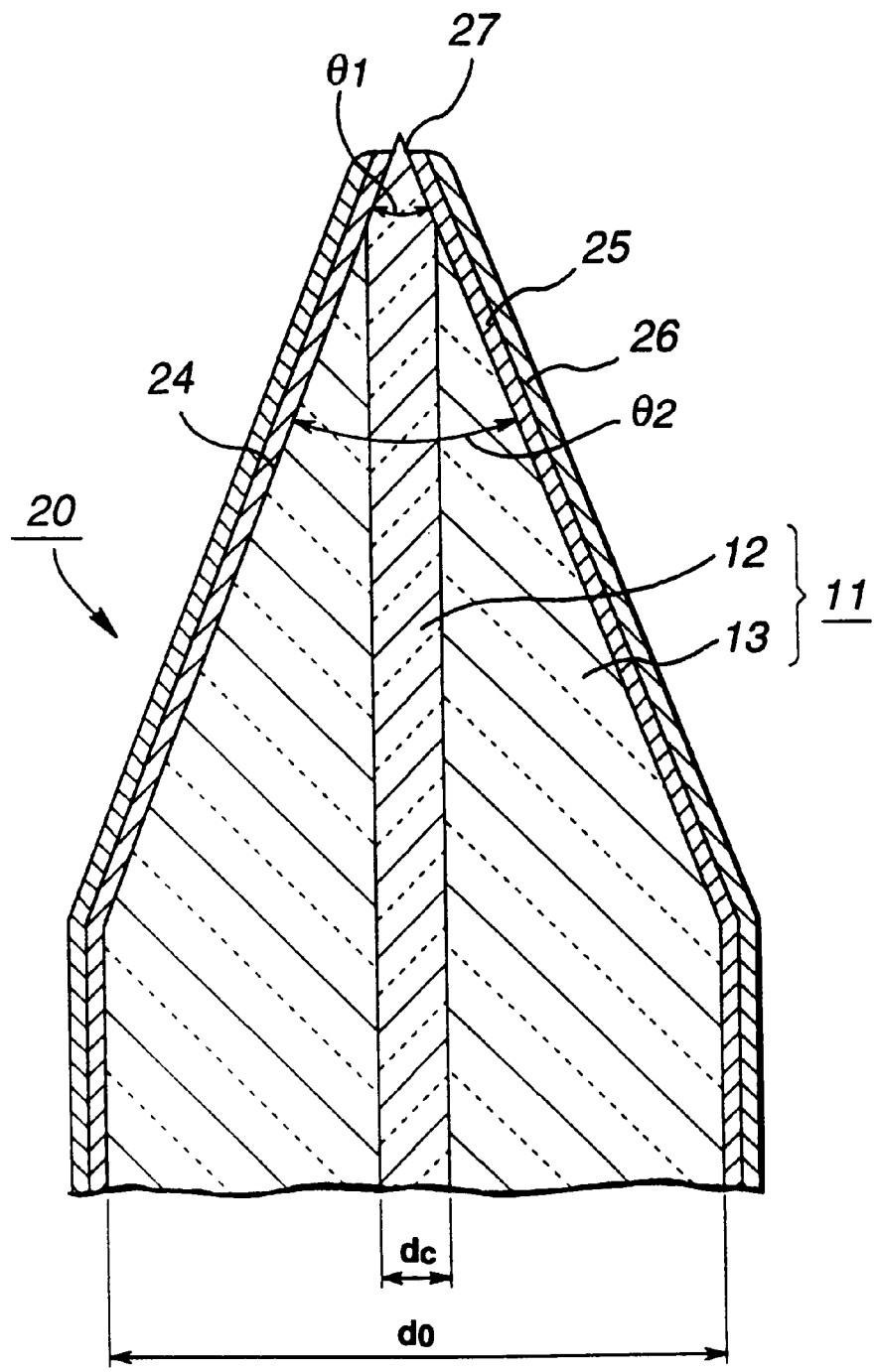
FIG. 6 illustrates a structure of an optical fiber according to a second embodiment of the present invention.

With the first and second embodiments of the optical fiber, the apex angle $\theta_1$ of the core 12 is set so as to be approximately equal to the apex angle $\theta_2$ of the cladding 13, as shown in FIGS. 4 and 6. However, with the present optical fiber 50, the apex angle (cone angle) $\theta_1$ of the core 12 is smaller than the apex angle $\theta_2$ of the cladding 13.

The optical fiber 50 having the above configuration can also be used as an optical probe of the photon scanning tunneling microscope. Since the optical fiber 50 has the light-shielding coating layer 53, only the detection light from the aperture 54 can be detected thereon to improve the detection efficiency.

Figure 11:
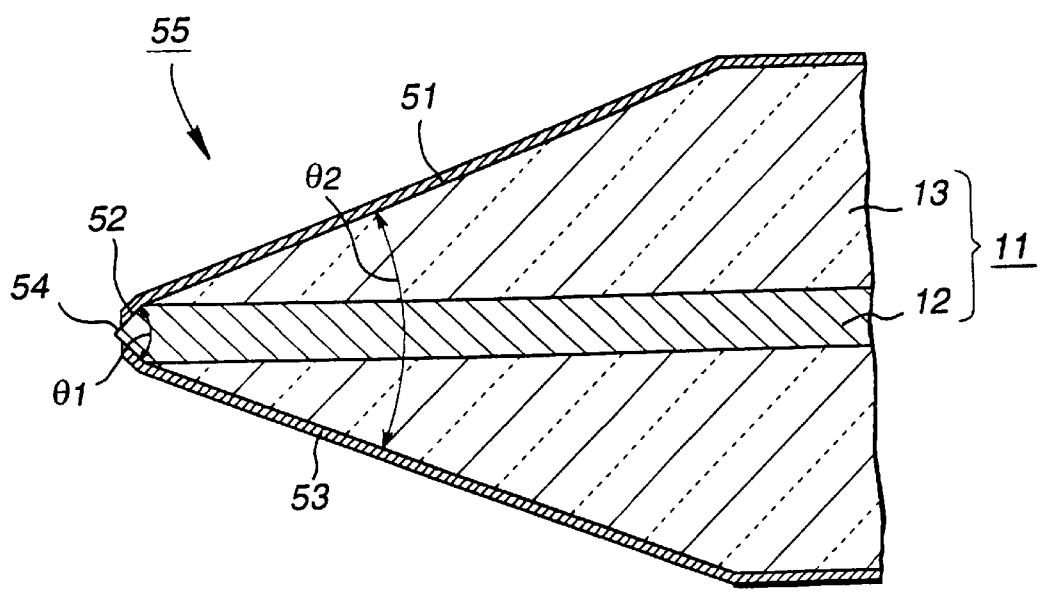
FIG. 11 illustrates a structure of an optical fiber according to a sixth embodiment of the present invention.

Similarly to the optical fibers of the above-described first and second embodiments, an optical fiber of a sixth embodiment of the present invention has a sharpened tip 51 formed by sharpening the cladding 13 at one end of the optical fiber 11, as shown in FIG. 11. The core 12 protruded from the foremost part of the sharpened tip 51 is sharpened to form a protrusion 52 and a light-shielding coating layer 53 is formed on the surface of the sharpened protrusion 52. An aperture 54 exposed from the light-shielding coating layer 53 is formed at the foremost part of the sharpened end 52.

With the optical fiber 50 of a fifth embodiment, the apex angle (cone angle) $\theta_1$ of the core 12 is smaller than the apex angle $\theta_2$ of the cladding 13. However, with the present optical fiber 55, the apex angle $\theta_1$ of the core 12 is selected to be larger than the apex angle $\theta_2$ of the cladding 13.

Similarly to the optical fiber 50 of the fifth embodiment, the optical fiber 50 having the above configuration can also be used as an optical probe of the photon scanning tunneling microscope. Since the optical fiber 55 has the light-shielding coating layer 53, only the detection light from the aperture 54 can be detected thereon to improve the detection efficiency.

Meanwhile, if the diameter of the core 12 becomes smaller than the light wavelength, the light propagated in the optical fiber cannot be confined within the core 12.

Therefore, if an electrically conductive coating layer is formed on the surface of the optical fiber, the light leaking from the core 12 is absorbed by the electrically conductive coating layer, thus lowering the propagation efficiency.

However, with the present optical fiber 55, in which the apex angle $\theta_1$ of the core 12 is larger than the apex angle $\theta_2$ of the cladding 13, the distance from a position in which the diameter of the core 12 of the protrusion 52 becomes smaller than the wavelength of the detection light as far as the end of the protrusion becomes shorter.

Figure 12:
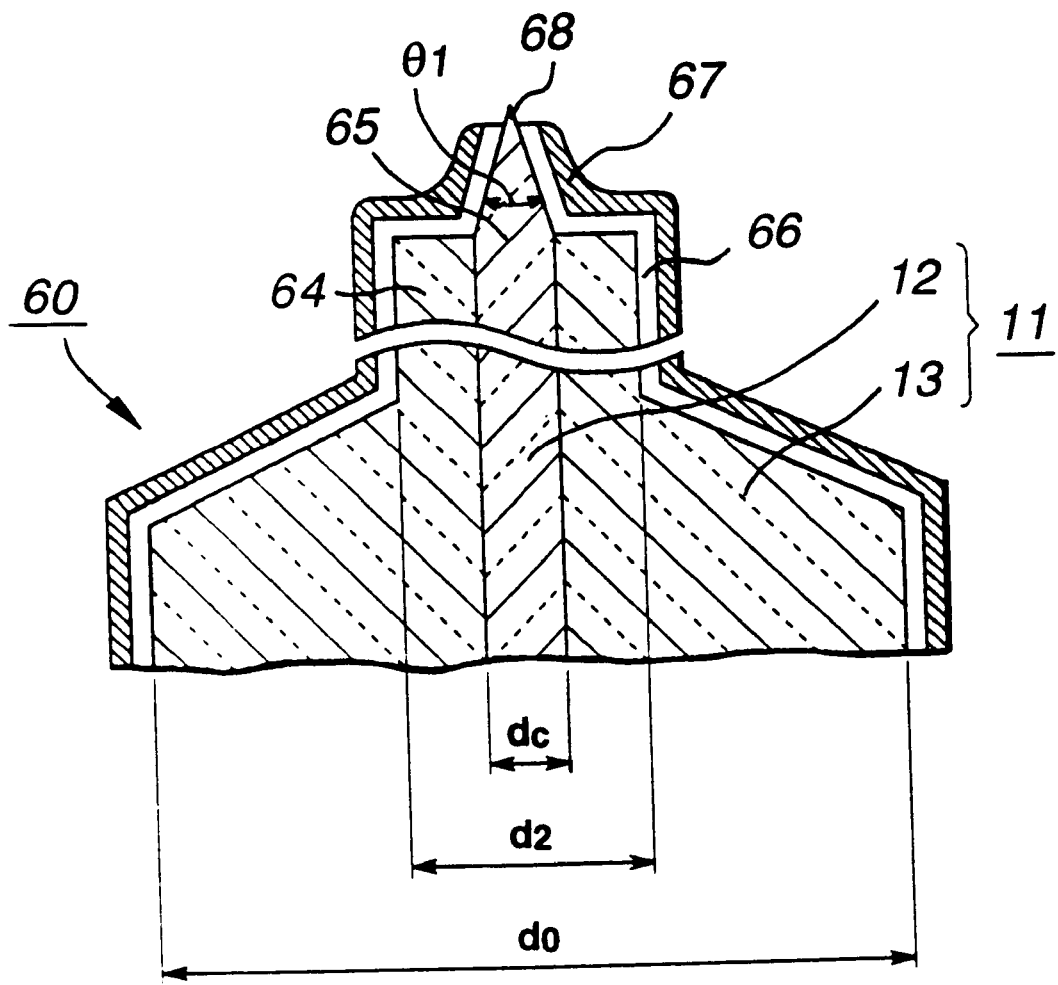
FIG. 12 illustrates a structure of an optical fiber according to a seventh embodiment of the present invention.

An optical fiber of a seventh embodiment of the present invention has, at one end of the optical fiber 11, a reduced-diameter portion 64 obtained by reducing the diameter of the cladding 13, as shown for example in FIG. 12. The foremost part of the reduced-diameter portion 64 has a protrusion 65 which is produced by sharpening the core 12. This optical fiber 60 has a light-shielding coating layer 66 of, for example, gold, on the surface of the protrusion 65, and also has an aperture 68 which is formed by forming a corrosion-resistant coating layer 67 of, for example, synthetic resin, on the surface other than the foremost part of the light-shielding layer 66, and by subsequently etching the light-shielding layer 66, for exposing the foremost part of the protrusion 65 from the light-shielding coating layer 66.

The above-described optical fiber 60 is used in a photon scanning tunneling optical microscope as an optical probe for detecting the evanescent light, and is configured for conducting the scattered light to the core 12 for detection. With the optical fiber 60, the light-shielding coating layer 66 operates as a light-shielding portion for interrupting the light, while the aperture 68 at the foremost part of the protrusion 65 operates as a detecting portion for scattering conducting the detection light to the protrusion 65, for selectively taking in the detection light from the aperture 68. The detection light, taken in at the protrusion 65, is led via protrusion 65 to the core 12.

Thus it becomes possible to raise the detection efficiency by eliminating the effect by the scattered light since scattered light is not incident from an area other than the aperture 68, thus enabling reliable detection of the evanescent light with an extremely low power.

With the present optical fiber 60, in which the reduced-diameter portion 64 is formed at an end of the optical fiber 11, and the protrusion 65 is formed at the foremost part of the reduced-diameter portion 64, the reduced-diameter portion 65 operates as an extension elongating the protrusion 65. Thus there is no risk of the peripheral portion of the cladding 13 being stuck against the sample surface for damaging the sample surface or the foremost part of the optical fiber 60 at the time of scanning of the sample surface.

Since the reduced-diameter portion 64 of the optical fiber 60 has a diameter $d_2$ smaller than the length of the reduced-diameter portion 64, the optical fiber 60 becomes flexed along the radius of the optical fiber 11 under the smallest external force.

Therefore, if the optical fiber 60 thus constructed is used as a probe for measuring the atomic force acting between atoms making up substances, the atomic force can be detected with high detection sensitivity. In this case, by supplying an end of the optical fiber 60 to a detecting portion of the above-described photon scanning tunneling microscope, the atomic force and the evanescent light can be measured simultaneously.

Erbium $Er^{3-}$ or neodymium $Nd^{3-}$ can be added in the core 12. By using this composition, the light propagated in the core 12 can be amplified by erbium $Er^{3+}$ or neodymium $Nd^{3-}$ while the core 12 itself can have the light amplifying function.

If the optical fiber the core 12 of which has the light amplifying function is used in the above-described photon scanning tunneling microscope, the detection light incident at the aperture 68 can be amplified within the core 12, thus drastically improving light detection sensitivity for assuring high sensitivity light detection.

The optical fiber 60 can be formed using a single mode fiber having a core 12 formed of quartz $SiO_2$ and a cladding 13 formed of quartz $SiO_2$ doped with fluorine F.

Figure 13:
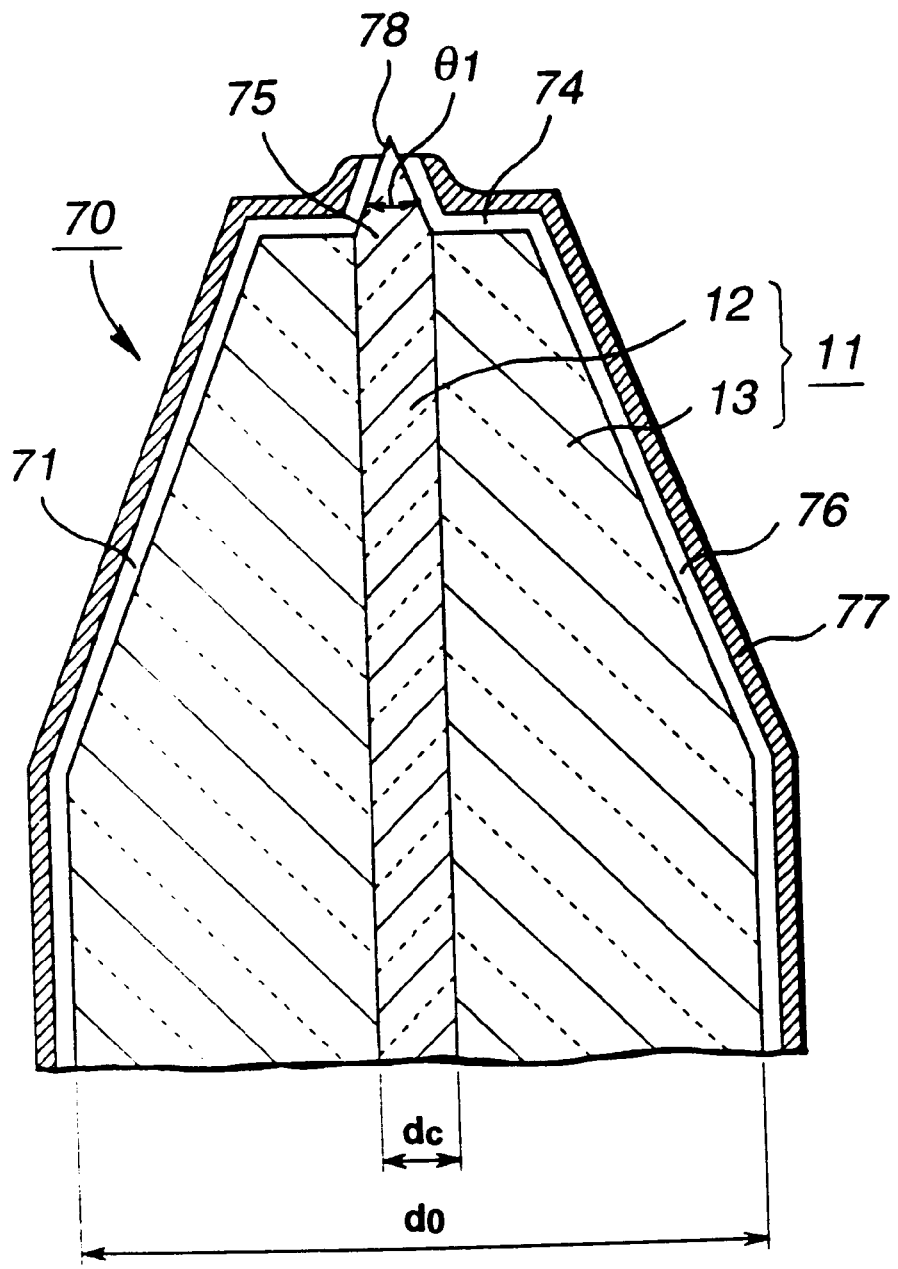
FIG. 13 illustrates a structure of an optical fiber according to an eighth embodiment of the present invention.

An optical fiber according to the eighth embodiment of the present invention has a tapered portion 71 formed by tapering the cladding at an end of the optical fiber 11 made up of the core 12 and the cladding 13, as shown for example in FIG. 13. A flat portion 74 formed by flattening the cladding is formed at the foremost part of the tapered portion 71, while the conically sharpened core 12 has a protrusion 75 extending from the flat portion 74. The optical fiber 70 also has a light-shielding coating layer 76 and a corrosion-resistant coating layer 77. The foremost part of the protrusion 75 has an aperture 78 exposed at the light-shielding layer 76 and a corrosion-resistant coating layer 77.

With the above-described optical fiber 70, in which the tapered portion 71 formed by tapering the cladding 13 is formed at the proximal end of the protrusion 75, the proximal end of the protrusion 75 can be improved in strength. If the optical fiber is used in the above-described photon scanning tunneling microscope, it is less susceptible to destruction on collision against the sample surface, thus improving durability.

Figure 14:
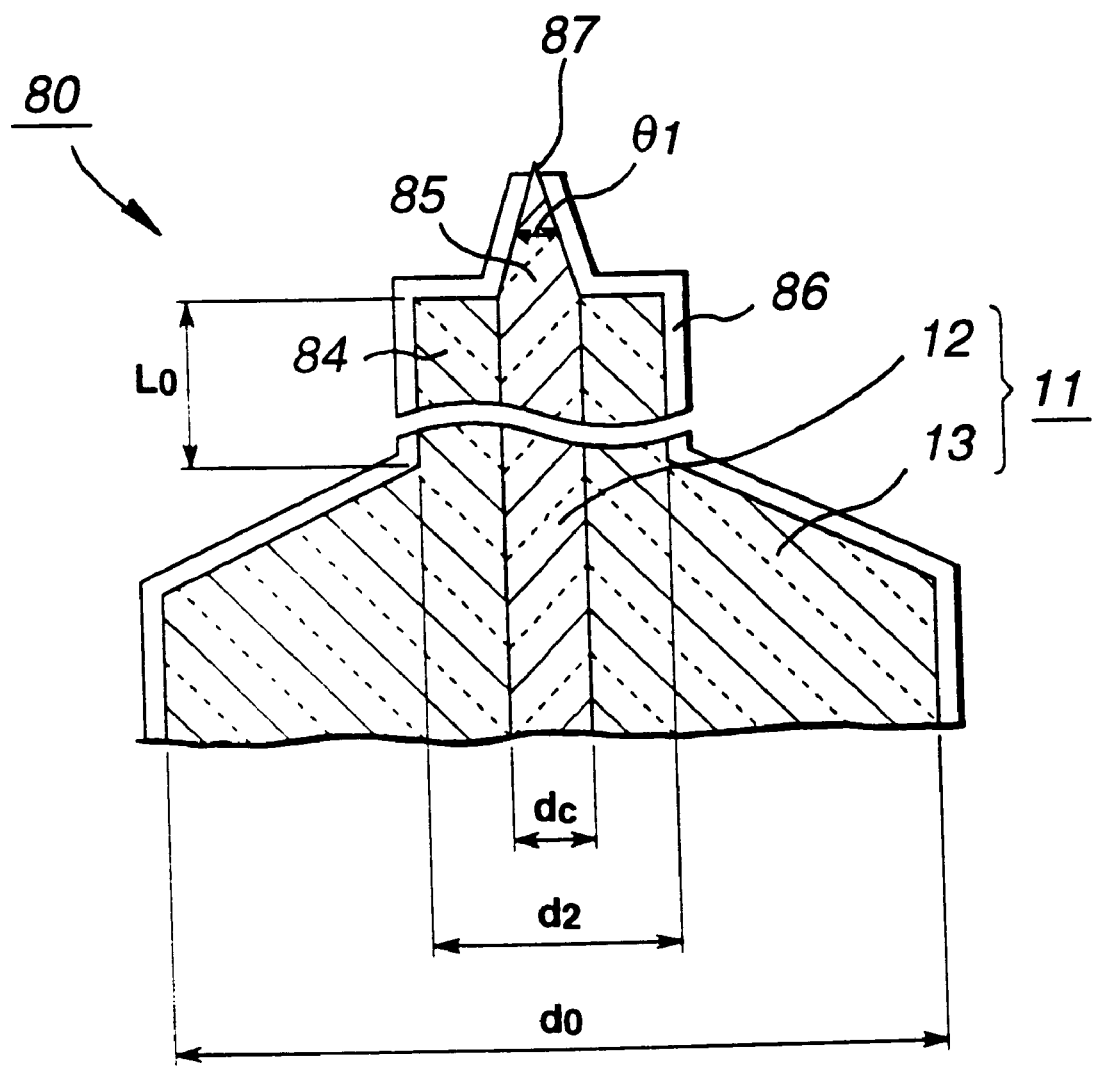
FIG. 14 illustrates a structure of an optical fiber according to a ninth embodiment of the present invention.

Similarly to the optical fiber 60 of the seventh embodiment, an optical fiber according to a ninth embodiment of the present invention has a reduced-diameter portion 84 obtained by reducing the diameter of the cladding 13, as shown for example in FIG. 14. The foremost part of the reduced-diameter portion 84 has a protrusion 85 which is formed by sharpening the core 12. The optical fiber 80 has a light-shielding coating layer 86 of, for example, gold, while the foremost part of the protrusion 85 has an aperture 87 which is exposed at the light-shielding coating layer 86.

Figure 15:
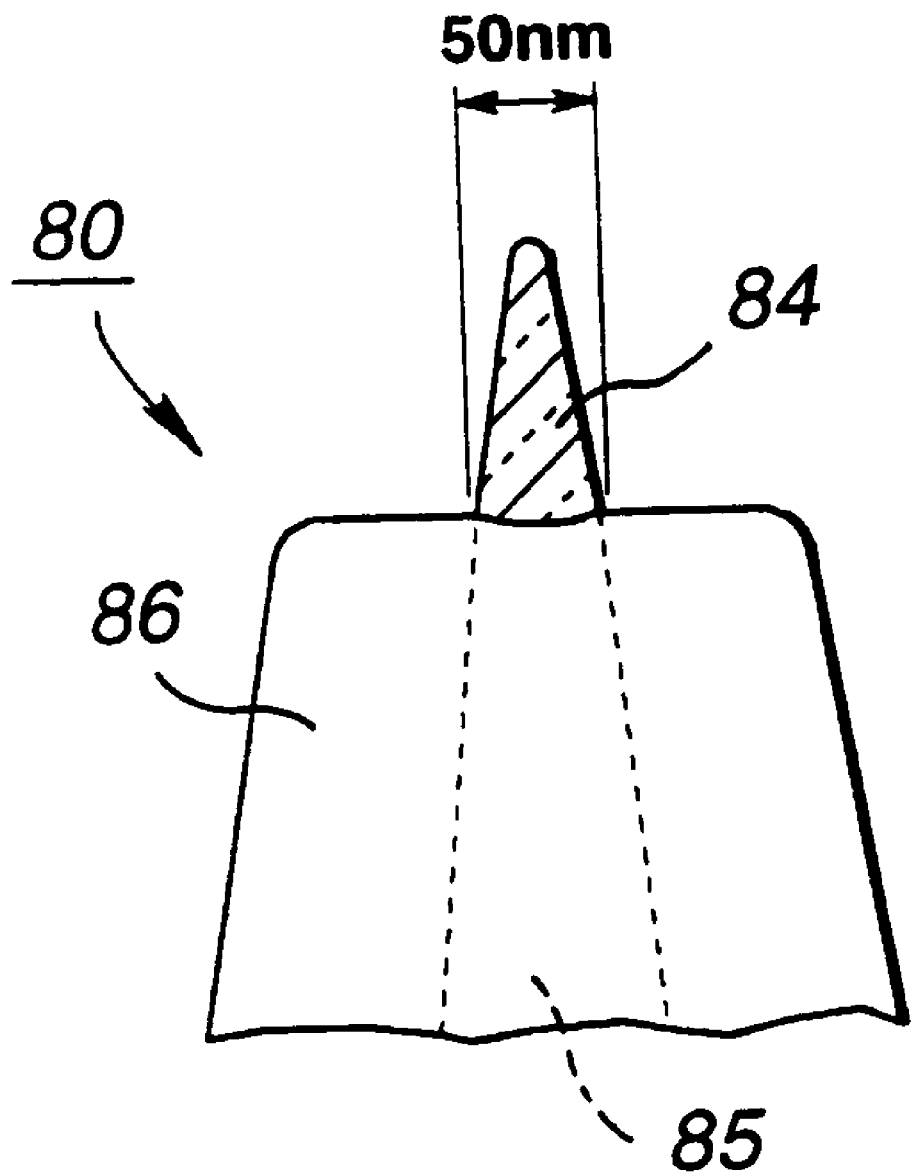
FIG. 15 illustrates a specified structure of a distal portion of the optical fiber according to the ninth embodiment.

The aperture 87 is formed by first forming a photosensitive layer on the surface of the light-shielding coating layer 86, selectively exposing only the foremost part of the photosensitive layer with the evanescent light, removing the photosensitive layer thus exposed to light and by etching the portion of the light-shielding coating layer 86 exposed from the exposed portion. Thus the aperture 87 has an extremely small diameter of the order of 50 nm, as shown for example in FIG. 15.

Similarly to the optical fiber 60 of the seventh embodiment, such optical fiber 80 is used in the photon scanning tunneling microscope as a light probe for detecting the evanescent light, while the aperture 87 at the foremost part of the protrusion 85 operates as a detector for scattering and conducting the detection light to the protrusion 85. Thus the detection light can be selectively taken in at the aperture 87 for eliminating the effect of the scattered light for improving the detection efficiency for detecting the evanescent light with an extremely small power.

Similarly to the optical fibers 60, 70 of the seventh and ninth embodiments, an optical fiber of a tenth embodiment of the present invention has a reduced-diameter portion 94 obtained by reducing the diameter of the cladding 13, a protrusion 95 obtained by sharpening the core 12 and a light-shielding coating layer 96 on the surface of the protrusion 95.

The optical fiber 90 also has an aperture 91 which is formed by removing the foremost part of the light-shielding coating layer 96 and a pit 93 which is formed by recessing the foremost part of the protrusion 95 in response to the foremost part of the light-shielding layer 96 of the aperture 91. The pit 93 has a diameter 93 of 50 nm. Inside this pit 93 is accommodated a substance 92, such as a dye or a reagent, the optical properties of which are changed with the surrounding environment.

With the above-described optical fiber 90, the dye or the phosphorescent material is deposited as the substance 92 in the pit 93. If the light such as a laser beam is incident on the opposite end of the core 12, the light propagated in the core 12 is collected by the protrusion 95 for emitting the light in the dye or the phosphorescent material in the pit 93. The substance thus acts as a small sized light source by the light emission radiated on an article being measured.

If the substance 92 deposited on the pit 93 is changed in optical properties depending on the surrounding environment, such as dye or reagent, the optical properties of the substance 92 are changed depending on the environment surrounding such as pH or light emission. If changes in the optical properties of the substance 92 are detected on the opposite side of the pit 93 by detecting the light propagating in the core 12, the optical fiber operates as an optical fiber sensor for detecting the surrounding environment of the pit 93.

Specifically, the optical fiber operates as a pH sensor for detecting pH of a dye such as fluoresceinamine whose light emission spectrum is changed with pH of the article being measured. Since the diameter of the aperture 91 of the optical fiber 90 is on the order of 50 nm, it can be used as a pH sensor with improved spatial resolution.

With the optical fiber 90, since the substance 92 used for detecting the surrounding environment is formed within the pit 93, the substance 92 is protected by the foremost part of the light-shielding coating layer 96 and hence is insusceptible to peeling even if the foremost part of the optical fiber impinges on the article being measured. The result is that such optical fiber is improved in peeling strength of a detecting part, such as dye, for improving durability.

Figure 17:
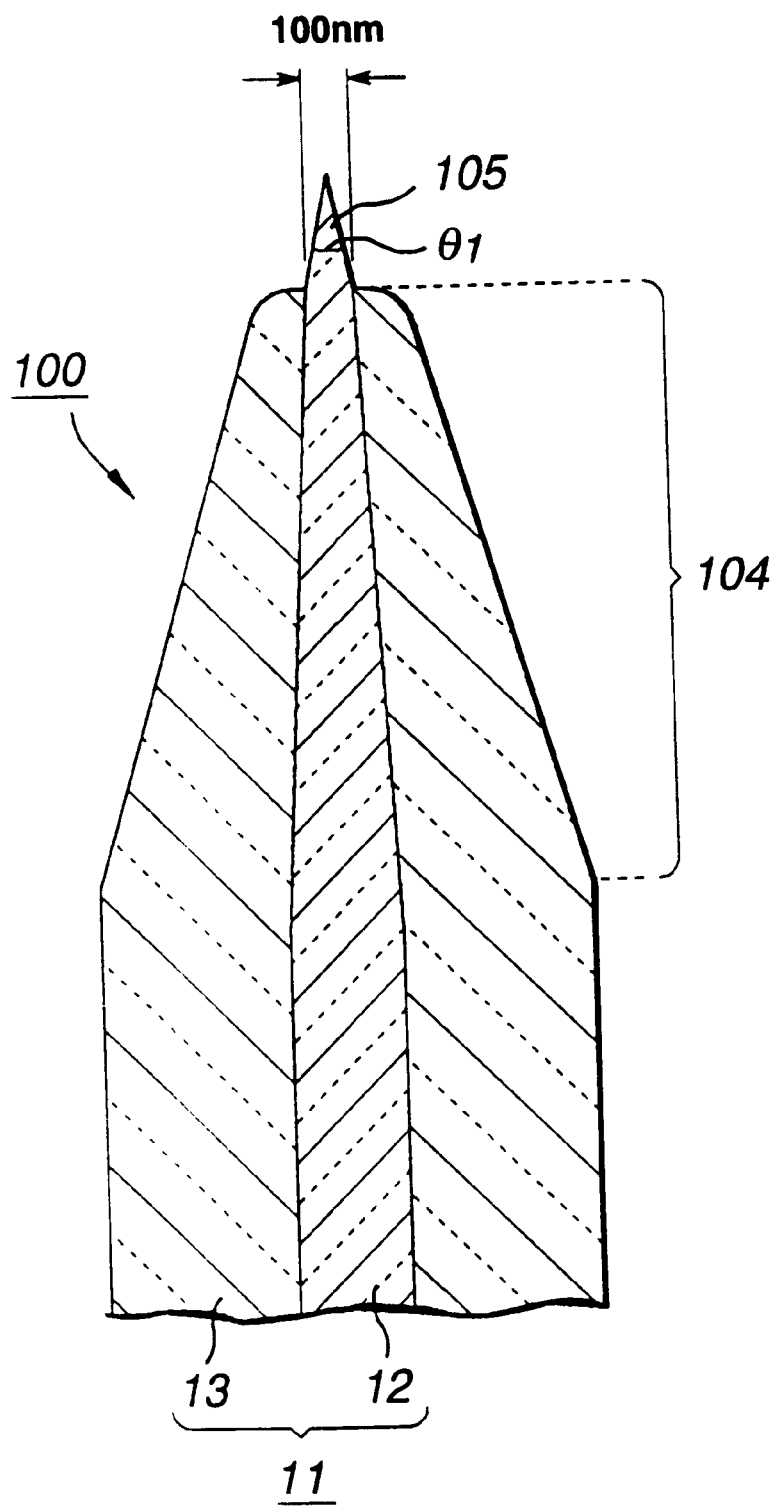
FIG. 17 illustrates a structure of an optical fiber according to an eleventh embodiment of the present invention.

An optical fiber of an eleventh embodiment of the present invention has a tip 104 formed by sharpening both the core 12 and the cladding 13, as shown for example in FIG. 17. The core 12 protruded from the distal end of the tip 104 has a conically sharpened protrusion 105 the proximal end of which has a diameter on the order of 100 nm. The core 12 is formed of quartz $SiO_2$ doped with germanium dioxide $GeO_2$ to a high concentration, while the cladding 13 is formed of quartz $SiO_2$.

If the diameter of the core 12 is decreased gradually, the light propagated within the optical fiber 11 having the sharpened end of the core 12 is reduced in diameter of the light-propagating portion thus increasing the power density. Thus, by gradually decreasing the diameter of the core 12, it becomes possible to condense the light propagated through the core 12.

However, if the diameter of the core 12 becomes smaller than the wavelength of light, the boundary between the core 12 and the cladding is exceeded and light propagation occurs in the cladding mode, thus decreasing the intensity of the propagated light. It is therefore desirable to reduce the distance from the position of the diameter of the core 12 becoming less than the light wavelength as far as the foremost part of the core 12 for diminishing light attenuation.

With the optical fiber 100 shown in FIG. 17, since the diameter of the proximal end of the protrusion 105 is on the order of 100 nm which is on the order of the detection light wavelength, the light propagated in the core 12 is not propagated in the cladding 13 thus reducing light attenuation.

Figure 18:
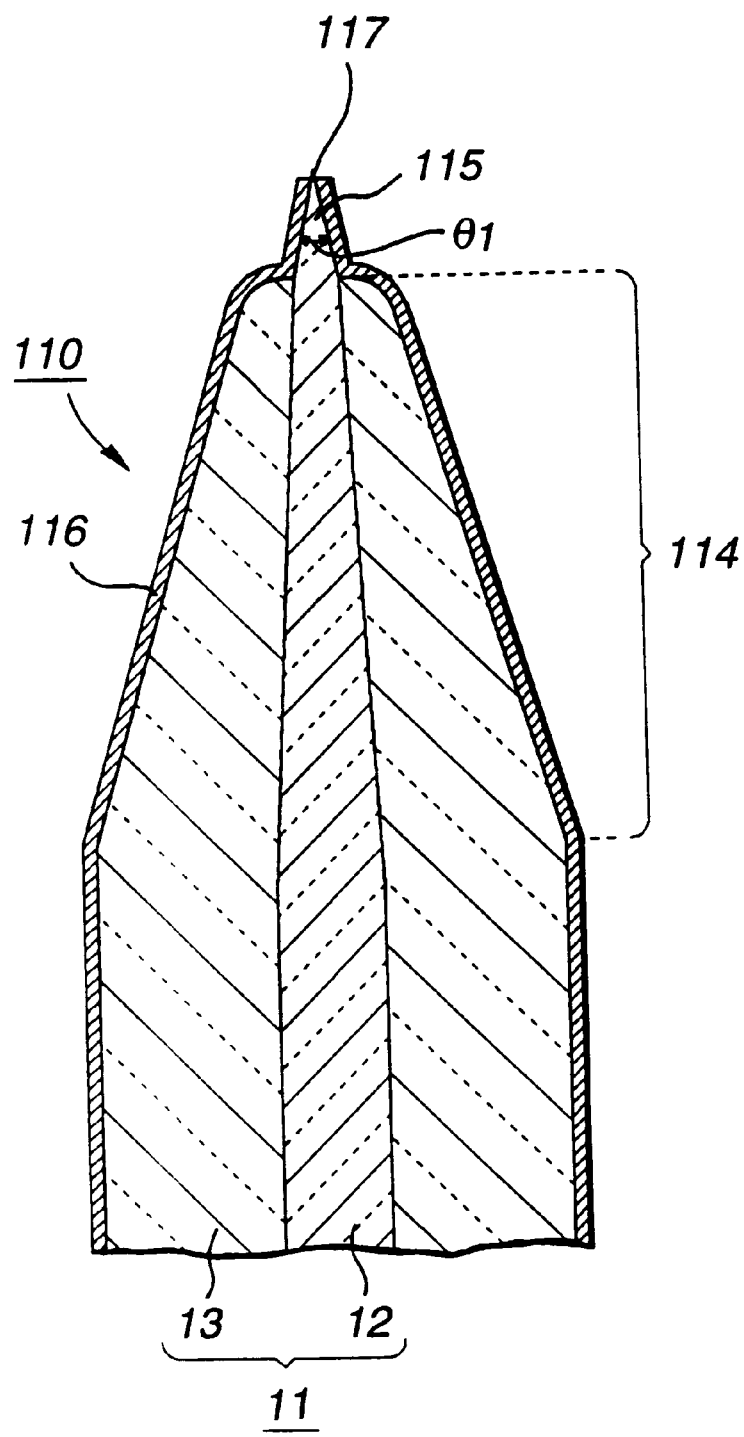
FIG. 18 illustrates a structure of an photon scanning microscope employing an optical fiber.
Figure 19:
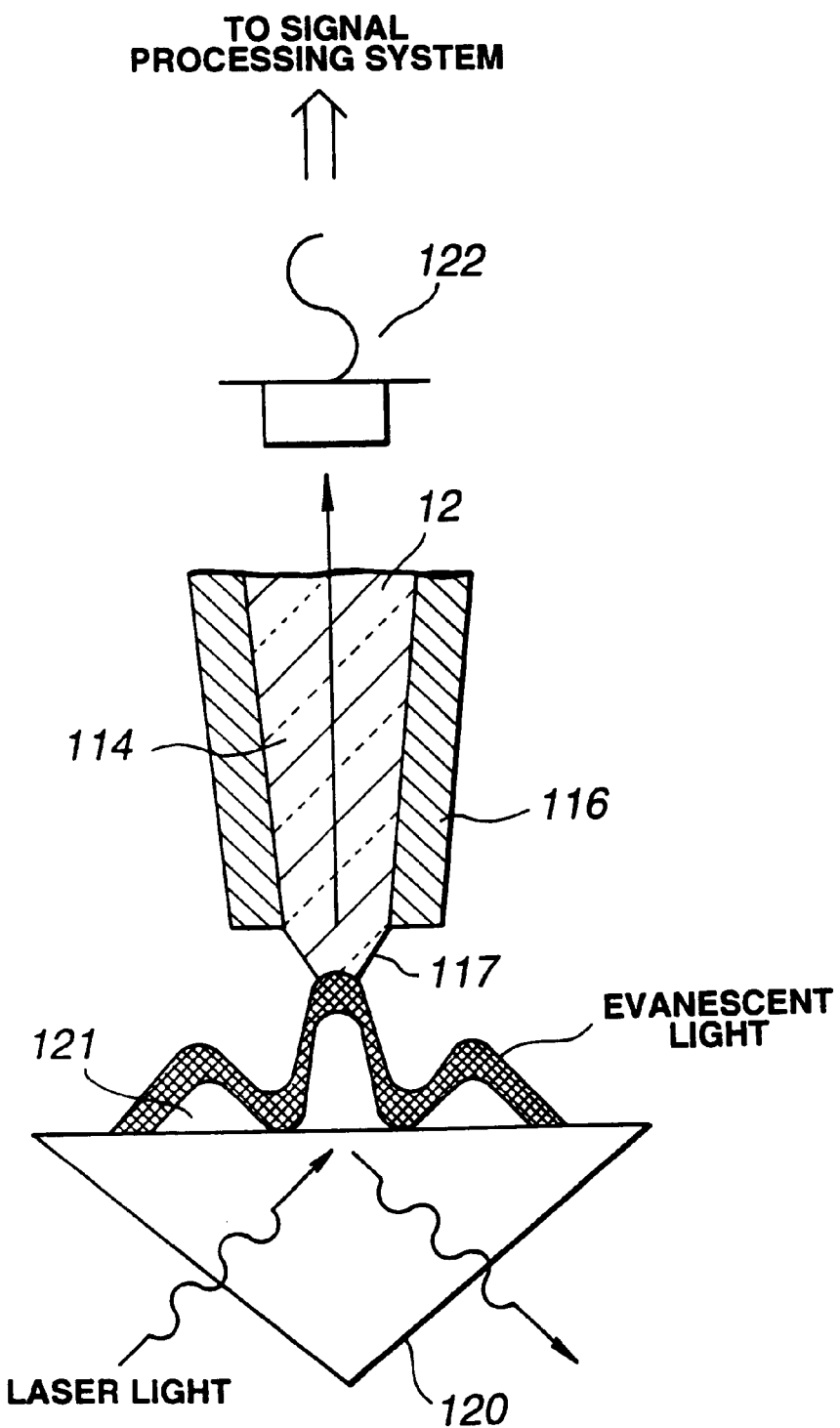
FIG. 19 shows the principle of the operation under an correction mode of a photon scanning tunneling microscope employing an optical fiber.

A twelfth embodiment of the optical fiber of the present invention has a tip 114 which is formed by sharpening both the core 12 and the cladding 13, as shown for example in FIG. 18. The conically sharpened core 12 is protruded at a protrusion 115 at the foremost part of the cladding 13 of the tip 114, and a light-shielding layer 116 is formed on the surface of the protrusion 115, while an aperture 117 is formed by exposing the foremost part of the protrusion 115 at the foremost part of the coating layer 116. The diameter of the aperture 117 is on the order of 30 nm which is smaller than the detection light wavelength.

The above-described optical fiber 110 may be used for detecting the evanescent light in the photon tunneling microscope as an optical fiber.

Specifically, the laser light is incident from the back surface of a sample 121 on a prism 120 with a total reflection angle of the prism 120. At this time, the laser light is reflected on the surface of the prism 120, while the evanescent light propagated in an area not larger than the wavelength of light on a sample surface is generated on the prism surface. This evanescent light is propagated via the sample 121 so that the field of the evanescent light is generated in the area not larger than the wavelength of light on the surface of the sample 121.

If the aperture 117 of the foremost part of the optical fiber 110 is placed in proximity to a position spaced at a distance not larger than the light wavelength from the surface of the sample 121, the evanescent light is scattered by the foremost part of the optical fiber 110 so as to be incident on the core 12. The light entering the core 12 is propagated within the core 12 so as to enter a light detecting portion 122 provided at the opposite end of the aperture 117.

Because of the provision of the light-shielding coating layer 116, the evanescent light is not incident on the optical fiber 11 except at the aperture 117, thus improving detection sensitivity and spatial resolution.

Figure 20:
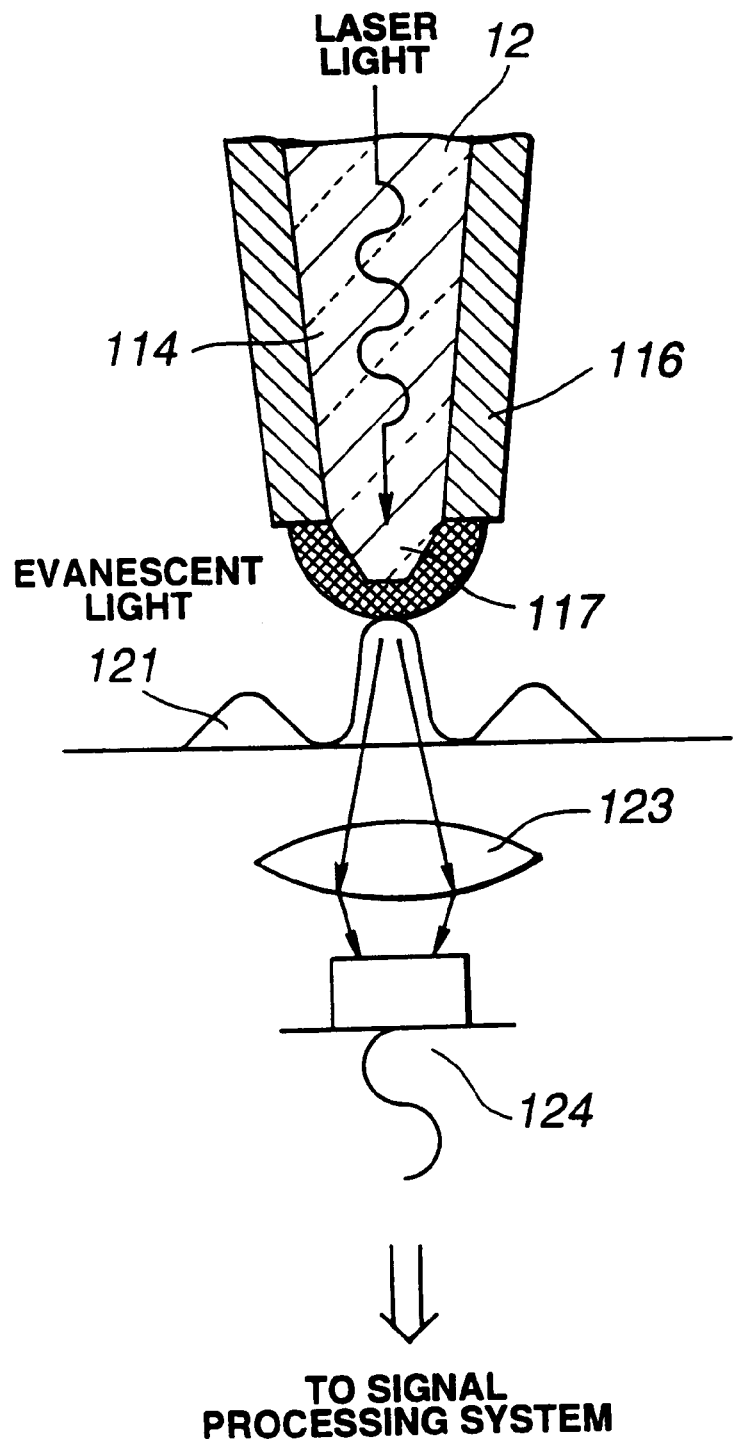
FIG. 20 shows the principle of the operation under an illumination mode of a photon scanning tunneling microscope employing an optical fiber.

Such detection technique of the evanescent light is termed the operation of the collection mode of the photon scanning tunneling microscope. Conversely, with the operation of the illumination mode of the photon scanning tunneling microscope, the laser light is incident on the core 12 at the opposite end of the aperture 117, as shown in FIG. 20. The light in the core 12 is collected at the tip 114 as in the case of the optical fiber 100 shown in FIG. 17. The light collected at the tip 114 is radiated via the aperture 117 as the evanescent light on the surface of the sample 121 because the diameter of the aperture 117 is not larger than the light wavelength. The sample 121 is irradiated with the evanescent light and the transmitted light is collected by a lens 123 so as to be detected by a light detecting portion 124.

Similarly to the optical fiber 100 shown in FIG. 17, the optical fiber 110 collects the propagated light in the core 12 at the tip 114, so that the light radiated from the aperture 117 on the surface of the sample 121 can be increased in strength.

Moreover, since the light is radiated outwardly of the core 12 from other than the aperture 117 shielded by the light-shielding coating layer 116, the detection light can be radiated on the surface of the sample 121 only via the aperture 117. Therefore, by using the optical fiber 110 as the optical probe, it becomes possible to improve detection sensitivity and spatial resolution for measurement.

Figure 21:
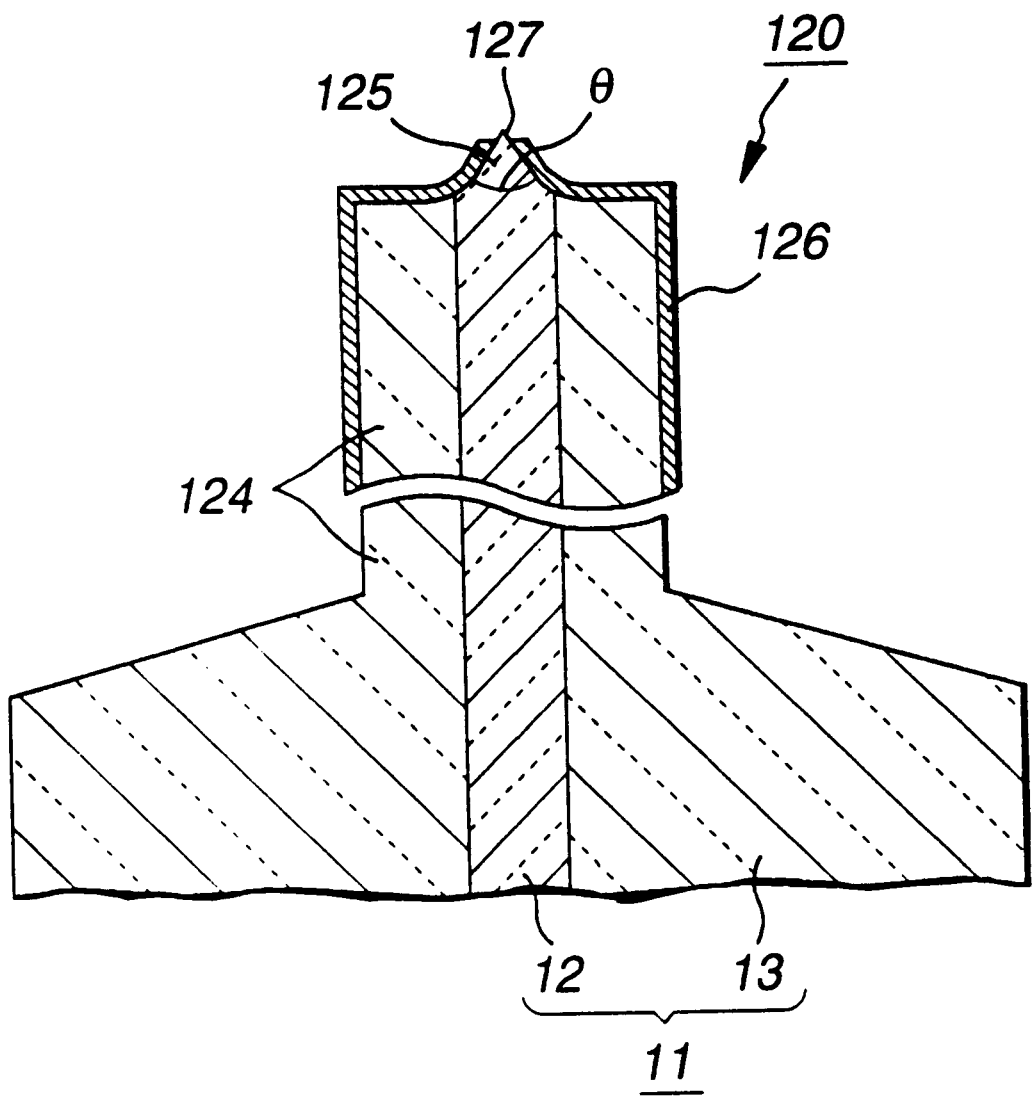
FIG. 21 illustrates a structure of an optical fiber according to a thirteenth embodiment of the present invention.

An optical fiber according to a thirteenth embodiment of the present invention includes a reduced-diameter portion 126 obtained by reducing the diameter of the cladding 13, a protrusion 125 obtained by sharpening the core 12 exposed from the foremost part of the reduced-diameter portion 123, a light-shielding coating layer 126 on the surface of the protrusion 124 and an aperture 127 exposed from the coating layer 126, as shown for example in FIG. 21.

Figure 74:
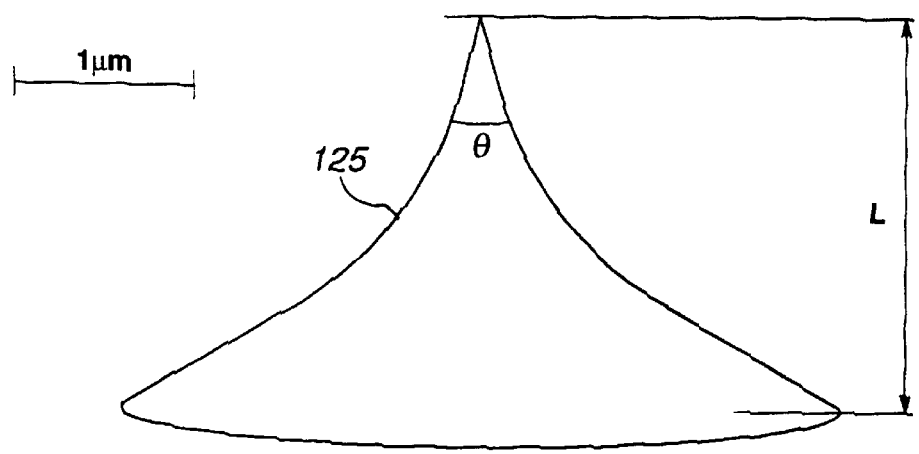
FIG. 74 is an enlarged perspective view showing the shape of a tip of an optical fiber produced by the optical fiber producing method of the thirty-third embodiment.

The apex angle θ of the core 12 of the protrusion 125 becomes smaller as the foremost part of the protrusion 125 is approached. The length L of the protrusion 125 and the apex angle θ of the foremost part of the protrusion 125 are 2.1 μm and 28°, respectively, as shown for example in FIG. 74. Alternatively, the length L and the angle θ are 1.52 μm and 36.5°, respectively, as shown for example in FIG. 75.

With the above-described optical fiber 120, since the protrusion 125 is of a reduced length, light absorption by the light-shielding coating layer 126 at the time when the light entering the aperture 127 is reflected on the boundary between the protrusion 125 and the light-shielding coating layer 126 is diminished for lowering light loss. Therefore, if such optical fiber 120 is used as a light probe for the photon scanning tunneling microscope, it becomes possible to improve the detection efficiency.

Figure 22:
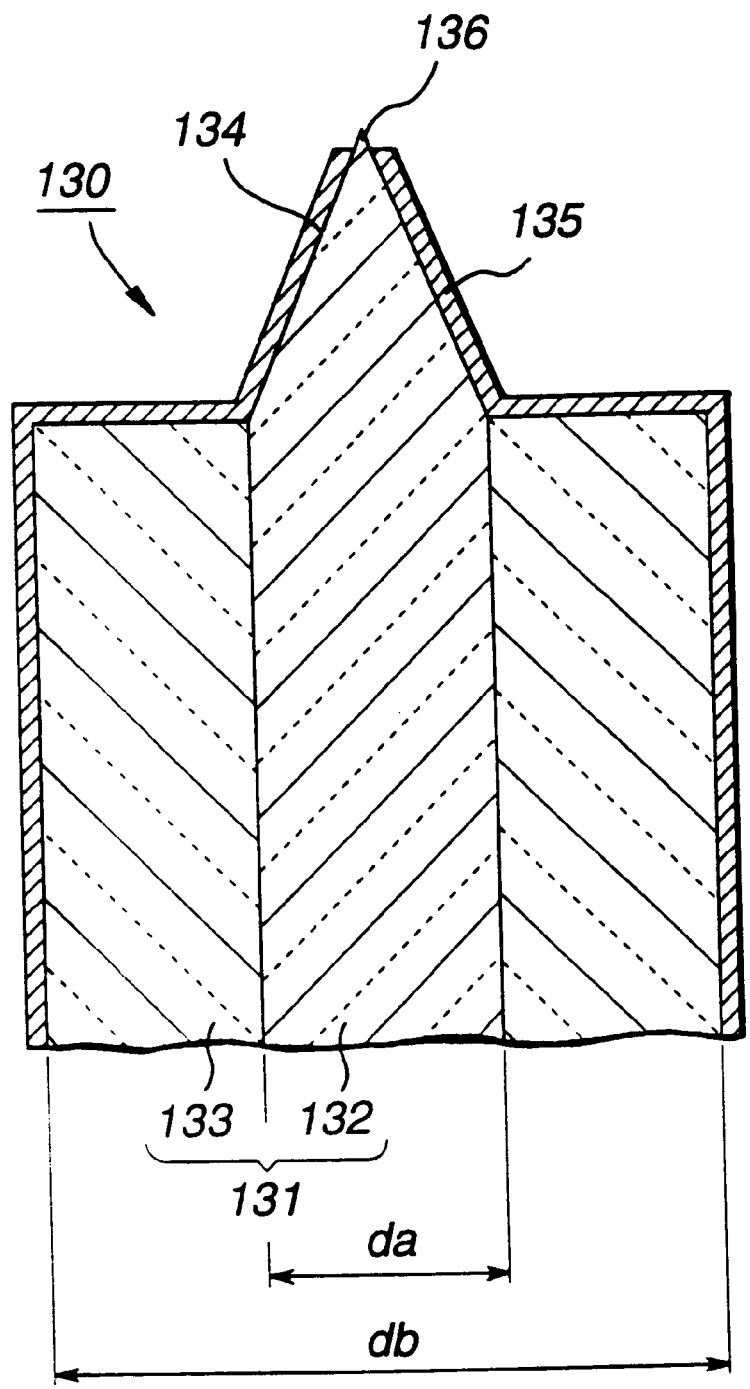
FIG. 22 illustrates a structure of an optical fiber according to a fourteenth embodiment of the present invention.

An optical fiber according to a fourteenth embodiment of the present invention includes a protrusion 134 obtained by conically sharpening a core 132 extended from one end of a cladding 133, a light-shielding coating layer 135 formed on the surface of the protrusion 134 and an aperture 136 obtained on exposing the foremost part of the protrusion 134 from the light-shielding coating layer 135, as shown for example in FIG. 22.

Figure 23:
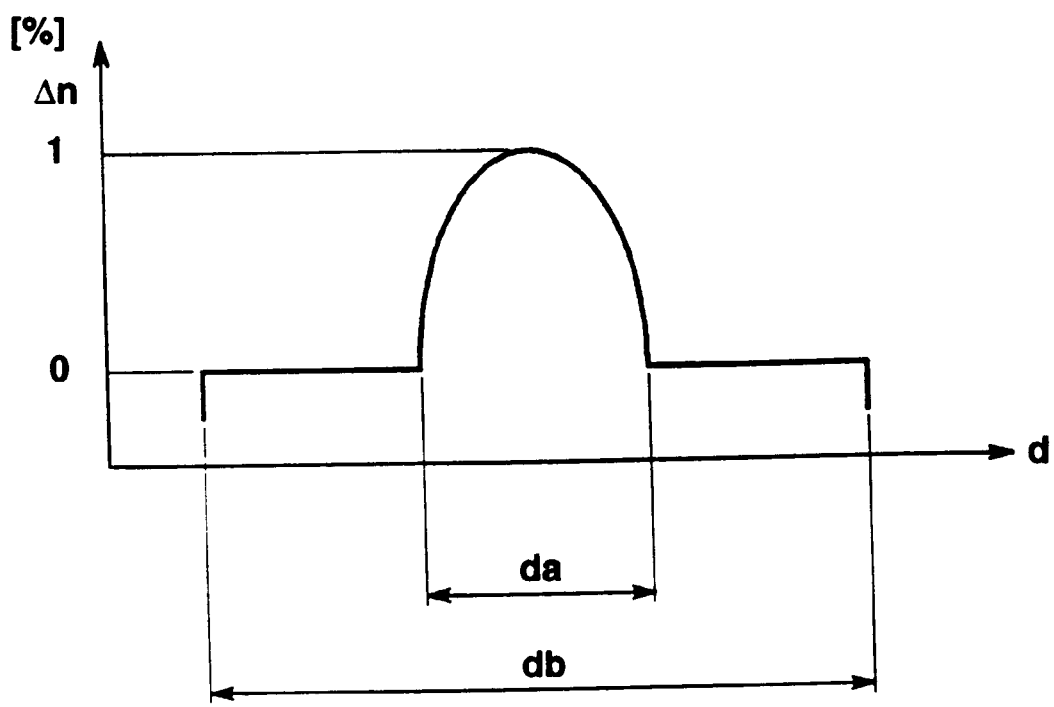
FIG. 23 shows the distribution of the refractive index of the optical fiber according to the fourteenth embodiment.

This optical fiber 130 is made up of multi mode fibers, as shown for example in FIG. 23, with the specific refractive index difference Δn being 1% and with the refractive index distribution being of the graded index type in which the refractive index is changed gradually. The apex angle (cone angle) of the protrusion 134 is on the order of 50°, with the radius of curvature at the foremost part being on the order of 5 nm, as shown for example in FIG. 24.

In the optical fiber 60 shown for example in FIG. 12, the detection light incident on the protrusion 65 via aperture 68 is propagated in the core 12 with a sole propagation mode. At this time, the light incident on the protrusion is not necessarily coupled to the sole propagation mode, so that loss is incurred.

Conversely, the optical fiber 130 shown in FIG. 22 uses a multi mode fiber and is capable of propagating the light of plural propagation modes, so that any light incident on the protrusion 134 at the aperture 136 at an angle within the critical angle of reflection at the boundary between the core 132 and the cladding 133 can be propagated. This leads to improved coupling efficiency and an improved detection light pickup efficiency.

A reduced-diameter portion may be provided by reducing the diameter of the cladding 133 at the proximal end of the protrusion 135, as in the eleventh embodiment shown in FIG. 12. If the optical fiber is used in the above-described photon scanning tunneling microscope, it becomes possible to prevent the cladding 133 from impinging on the sample surface.

Figure 27:
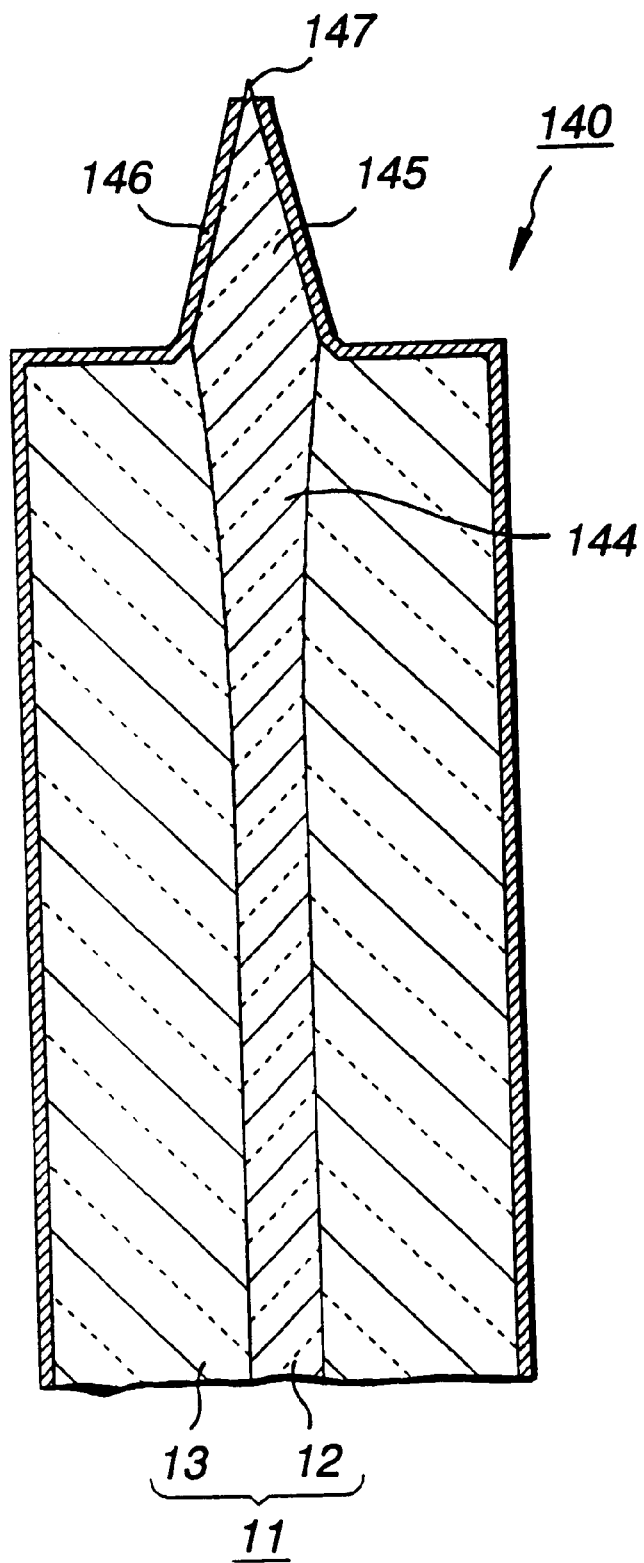
FIG. 27 illustrates a structure of an optical fiber according to a fifteenth embodiment of the present invention.

An optical fiber according to a fifteenth embodiment of the present invention has a core diameter increasing portion 144 obtained on gradually allowing a dopant in the core 12 to be dispersed into the cladding 13 for equivalently gradually increasing the diameter of the core 12, as shown for example in FIG. 27. The present optical fiber 140 has, at the foremost part of the core diameter increasing portion 144, a protrusion 145 obtained on conically sharpening the core 12 extended from the cladding 13, a light-shielding coating layer 146 formed on the surface of the protrusion 145 and an aperture 147 formed by exposing the foremost part of the protrusion 145 from the coating layer 146. With the above-described structure of the optical fiber 140, the core diameter increasing portion 144 and the protrusion 145 are of the refractive index distribution similar to those of the multi mode fiber. The result is that the critical angle can be increased as in the case of the optical fiber 130 shown in FIG. 22, thus improving the detection light pickup efficiency.

Figure 28:
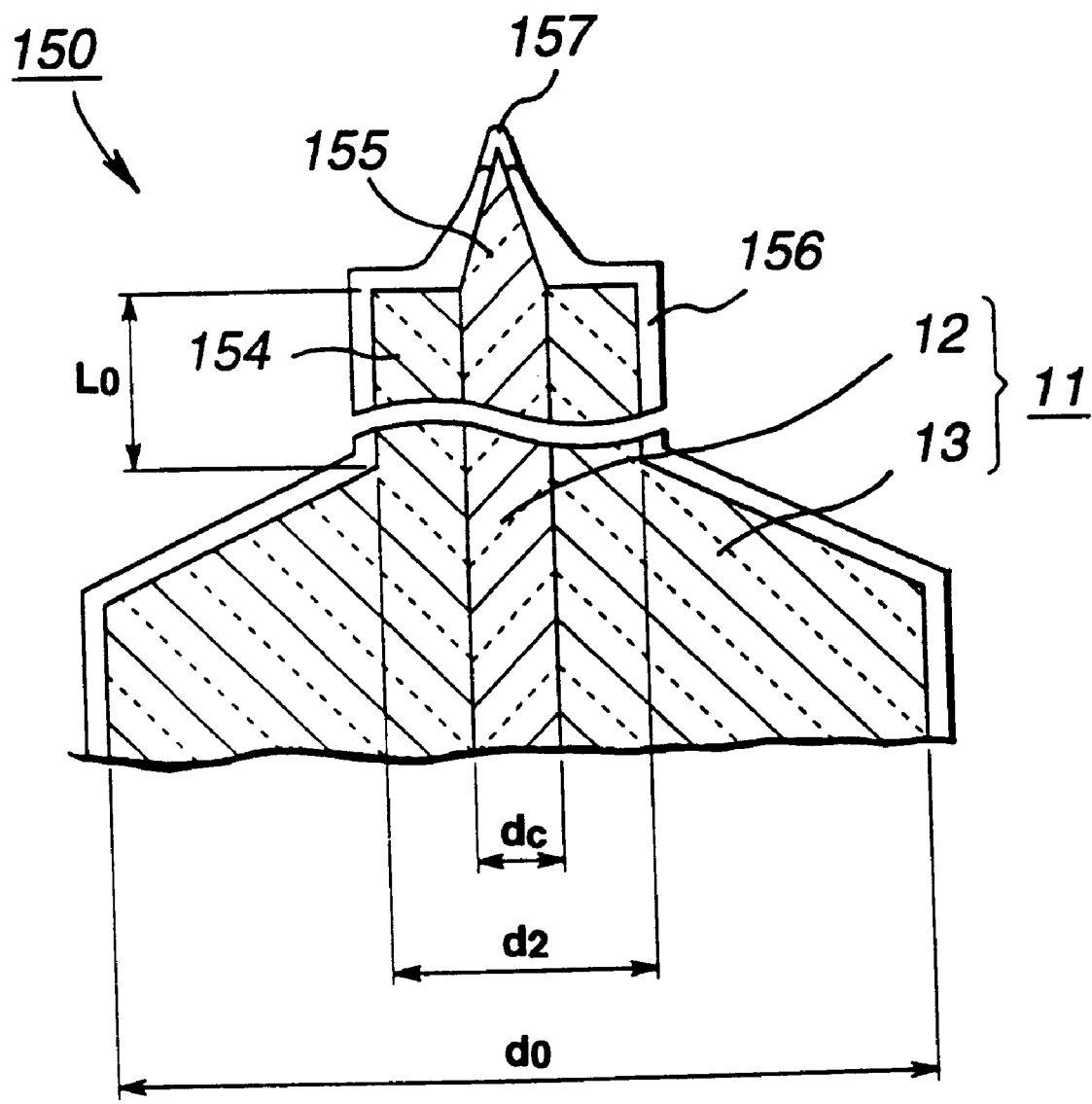
FIG. 28 illustrates a structure of an optical fiber according to a sixteenth embodiment of the present invention.

Similarly to the optical fiber 80 according to the ninth embodiment, shown in FIG. 14, the optical fiber according to a sixteenth embodiment of the present invention has a reduced-diameter portion 155, a protrusion 155 and a hydrophobic coating layer 156 formed of, for example, synthetic resin, as shown for example in FIG. 28. The present optical fiber 150 also has a coating layer 157 of, for example, quartz, doped with a pigment, on the surface of an aperture formed by exposing the foremost part of the protrusion 155 from the hydrophobic coating layer 155. The coating layer 157 is formed to a thickness of the order of 40 nm on the surface of the protrusion 155, as shown for example in FIG. 29.

With the above-described structure of the optical fiber 150, the dye in the coating layer 157 emits light in response to the light incident on the coating layer 157, this light being incident via the protrusion 155 on the core 12. Thus the optical fiber 150 operates as a detector for light detection. With the optical fiber 150, since quartz or the like doped with the pigment is deposited on the surface of the foremost part of the protrusion 155, the dye peeling strength becomes higher than in the case where the pigment is simply deposited on the surface of the foremost part of the protrusion 155. The result is the optical fiber 150 with improved durability.

By doping quartz of the coating layer 157 with a substance the optical properties of which are changed with the surrounding environment, such as pH, in place of the above-mentioned pigment, the optical fiber 150 operates as an optical fiber sensor for detecting the surrounding environment of the coating layer 157.

Figure 29:
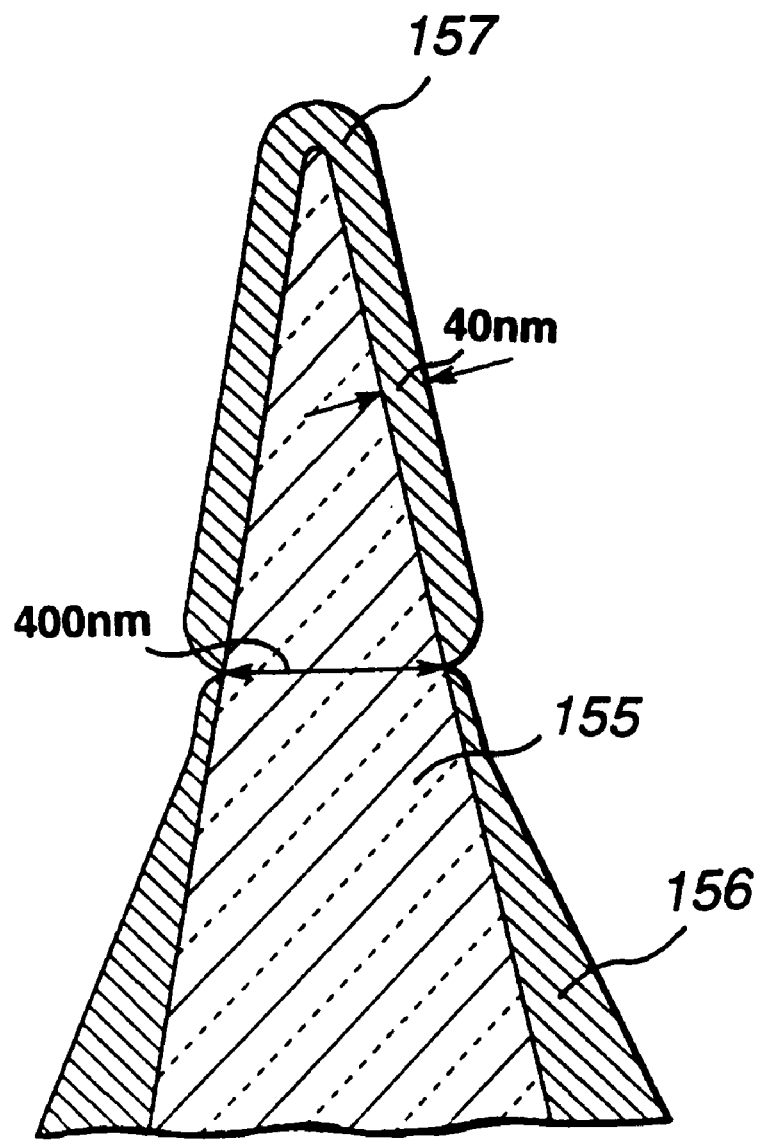
FIG. 29 shows a specified structure of an apex of the optical fiber of the sixteenth embodiment.
Figure 30:
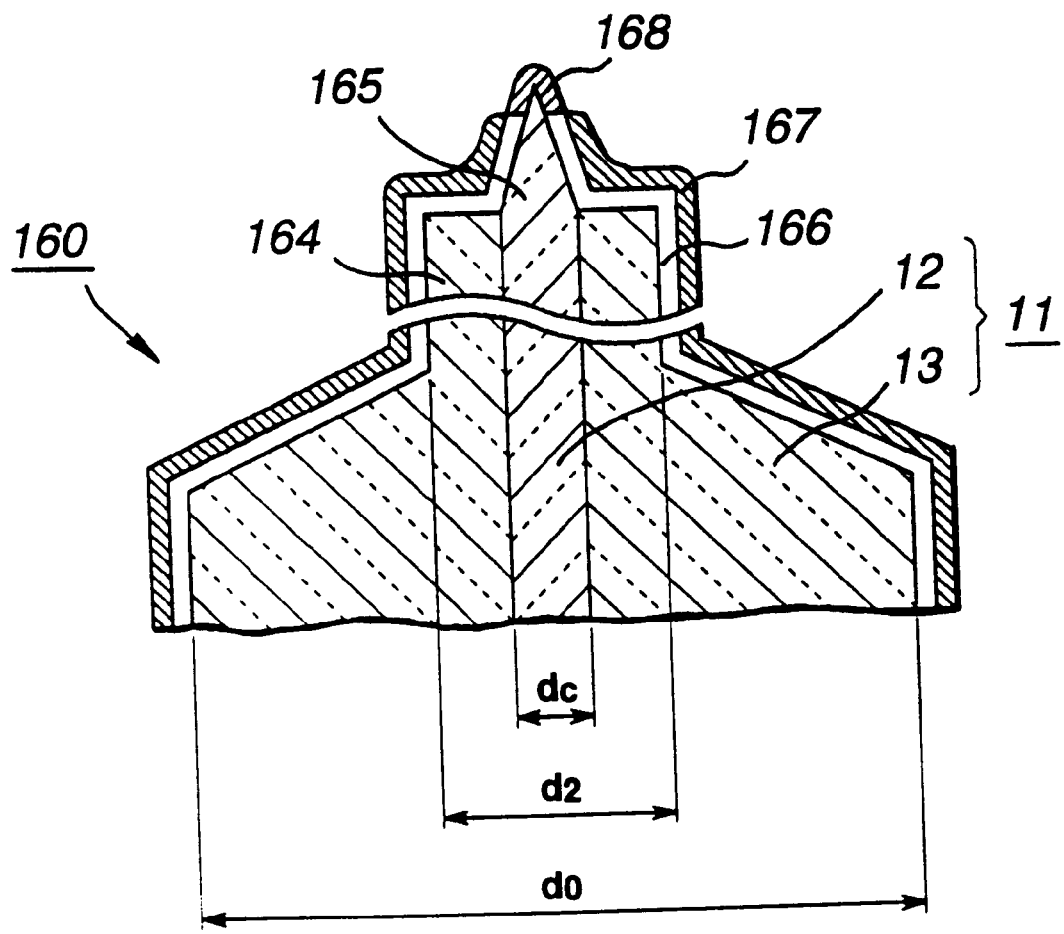
FIG. 30 illustrates a structure of an optical fiber according to a seventeenth embodiment of the present invention.

Similarly to the optical fiber 150 of the sixteen embodiment shown in FIG. 28, the optical fiber of a seventeenth embodiment of the present invention has a reduced-diameter portion 164 and a protrusion 165, as shown for example in FIG. 30. The present optical fiber 160 has a light-shielding coating layer 166 on the surface of a protrusion 165, a hydrophobic coating layer 167 of, for example, synthetic resin, on the surface of the light-shielding coating layer 166, and a coating layer 158 of, for example, quartz, doped with dye, on the surface of an aperture obtained by exposing the foremost part of the protrusion 165 from the light-shielding coating layer 166 and the hydrophobic coating layer 167. Similarly to the optical fiber 150 shown in FIG. 29, the coating layer 158 is formed with a thickness of the order of 40 nm on the surface of the protrusion 165.

Similarly to the optical fiber 150, the above-described structure of the optical fiber 160 operates as a detector for light detection. Since the optical fiber 160 has the light-shielding coating layer 166, operating as a light-shielding portion for interrupting the light radiated on an area other than the coating layer 168 of the optical fiber 160, it becomes possible to reduce any adverse effects of extraneous light for improving the detection efficiency.

Figure 31:
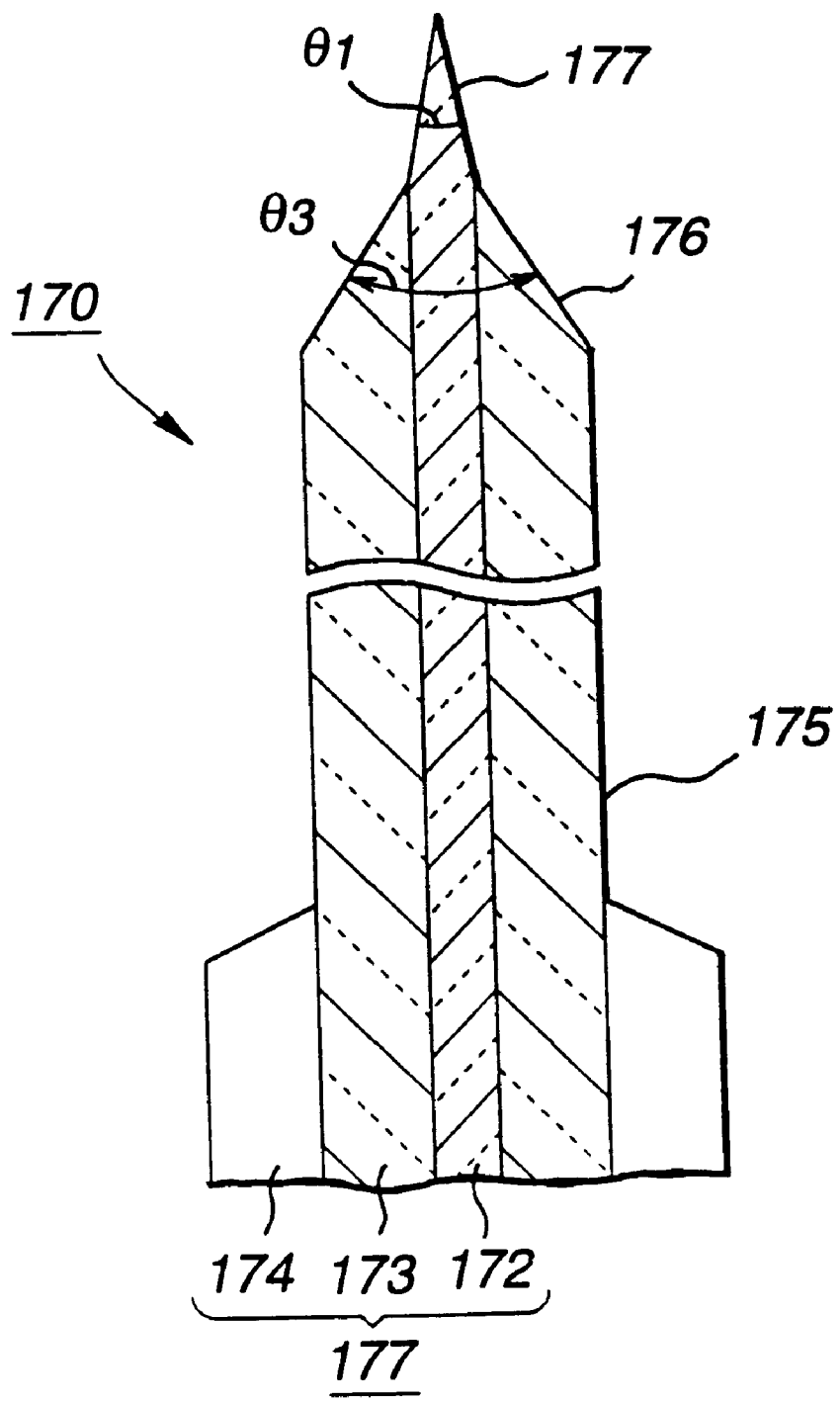
FIG. 31 illustrates a structure of an optical fiber according to an eighteenth embodiment of the present invention.

An optical fiber according to an eighteenth embodiment of the present invention is a double-core optical fiber 171 has two sorts of cores 172, 173 of different refractive indices and a cladding 174, as shown for example in FIG. 31. The optical fiber 170 of the present embodiment has such optical fiber 171 having at its one end an exposed portion 175 of the core 173 from the cladding 174, a tapered portion 176 of the core 173 at the end of the exposed portion 175, and a conically sharpened portion 177 of the core 172 extended from the end of the tapered portion 176.

The cladding 174 and the cores 172, 173 of the optical fiber 171 are formed of pure quartz and quartz doped with germanium dioxide, respectively. The doping amounts of germanium dioxide to the cores 172, 173 are 0.9 mol % and 0.2 mol %, respectively. The germanium dioxide doping ratio is higher for the inner core 172 than for the outer core. The apex angles of the tapered portion 176 and the protrusion 177 are 130° and 62°, respectively.

Similarly to the optical fibers 10, 20 of the first and second embodiments, the above-described optical fiber 170 operates as an optical probe for detecting the evanescent light in the photon scanning tunneling microscope. There is no risk of the peripheral part of the cladding 174 impinging on the sample surface for preventing the sample surface or the optical fiber 170 from becoming damaged.

The above-described optical fiber 170 can be produced easily because it can be produced by one step etching on the condition that the composition of the etching solution is varied depending on the composition of the cores 172, 173 and the cladding 174.

Figure 32:
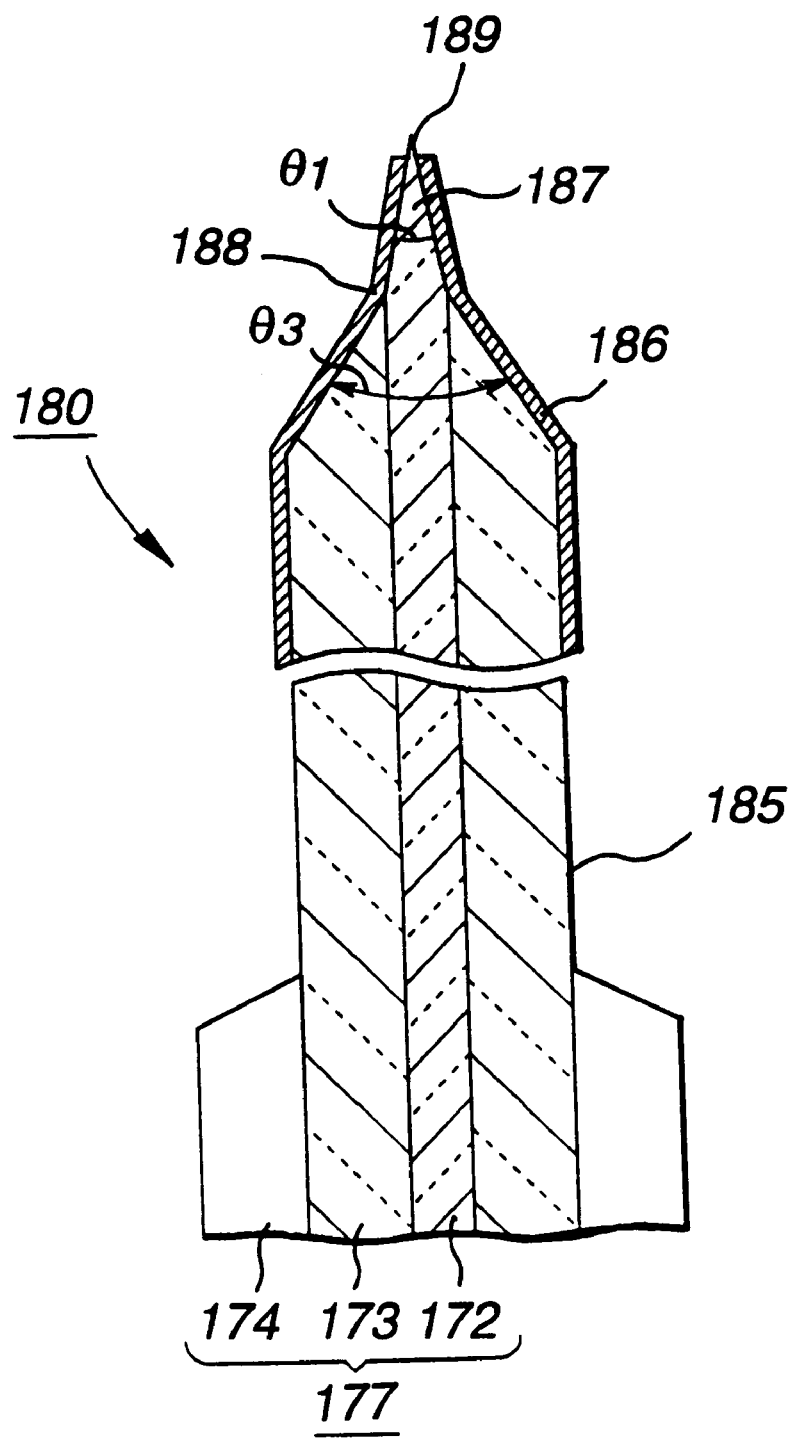
FIG. 32 illustrates a structure of an optical fiber according to a nineteenth embodiment of the present invention.

Similarly to the optical fiber 170 shown for example in FIG. 32, an optical fiber of a nineteenth embodiment of the present invention has at an end of the double-core optical fiber 171 an exposed portion 185 of the core 173 exposed from the cladding 174, a tapered portion 186 of the core 173 on the foremost part of the core 173, and a conically sharpened protrusion 187 of the core 172 protruded from the foremost part of the tapered portion 186. The optical fiber 170 also has a light-shielding coating layer 188 on the surface of the protrusion 187 and an aperture 189 formed by exposing the foremost part of the protrusion 187 at the light-shielding coating layer 188.

Similarly to the above-described nineteenth embodiment, the above-described optical fiber 180 operates as an optical probe for detecting the evanescent light in the photon scanning tunneling microscope. There is no risk of the peripheral part of the cladding 174 impinging on the sample surface for preventing the sample surface or the optical fiber 170 from becoming damaged.

Moreover, since the light-shielding coating layer 188 on the surface of the protrusion 187 operates as a light-shielding portion interrupting the detection light, the detection light can enter the optical fiber 180 only at the aperture 189 for improving the detection efficiency.

An optical fiber according to a twentieth embodiment of the present invention includes, at one end of the optical fiber 11, a protrusion 194 obtained on sharpening the core 12 extended from the cladding 13, a detection end 195 having an enlarged apex angle at the foremost part of the protrusion 194, a light-shielding layer 196 on the surface of the protrusion 194, and an aperture formed by exposing the foremost part of the detection end 195 from the light-shielding coating layer 196.

Figure 34:
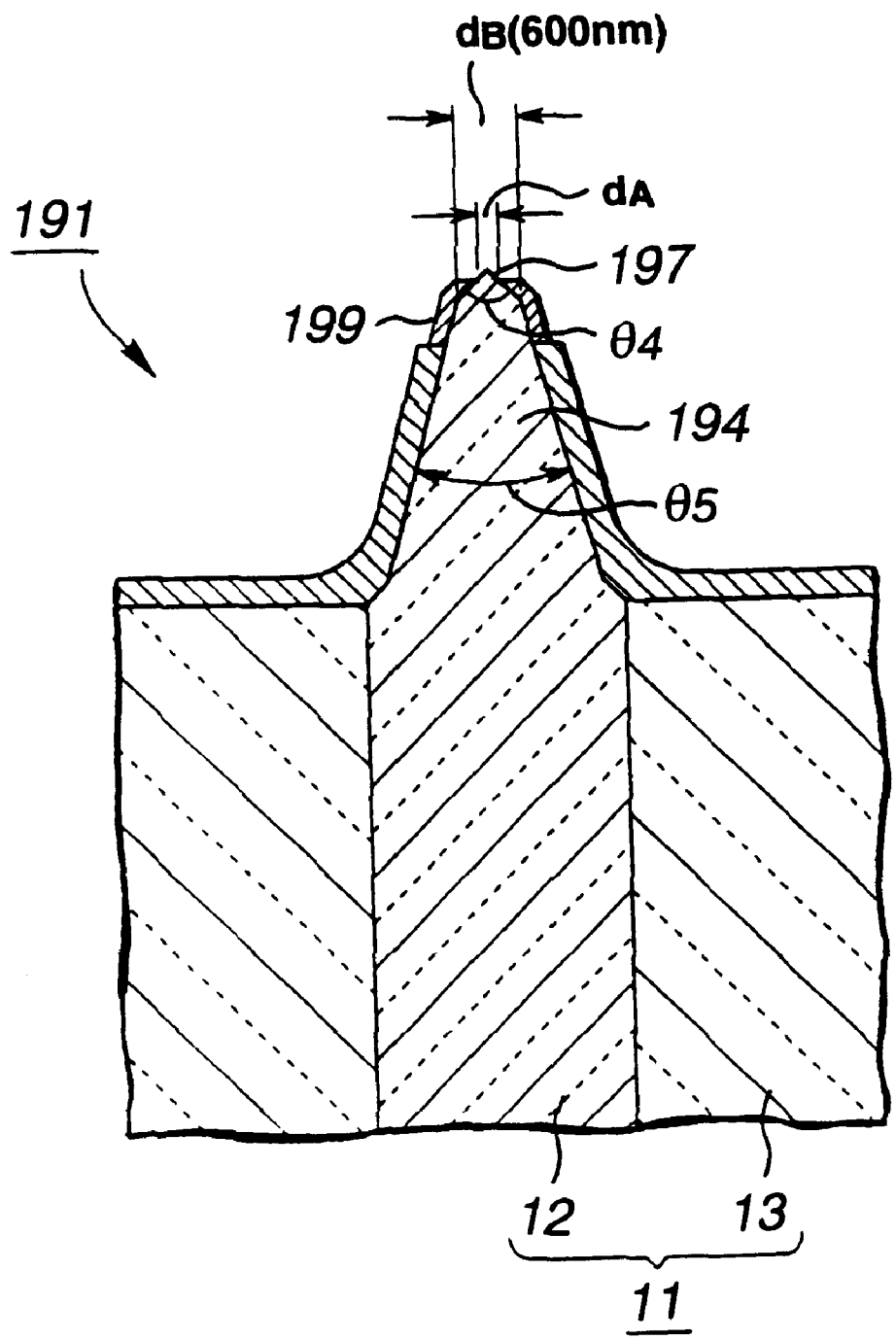
FIG. 34 illustrates another specified structure of a light-confining coating layer of the optical fiber according to the twentieth embodiment.

Alternatively, the light-shielding coating layer 196 may be formed by a first coating layer 198 on the surface of the protrusion 194 and a second coating layer 199 on the surface of the detection end 195, with the foremost part of the detection end 195 having the aperture 197 exposed from the second coating layer 199, as shown in FIG. 34. The apex angle of the protrusion 194 is on the order of 20°, while the diameter of the proximal end of the detection end 195 is 400 to 600 nm and the apex angle (cone angle) of the detection end 195 is on the order of 50° to 90°.

Figure 35:
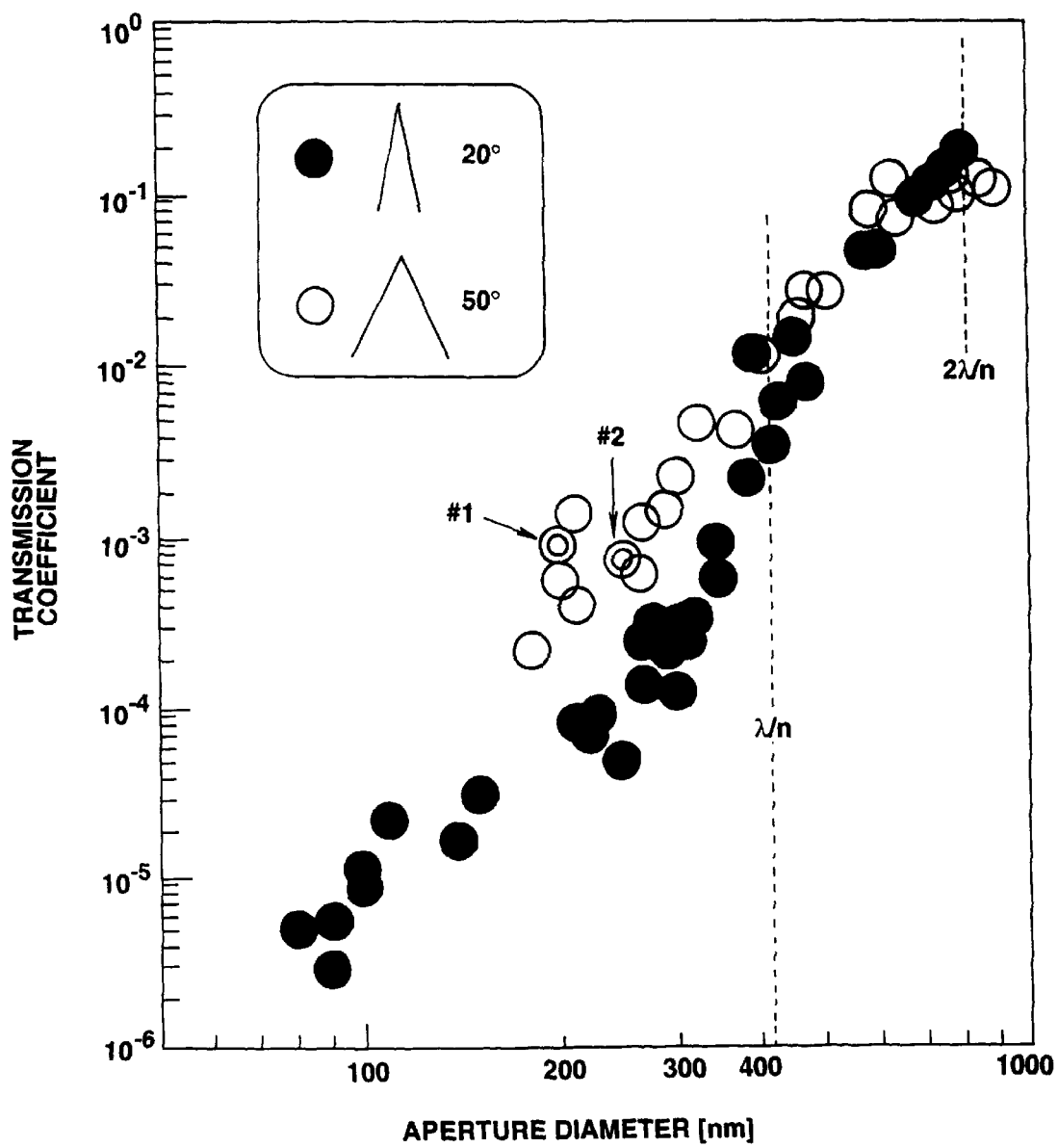
FIG. 35 illustrates the relation between the apex angle (cone angle) at the foremost part of the optical fiber and the transmission coefficient.

If, in the optical fiber 80 shaped as shown for example in FIG. 14, the transmission coefficient of the detection light entering and exiting the aperture 87 is found, under varying diameters of the aperture 87, the relation shown in FIG. 35 is reached. If this relation is found for the optical fiber 80 having the apex angle of the protrusion of 20° and 50°, it is found that the transmission coefficient is substantially equal for the apex angle of the protrusion 85 of 20° and 50° for an area in which the diameter of the aperture 87 is not less than approximately the wavelength ($\lambda$/n, where n is the specific refractive index of the core 12) of the detection light in the core 12.

It is however seen that, if the diameter of the aperture 87 is smaller than the wavelength of the detection light in the core 12, the transmission coefficient for the apex angle of the protrusion 85 of 20° becomes significantly smaller than the transmission coefficient for the apex angle of 50°. The reason is that, for the apex angle of 20° of the protrusion 85, the distance from a position at which the diameter of the protrusion 195 is not larger than the wavelength of the detection light as far as the foremost part of the detection end 195 becomes longer than that for the apex angle of 50°, with the result that light loss becomes significant at a portion where the diameter of the tip 75 becomes not larger than approximately the wavelength. Therefore, in the optical fiber of the twentieth embodiment, the distance from the position at which the diameter of the protrusion 194 becomes not larger than the wavelength of the detection light as far as the foremost part of the detection end 195 is reduced by setting the diameter $d_A$ of the aperture 195 to approximately 600 nm larger than the wavelength of the detection light of 400 nm and by setting the apex angle of the detection end 195 to 50° to 90°. The transmission coefficients for the diameter $d_B$ of the aperture 197 of 200 nm and 250 nm are approximately $1.0 \times 10^{-3}$, $9.0 \times 10^{-4}$ as indicated by #1 and #2, respectively, in FIG. 35. This enables the detection light to be attenuated with the optical fiber 190 for improving light detection sensitivity for assuring measurement with a high S/N ratio.

Since the apex angle of the optical fiber 190 is set to approximately 20°, as described above, the foremost part of the cladding 13 may be spaced apart from the detection end 195 for preventing the foremost part of the cladding 13 from coming into contact with the article being detected.

Figure 36:
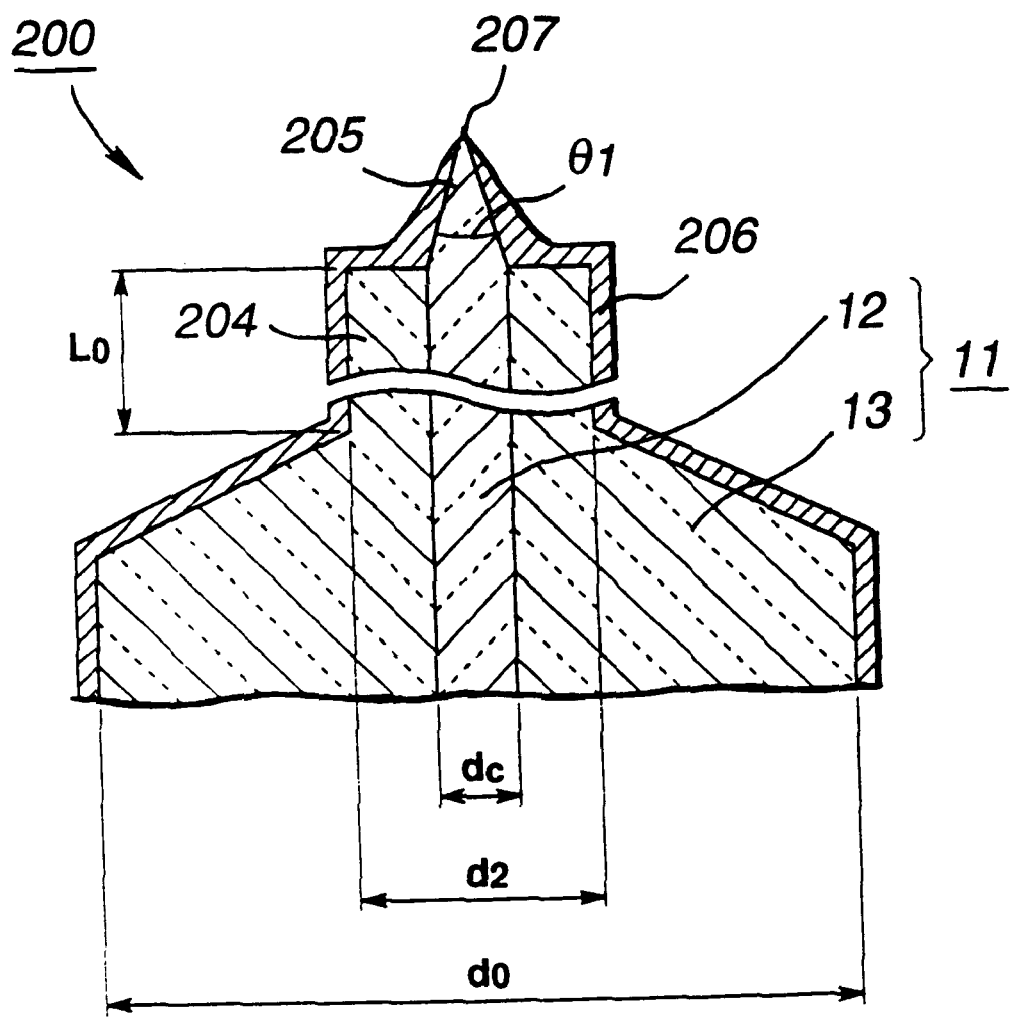
FIG. 36 illustrates a structure of an optical fiber according to a twenty-first embodiment of the present invention.

Similarly to the optical fiber 80 of the ninth embodiment, shown in FIG. 14, an optical fiber according to a twenty-first embodiment of the present invention has a reduced-diameter portion 204 and a protrusion 205, as shown for example in FIG. 36. The optical fiber 150 has a coating layer 206 of, for example, a gel layer or layer of an amorphous material formed by heating the gel layer. The foremost part of the protrusion 205 has an aperture 207 formed by exposing the foremost part of the coating layer 206.

The light propagated in the protrusion 205 of the optical fiber 200 is reflected at an interface between the core 12 and the coating layer 206 so as to be radiated via aperture 207. Thus the light reflectance at the interface may be improved as compared to that in the case where the coating layer 206 is not provided thus improving the transmission efficiency.

Similarly to the optical fiber 200 of the twenty-first embodiment, shown in FIG. 36, an optical fiber according to a twenty-second embodiment of the present invention has a reduced-diameter portion 214 and a protrusion 215. The optical fiber 210 has a coating layer of an amorphous material, such as quartz, on the surface of the protrusion 215, a light-shielding coating layer 217 on the surface of the protrusion 215, and an aperture 218 formed by exposing the foremost part of the protrusion 215 from the amorphous coating layer 216 and the light-shielding coating layer 217.

If the amorphous layer is not provided, the light leaking outside of the protrusion 215 is partially reflected at the interface between the protrusion and the shielding coating layer 217 and partially absorbed. The light intensity is attenuated by repetition of reflection. Since the amorphous coating layer 216 is provided on the surface of the protrusion 215, and hence the light reflectance on the interface of the protrusion 215 can be increased, the light propagated through the protrusion 215 is diminished for improving the light transmission efficiency.

With the optical fibers of the first to twenty-second embodiments, the tip or the protrusion operates as a lens for collecting the light propagated through the core. Since the collected light may be outputted at the aperture to enter a light waveguide, the optical fiber operates as an optical coupling element having a high optical coupling efficiency.

By radiating the light collected by the tip or the protrusion on an organic thin film, the optical fiber operates as a recording light source so that the information can be recorded with high density on the organic thin film.

With a method for producing an optical fiber according to the present invention, an end of an optical fiber made up of a core and a cladding is etched to form a tip by sharpening the core. A light-shielding coating layer is formed on the surface of the tip by etching the light=shielding coating layer.

In a method for producing an optical fiber according to a twenty-third embodiment of the present invention, an optical fiber shaped as shown in FIG. 4 is produced using an optical fiber having a cladding diameter $d_0$ and a core diameter $D_c$ as a starting material.

The optical fiber producing method includes a sharpening step of etching an end of an optical fiber for forming a conically sharpened tip extending from the outer periphery of the cladding as far as the center of the core, a coating step of coating a light-shielding material on the surface of the tip and an aperture forming step of etching the light-shielding layer formed by the coating step for forming an aperture by exposing the foremost part of the tip.

The sharpening step includes a first etching step of forming a tapered portion formed by tapering the cladding at one end of the optical fiber, a second step of forming a recess in the core receded from the foremost part of the cladding of a tapered portion of the cladding, a third etching step of forming a flat portion in the foremost part of the core and in the foremost part of the tapered portion, and a fourth etching step of forming a conically sharpened tip extending from the outer periphery of the cladding towards the center of the core.

The first to fourth steps of sharpening the optical fiber is first explained.

The case of using an optical fiber having the diameter $d_0$ of the cladding 13 of 125 $\mu$m and the diameter $d_c$ of the core 12 of 3.4 $\mu$m and an addition ratio in the core of germanium dioxide $GeO_2$ as high as 25 mol % is explained.

Figure 38A:
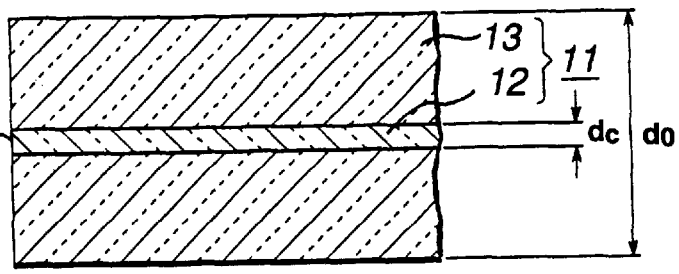
FIGS. 38(A)–(38(E) illustrate an etching step of a method for producing an optical fiber according to a twenty-third embodiment of the present invention.

First, in the first etching step, one end 220 of an optical fiber 11 shown in FIG. 38A is etched in an interface between hydrofluoric acid and a liquid lighter in specific gravity than hydrofluoric acid, such as spindle oil or silicon oil for 22 to 30 minutes if at room temperature.

Figure 38B:
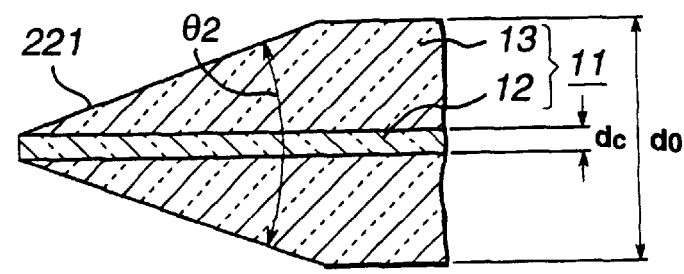
Figure 38C:
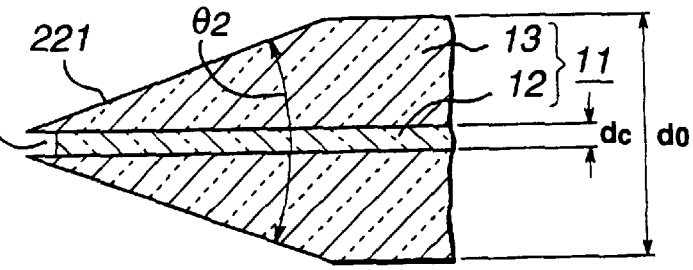
Figure 38D:
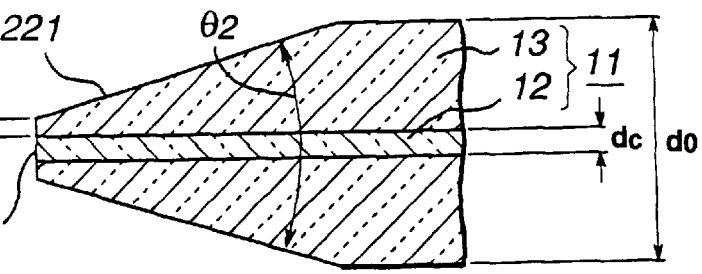

If an end 220 of the optical fiber is etched on the interface between hydrofluoric acid and oil, an interface 230 around the optical fiber 11 is raised by surface tension of hydrofluoric acid and oil thus forming a meniscus. On this meniscus portion, the cladding 13 contacted with hydrofluoric acid is etched and reduced in diameter as it keeps its columnar shape. If the optical fiber 11 is etched and the cladding 13 is reduced in diameter, the height Hm of this meniscus is reduced, as shown in FIG. 38B. Thus, the height Hm of the meniscus is decreased until the cladding 13 is entirely etched, thus forming a tapered portion 221, as shown in FIG. 38C.

If the core 12 at the foremost part of the tapered portion 221 is exposed via the cladding 13, the exposed core 12 is readily etched, since the etching rate of the core 12 in hydrofluoric acid is faster than that of the cladding 13, thus forming the conical tapered portion 221 at the end of the optical fiber 11. If the spindle oil with the specific gravity of 0.833 g/cm³ is used, the apex angle $\theta_2$ is on the order of 24° if the silicone oil with the specific gravity of 0.935 g/cm³ is used. This apex angle $\theta_2$ is determined depending on, for example, specific gravity or viscosity, thus assuring high reproducibility.

Then, in the second etching step, the tapered portion 221 is etched for two to three minutes, for example, by hydrofluoric acid, for forming a recess 222 in the core 12 receded from the foremost part of the cladding 13 of the tapered portion 221. Since the core of the present optical fiber 11 is doped with germanium dioxide $GeO_2$ to a high proportion, and hence the etching rate of the core 12 in hydrofluoric acid is significantly higher than that of the cladding 13, the portion of the core 12 at the foremost part of the tapered portion 221 is etched first thus fro forming the recess 222 in the core 12 receded from the foremost part of the cladding 13 of the tapered portion 221.

Meanwhile, the etching of the second etching step may be carried out in continuation to the first etching. That is, it suffices if, after the end of the first etching step, the optical fiber is further intruded into hydrofluoric acid for carrying out etching for a pre-set time. Moreover, if the etching time for this second etching step is increased from the above-mentioned two minutes, the cladding 13 may be reduced in diameter. If the diameter of the cladding 13 of a given optical fiber is 125 $\mu$m, the diameter of the cladding 13 after such etching is decreased with increase in etching time as indicated by a square-shaped symbol in FIG. 46. For example, if the etching time is 2 minutes, the diameter of the cladding 13 is 70 $\mu$m, whereas, if the etching time is 3 minutes, the diameter of the cladding 13 is 50 $\mu$m. Thus, by controlling the etching time, the diameter 13 of the cladding 13 may be set to a desired value after the etching.

Figure 46:
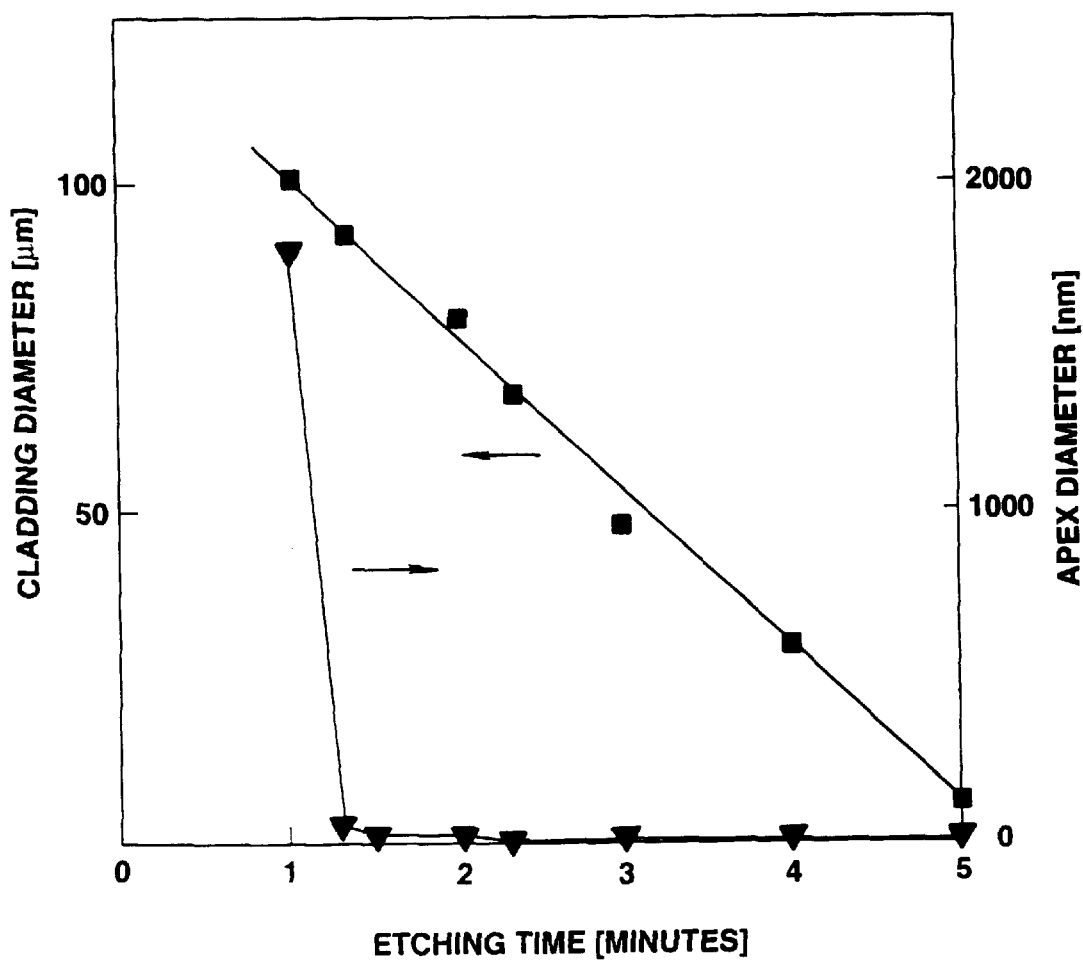
FIG. 46 shows the relation between the etching time in the second etching step in the twenty-third embodiment on one hand and the clad diameter and the radius of curvature at an apex.

Meanwhile, a triangular symbol in FIG. 46 indicates the radius of curvature at the foremost part of the ultimately obtained tip 14 when the etching time is varied. It is seen that, by carrying out the etching for 1.5 to 2 minutes, the radius of curvature of the foremost part of the tip 14 may be reduced to an extremely small value.

Then, in the third etching step, the tapered portion 221 is etched for 5 to 10 minutes, for example, using a buffered hydrogen fluoride solution having a ratio X for ammonium fluoride, for forming a flattened end 223 of the cladding at which the foremost part of the core 12 and that of the tapered portion 221 become flush with each other. It suffices if, by the etching of the third etching step, the cladding 13 ahead of the recess 222 can be etched, there being no limitation on the composition of the etching liquid if the etching rate of the core 12 by the buffered hydrogen fluoride solution having the proportion X for ammonium fluoride is not high. Next, in the fourth etching step, the tapered portion 221 is etched for, for example, 60 to 90 minutes, by an etching solution composed of a buffered hydrogen fluoride solution having a volumetric ratio X of ammonium fluoride of 10, as an example.

If end faces of the core 21 of quartz $SiO_2$ doped with germanium dioxide $GeO_2$ and the cladding 13 formed of quartz $SiO_2$ are kept in contact with a buffered hydrogen fluoride solution having a volumetric ratio of an aqueous solution of ammonium fluoride with a concentration of 40 wt %, hydrofluoric acid with a concentration of 50 wt % and water X:1:Y, where Y is arbitrary, the cladding 13 and thSiF$_6$+2H$_2$O

H$_2$SiF$_6$–2NH$_3$–(NH)$_2$SiF$_6$ for GeO$_2$:
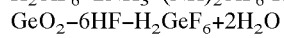
GeO$_2$–6HF–H$_2$GeF$_6$+2H$_2$O
H$_2$GeF$_6$–2NH$_3$–(NH)$_2$GeF$_6$ Meanwhile, the core 12 formed of quartz doped with germanium dioxide $GeO_2$ and the cladding 13 formed of quartz are different from each other in the rate of dissolution (etching rate) with respect to the buffered hydrogen fluoride solution. This difference in the dissolution rate (etching rate) is strongly correlated with the volumetric ratio X of ammonium, fluoride, such that, although there exists slight variation depending on the liquid temperature, the etching rates of the core 12 and the cladding 13 are substantially equal to each other for X approximately equal to 1.7, the etching rate of the core 12 becomes faster for X smaller than 1.7 and the etching rate of the cladding 13 becomes faster for X larger than 1.7. Meanwhile, the value of X for the etching rate of the core 12 and that of the cladding 13 becoming substantially equal to each other varies in a range from 1.5 to 1.7 depending on parameters, such as temperature.

Figure 40:
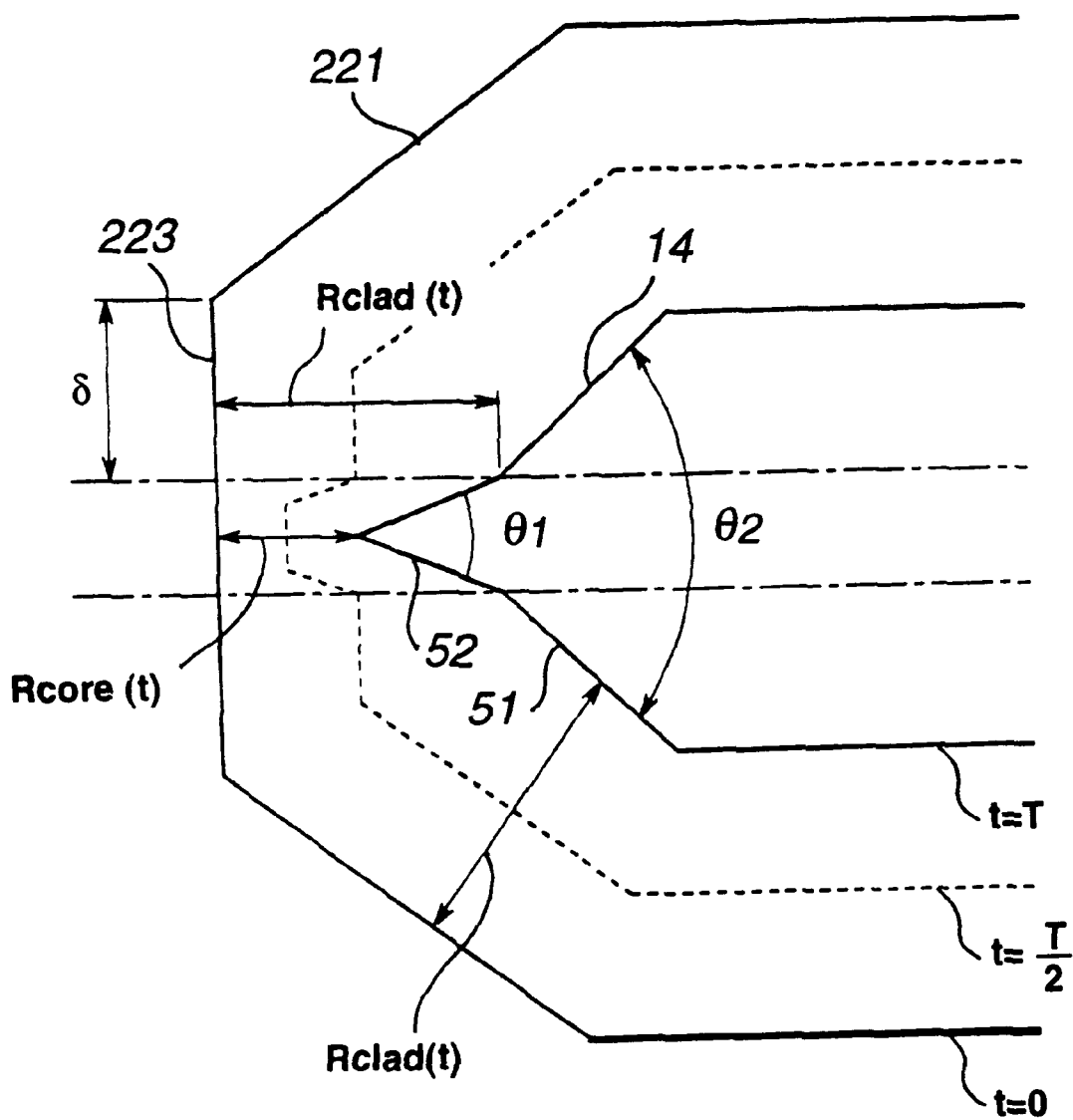
FIG. 40 illustrates a fourth etching step of the method for producing an optical fiber according to the twenty-third embodiment.

Thus, if the optical fiber 11 having the tapered portion 221 and the flattened end 223 as above described are etched in the etching solution having X larger than 1.7, etching proceeds as the cone angle $\theta_2$ of the cladding 13 is maintained, as shown in FIG. 40, schematically showing the shape of the optical fiber at the time of start of etching (t=0), during etching (t=T/2) and at the time of end of etching (t=T), where T is the time until end of etching.

Figure 38E:
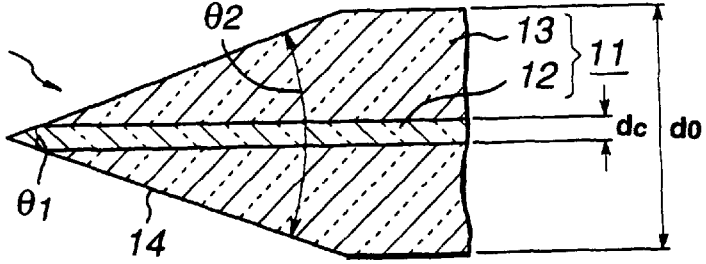
Figure 39A:
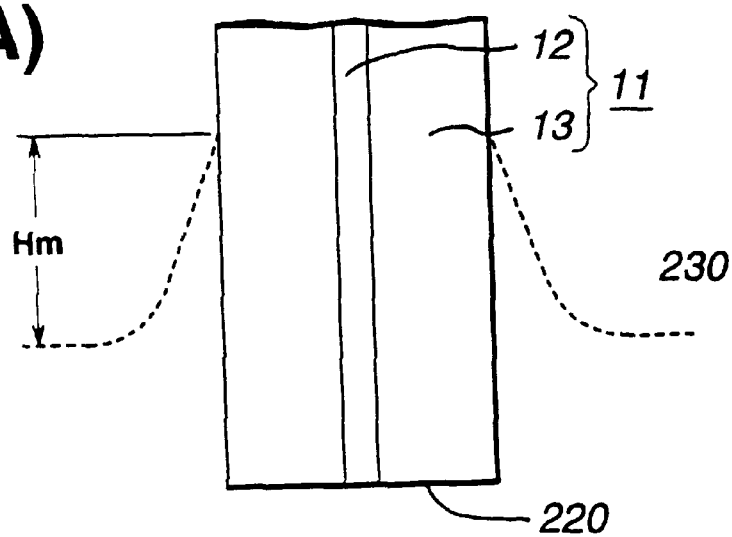
FIGS. 39(A)–39(C) illustrate a first etching step of the method for producing an optical fiber according to the twenty-third embodiment.
Figure 39B:
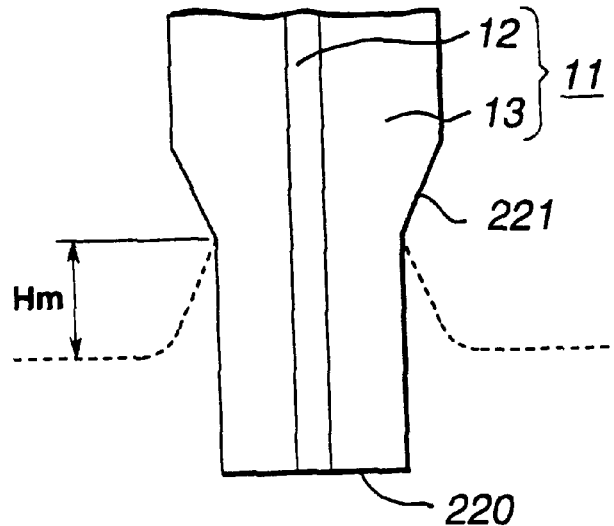
Figure 39C:
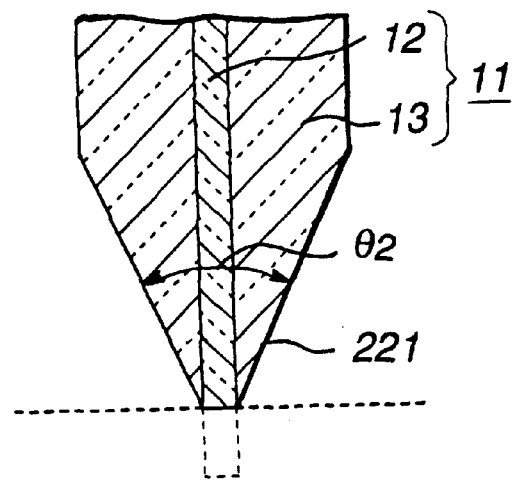

Since the etching rate of the core 12 is faster than that of the cladding 13, the cladding 13 is etched first with progress in etching, with the core 12 being protruded gradually. Since the core protruded from the cladding 13 is also etched cladding 13 towards the center of the core 12 is formed, as shown in FIG. 38E. The cone angle $\theta_1$ at this time is determined depending on the etching rates for the core 12 and cladding 13, as represented by the following equation:

$$\sin(\theta_2/2)=R_{core}/R_{clad}$$

where $R_{core}$ and $R_{clad}$ denote the core etching rate and the cladding etching rate, respectively.

The etching solution used for the fourth etching step is not limited to the etching solution with the volumetric ratio X of ammonium fluoride of 10. For example, X may be set to 20 (X=20).

Therefore, an etching solution having an ammonium fluoride: hydrofluoric acid:water ratio of X:1:1, where X>1.7, or 10:1:Y, where Y<30, may be used in the third etching step and the etching of the fourth etching step may be carried out continuously using this etching solution for shortening the time of the third etching and the fourth etching.

Specifically, if such an etching solution having the ammonium fluoride:hydrofluoric acid:water ratio of 10:1:1, it suffices if the etching is carried out for approximately 90 minutes throughout the third and fourth etching steps.

Since the density of germanium dioxide $GeO_2$ in the vicinity of the center of the core 12 is higher in the optical fiber 11, the etching rate of the fourth etching step in the vicinity of the core 12 in the etching solution with X=10 is slightly faster than that in the vicinity of an outer rim portion of the core 12, so that the radius of curvature at the foremost part of the tip 14 may be diminished.

Since the cone angle $\theta_1$ of the tip 14 formed by the fourth etching step is determined by the etching rate ratio between the core 12 and the cladding 13, as explained previously, it is determined by the distribution of germanium dioxide $GeO_2$ in the core 12 and the volumetric ratio X of ammonium fluoride $NH_4F$ in the etching solution.

Figure 41:
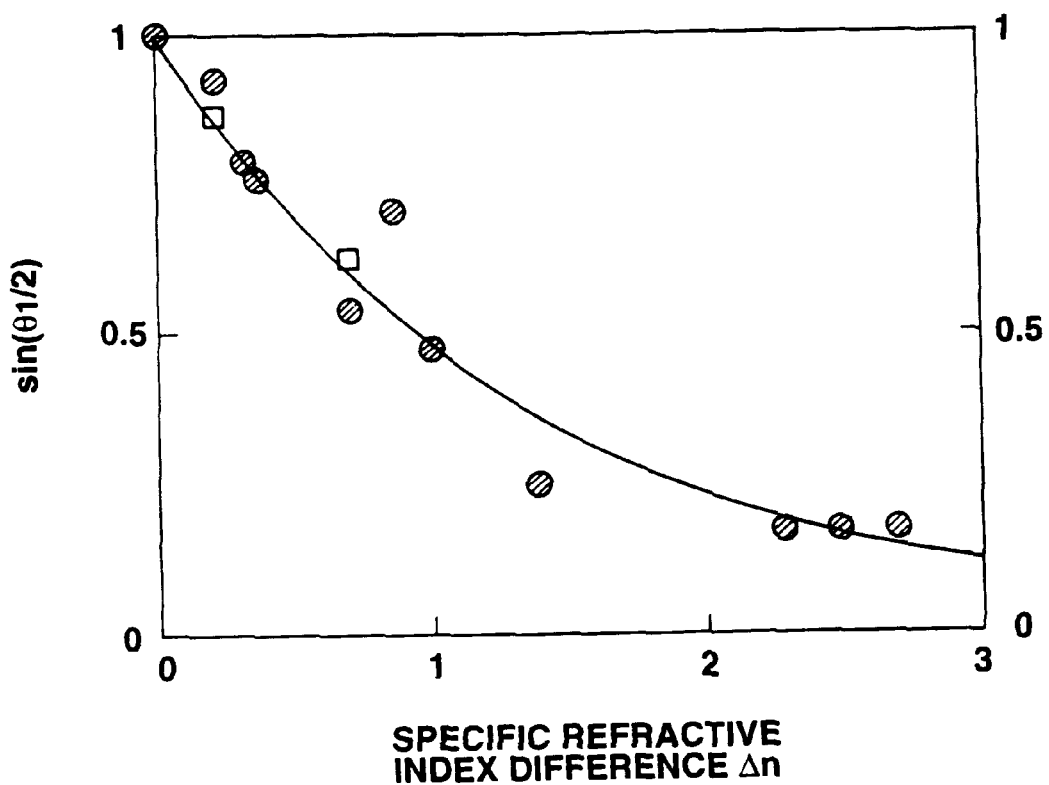
FIG. 41 illustrates the relation between the apex angle (cone angle) and the specific refractive index difference between a core and a clad in the fourth etching step.
Figure 42:
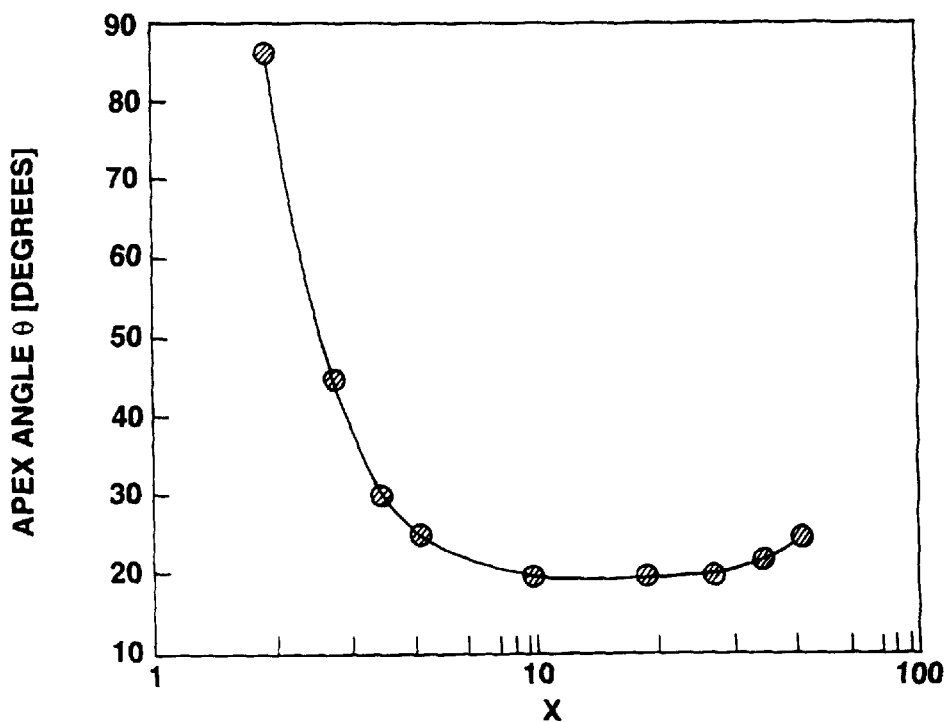
FIG. 42 illustrates changes in the apex angle in case the composition of the etching liquid in the above etching step is changed.

Assuming that $\Delta n$ is varied by controlling $GeGo_2$ doping ratio, as indicated by a black circle dot in FIG. 41, the larger the difference $\Delta n$ between the core 12 and the cladding 13 becomes, the smaller the ratio of the etching rate of the core 12 to that of the cladding 13 or $\sin(\theta_1/2)$ becomes, thus decreasing the cone angle $\theta_1$.

On the other hand, if the ammonium fluoride:hydrofluoric acid: water ratio in the etching solution used in the fourth etching step is set to X:1:1, and the ratio X of ammonium fluoride is varied, the cone angle $\theta_1$ if the tip 14 becomes smaller with increase in the ammonium fluoride ratio X, if the ratio X of ammonium fluoride is approximately not more than 10. Thus, the cone angle $\theta_1$ of the tip 14 can be controlled by selecting the ratio X of ammonium fluoride.

Thus, if the etching is carried out during the first etching step on the interface between the silicon oil and hydrofluoric acid, such that the cone angle $\theta_2$ of the cladding 13 is 20°, the cone angle $\theta_1$ of the core 12 of the protrusion 52 extended from the tip 51 can be rendered larger than the cone angle $\theta_2$ of the tip 51, as shown in FIG. 11.

If the volumetric ratio X of ammonium fluoride $NH_4F$ in the etching solution used in the fourth etching step is larger than approximately 1.7, the tip of the core 12 can be sharpened. However, if X is increased excessively, the etching rate is lowered, thus prolonging the etching time. If X is on the order of 40 or 50, the cone angle $\theta_1$ is again increased. Therefore, the value of X is desirably on the order of 20 to 30 at most.

Figure 43:
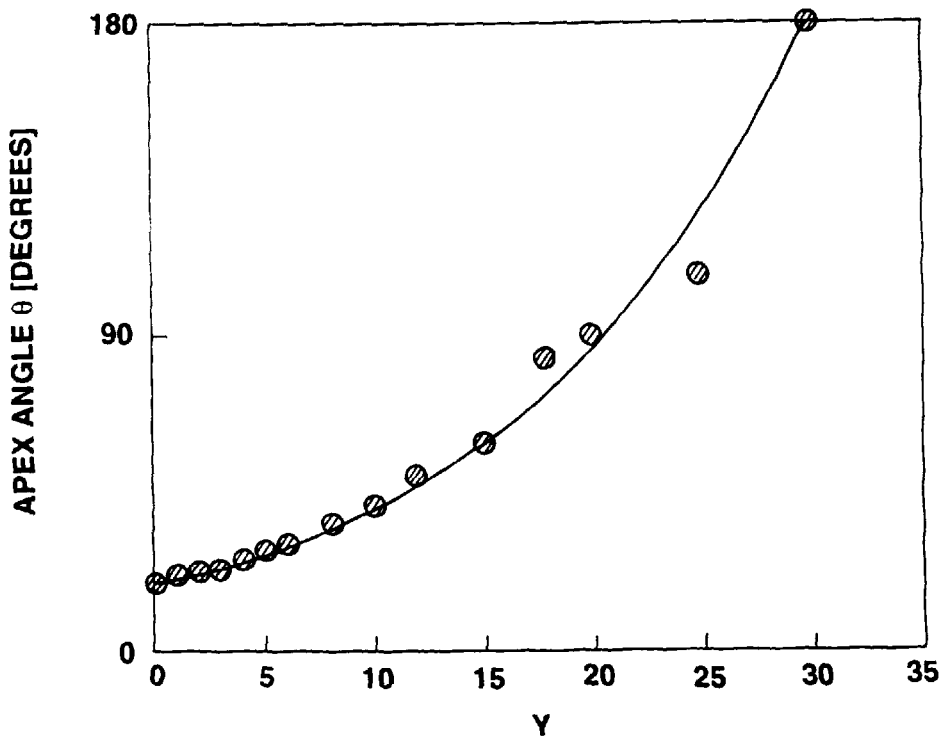
FIG. 43 illustrates changes in the apex angle in case the composition of the etching liquid in the above etching step is changed.

If the ammonium fluoride:hydrofluoric acid:water ratio of the etching solution used in the fourth etching step is set to 10:1:Y, where Y is the ratio of water, and if the value of Y is varied, the cone angle $\theta_2$ of the tip 14 is increased with an increased value of the water ratio Y, as shown in FIG. 43. Thus, the cone angle $\theta_1$ of the tip 14 can be controlled by selecting the water ratio Y.

By the above-mentioned first to fourth etching steps, an optical fiber 225 having a structure shown in FIG. 38E is formed. Since the shape of the tip 14 of the optical fiber 225 is determined by the distribution of germanium dioxide $GeO_2$, it is high in reproducibility, thus realizing a conical shape with high reproducibility.

Figure 44:
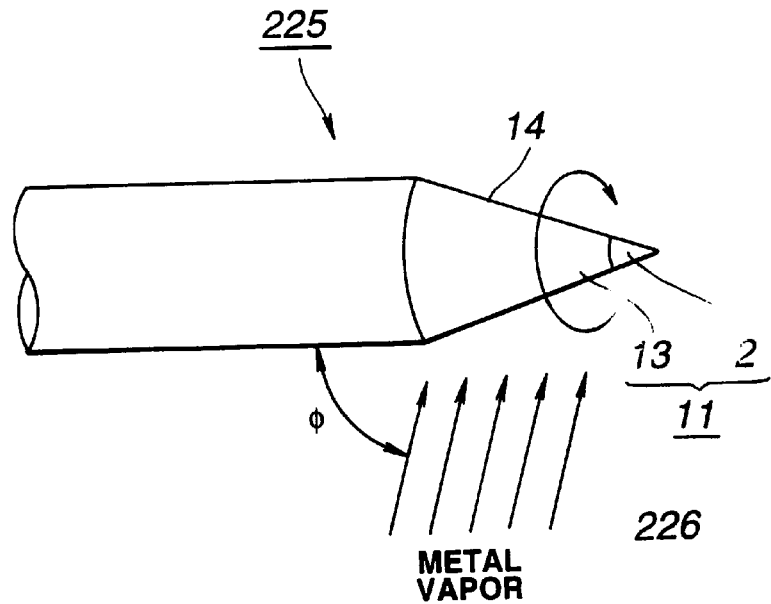
FIG. 44 shows a coating step in the method for producing the optical fiber of the twenty-third embodiment.
Figure 45:
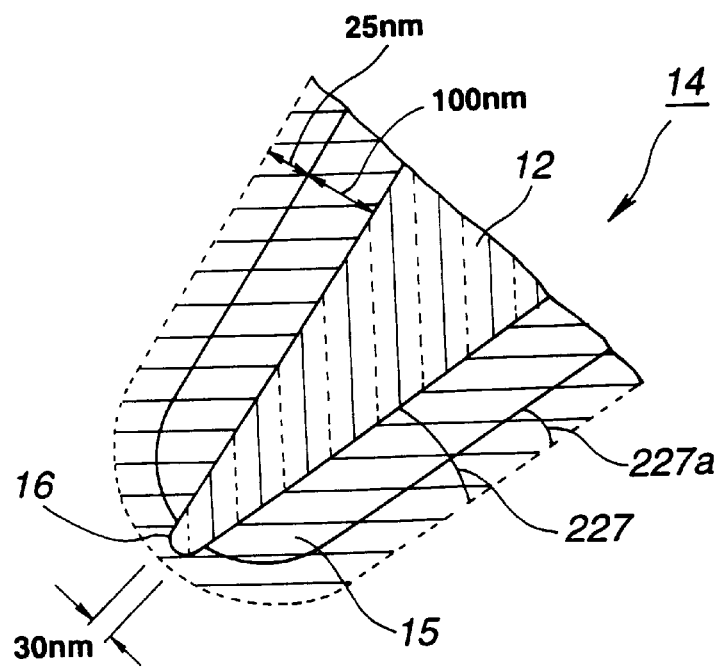
FIG. 45 shows a step of forming an apex in the method for producing the optical fiber of the twenty-third embodiment.

The above-mentioned coating and etching steps are now explained. During this coating step, the optical fiber 225 is rotated in vacuum about its center axis, using a vacuum evaporation unit, and a vapor 226 of a light-shielding material is supplied from obliquely lower position of the tip 14 for vapor evaporation for forming the above-described coating layer of the shielding material 15, as shown in FIG. 44. The gold vapor 226 is supplied for coating, with the angle $\phi$ in FIG. 44 set to, for example, 50 to 60°, for vapor evaporation for forming an evaporated gold film 227 having a thickness of approximately 125 nm on the surface of the tip 14, as shown for example in FIG. 45. By supplying the gold vapor 226 from obliquely below the tip 14 in vacuum for vapor evaporation, the evaporated gold film 227 at the foremost part of the tip 14 is reduced in thickness because the vapor of the material used tends to proceed straightly.

In the aperture forming step, the light-shielding coating layer 15 is etched. If gold is used as the light-shielding coating layer 15 as described above, a surface layer 227a of the evaporated gold film 227 is etched by approximately 25 nm by a potassium iodide solution (aqueous solution of $KI-I_2$).

If the light-shielding coating layer 15 is formed of gold, platinum or palladium, the etching solution may also be aqua regia, bromine solution of KCN solution, in place of the $KI-I_2$ aqueous solution. If aluminum is used as the light-shielding coating layer 15, the coating layer is etched by an alkaline solution, such as NaOH or KOH aqueous solution with a concentration of the order of 0.1%, or by an acid such as dilute hydrochloric acid, a mixed solution of an aqueous KOH solution, red prussiate and water or a mixed solution of phosphoric acid, nitric acid and acetic acid, may be used. If the light-shielding coating layer 15 is formed of silver, it may be etched using a mixed solution of aqueous ammonia and aqueous hydrogen peroxide or using a dilute nitric acid. If the light-shielding coating layer 15 is formed of nickel, it is etched using a mixed solution of nitric acid, acetic acid and acetone or using nitric acid.

If etching is performed in this manner, since the foremost part of the light-shielding coating layer 15 is reduced in thickness as described above, the foremost part of the tip 14 is exposed from the light-shielding coating layer 15, such that the foremost part of the tip 14 is exposed from the light-shielding coating layer 15 for forming the aperture 16 having a diameter on the order of 30 nm. This completes the optical fiber 10 as shown in FIG. 4.

If, instead of carrying out the etching of the etching step, simply the gold vapor 226 is supplied from obliquely lower position to the tip 14 for vacuum evaporation, the light can be transmitted due to the reduced thickness of the evaporated gold layer 227 at the foremost part of the tip 14, so that such foremost part can be used as a pseudo aperture. However, if the optical fiber is used as an optical probe for the above-described photon-scanning tunneling microscope, the evanescent light is absorbed to an increased extent at the pseudo-aperture. Consequently, with the present method for producing the optical fiber, the light-shielding coating layer 227 is etched for forming the aperture 16 for completely exposing the foremost part of the tip from the evaporated gold film 227.

With the present method for producing the optical fiber, since the shape of sharpening of the core 12 is determined by the shape of the tapered portion 221 formed during the first etching step on the interface between hydrofluoric acid and a liquid lighter than hydrofluoric acid, the tip 14 can be improved in shape reproducibility. Moreover, with the present optical fiber producing method, since the light-shielding coating layer formed during the coating step is etched during the aperture forming step for forming the aperture, it becomes possible to expose the foremost part of the tip 14 completely from the light-shielding layer for forming the aperture.

Similarly to the above-described twenty-third embodiment of the present invention, a method for producing an optical fiber according to a twenty-fourth embodiment of the present invention includes a sharpening step of sharpening an end of an optical fiber for forming a conically sharpened end extending form the outer rim of the cladding to the center of the core, a coating step of coating a light-shielding material on the surface of the tip for forming a light-shielding coating layer and an aperture forming step of etching the light-shielding coating layer formed by the coating step for forming an aperture by exposing the foremost part of the tip.

First, in the sharpening step of the optical fiber producing method, the etching similar to that of the first to fourth etching steps of the twenty-third embodiment is carried out for forming the optical fiber 225 having the tip 14 by conically sharpening the cladding 13 and the core 12 from the outer rim of the cladding 13 to the center of the core 12.

With the present optical fiber producing method, the coating step includes a first coating step and a second coating step. In the first coating step, aluminum is evaporated on the optical fiber 225 formed as described above to form a light-shielding coating layer 25 having a thickness on the order of 800 nm.

In the first coating step, the optical fiber 225 is rotated in vacuum about is center axis, using a vacuum evaporation device, as in the coating step shown in FIG. 44. An aluminum vapor 226 is supplied from an obliquely lower position of the tip 24 for evaporation for forming the light-shielding coating layer 25. The material used as the coating layer may also be any material having high light shielding properties and high electrical conductivity, such as gold, silver, platinum, palladium or nickel, in place of aluminum. Although the light-shielding coating layer 25 is formed by a sole aluminum coating layer, it may also be formed as a coating layer of high peeling resistance by first coating a material liable to be adsorbed to glass, such as chromium, germanium or silicon, and by coating a material having high light shielding performance, such as gold, for forming a dual coating layer.

With the present twenty-fourth embodiment, since the corrosion-resistant coating layer 26 is formed in the second coating step as later explained for forming the corrosion-resistant coating layer 26 in an area other than the foremost part of the light-shielding coating layer 25, and the portion of the layer 25 disposed at the foremost part of the tip 24 is selectively etched by etching, it is unnecessary to carry out vacuum evaporation as described above for forming the light-shielding coating layer 25.

Consequently, the coating of the first coating step may also be carried out by sputtering in which particles of sputtered material are less liable to proceed along a straight path, or by a wet process such as electroless plating followed by hydrophilizing processing. If the coating of the first coating step is carried out by sputtering, the number of the optical fibers that can be processed at a time in case of employing an apparatus of the same scale as that used for the above-described vacuum evaporation can be increased for lowering the production cost.

During the next coating step, the optical fiber 225 is rotated in vacuum about its center axis, using a vacuum evaporation unit, and a vapor 226 of a corrosion-resistant material is supplied from an obliquely lower position of the tip 14 for vapor evaporation, for forming the above-described coating layer of the shielding material 26, as in the coating step shown in FIG. 44. Specifically, the angle φ shown in FIG. 44 is set to approximately 50° and gold vapor 226 is supplied to form an evaporated gold film having a thickness on the order of 80 nm to form a corrosion-resistant coating layer 26. If aluminum is used as the corrosion-resistant coating layer 26, the material that can be used for forming the corrosion-resistant coating layer 26 may be any material other than gold if such material can be easily evaporated and cannot be etched during the aperture forming step, such as silver or platinum.

Figure 47:
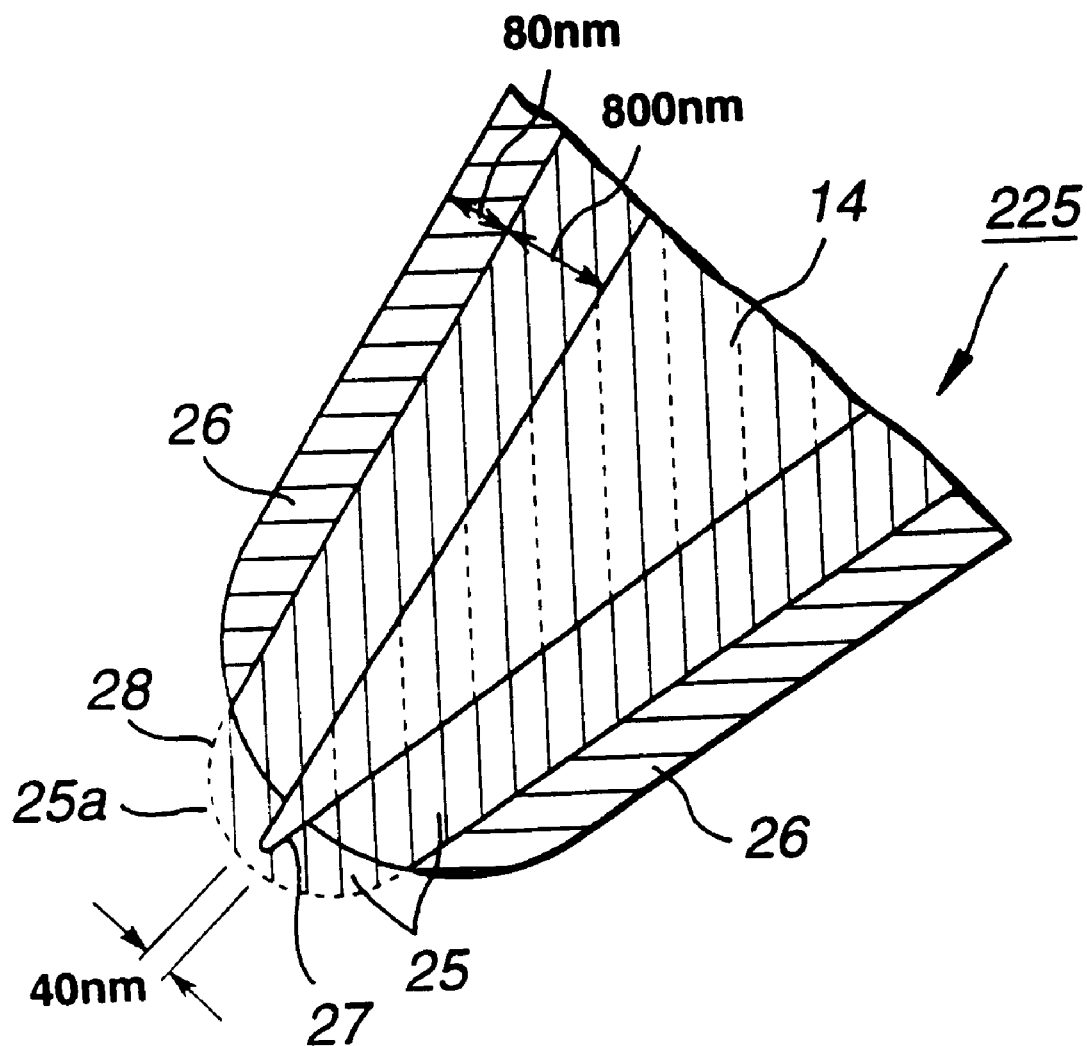
FIG. 47 shows a step of forming an apex in the method for producing the optical fiber of a twenty-fourth embodiment of the present invention.

In such vacuum evaporation, gold vapor 226 tends to proceed along a straight path to a more extent than if sputtering is used for coating. Therefore, if the gold vapor 226 is supplied from the rear side to the tip 24, as described above, the gold vapor 226 is not turned round to the foremost part of the light-shielding coating layer 25, such that gold is not affixed to the foremost part of the light-shielding coating layer 25. This forms a corrosion-resistant coating layer 26 on a portion other than the foremost part of the light-shielding coating layer 25 to form an exposed portion 28 at the foremost part of the light-shielding coating layer 25 exposed from the corrosion-resistant coating layer 26, as shown for example in FIG. 47.

Finally, at the aperture forming step, the foremost part of the optical fiber 225, where the light-shielding coating layer 25 and the corrosion-resistant coating layer 26 have been formed as described above, is etched by an etching solution composed of an aqueous NaOH solution having a concentration on the order of 0.1%.

Since gold of the corrosion-resistant coating layer 26 is corrosion-resistant with respect to the aqueous NaOH solution and is not dissolved therein, while aluminum of the light-shielding coating layer 25 is dissolved in the aqueous NaOH solution, so that the light-shielding layer 25 of the exposed portion 28 is etched selectively. This forms an aperture 27 about 40 nm in diameter by the foremost part of the tip 24 exposed from the light-shielding coating layer 25.

Thus, with the present optical fiber forming process, the aperture 27 can be formed easily in the light-shielding coating layer 25 by selectively etching the exposed portion 28 at the foremost part of the light-shielding coating layer 25 which is the foremost part of the tip 24 exposed from the corrosion-resistant coating layer 25.

Similarly to the etching solution used in the aperture forming step in the twenty-third embodiment, the etching solution used in the present aperture forming step may be other than the aqueous NaOH solution if it can etch the light-shielding coating layer 25, without etching the corrosion-resistant coating layer 26.

It is only sufficient if the material of the light-shielding coating layer 25 and that of the corrosion-resistant coating layer 26 are such that the material of the corrosion-resistant coating layer 26 is higher in resistance against the etching solution used in the aperture forming step than the material of the light-shielding coating layer 25. If this condition is met, the light-shielding coating layer 25 can be selectively etched at the exposed portion 28 in the aperture forming step for forming the aperture 27.

Specifically, noble metals, such as silver or platinum, having resistance against the aqueous solution of NaOH, can be used in place of gold as the corrosion-resistant coating layer 26 if aluminum is used as the light-shielding coating layer 25 and an aqueous solution of NaOH is used as the etching solution in the aperture forming step.

Since these noble metals are resistant against the alkaline solution such as NaOH solution or acid solution, the light-shielding coating layer 25 can be protected when the present optical fiber is used in a photon scanning tunneling microscope for measuring the shape of a sample in an alkaline or acidic solution.

If noble metals, such as gold, silver or platinum, are used as the light-shielding coating layer 25, the etching solution used in the aperture forming step may be an aqueous solution of KI-I$_2$, while the corrosion-resistant coating layer 26 may be silica-based ceramics, such as SiO$_2$, or alumina-based ceramics, such as Al$_2$O$_3$, exhibiting resistance against the KI-I$_2$ aqueous solution.

Figure 48:
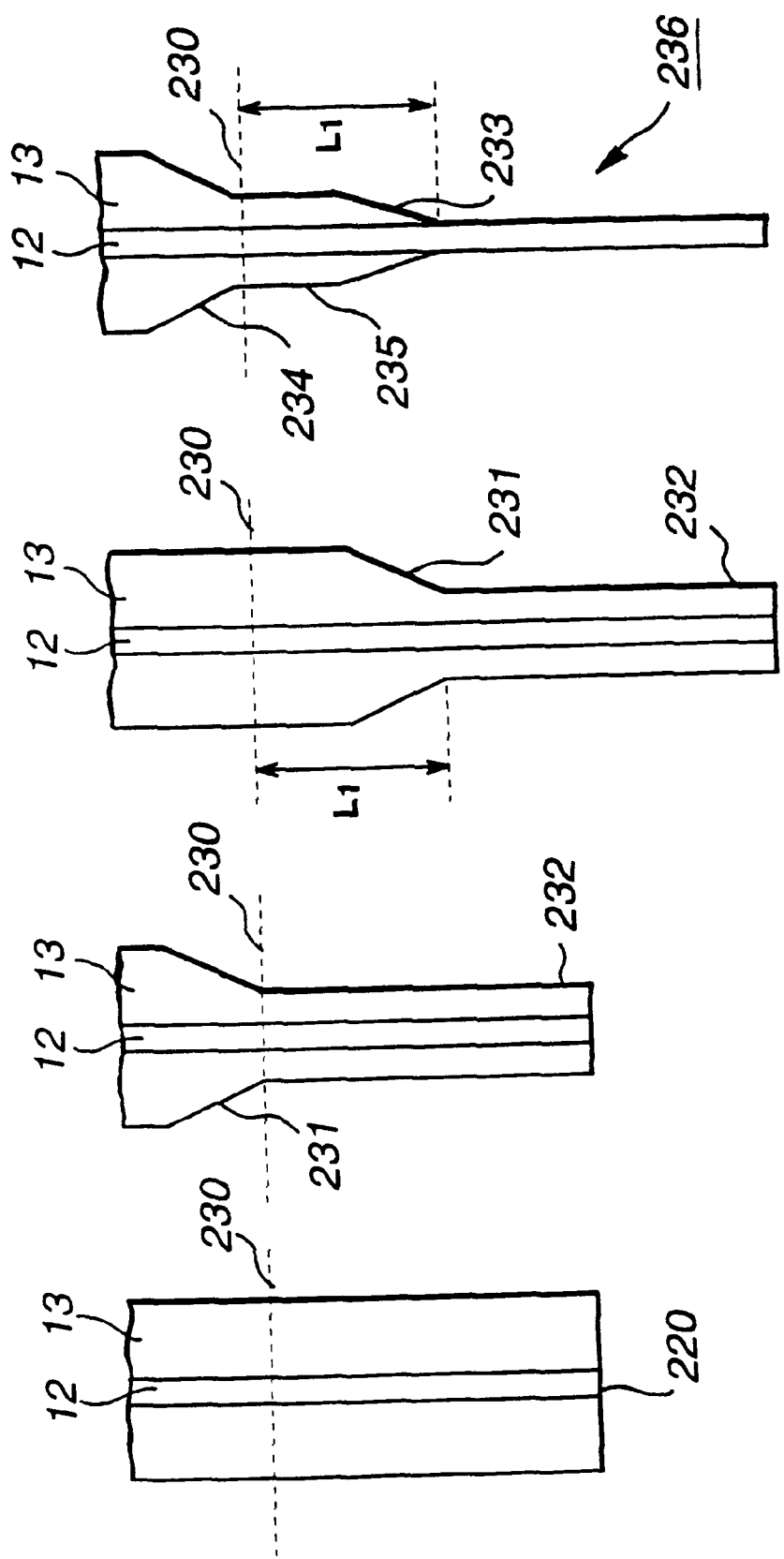
FIGS. 48(A)–48(D) show an etching step of a method for producing an optical fiber according to a twenty-fifth embodiment of the present invention.

With the method for producing the optical fiber according to a twenty-fifth embodiment of the present invention, an optical fiber shaped as shown in FIG. 8 is produced by a processing sequence as shown in FIGS. 48(A)–48(D). With the present optical fiber producing method, when forming the tapered portion in the cladding 13 in the taper forming etching step similar to that used in the above-described twenty-fourth embodiment, the optical fiber 11 is intruded a length L$_1$ into hydrofluoric acid, as shown in FIG. 48C, for continuing the etching, when a tapered portion has been formed to some extent and a reduced-diameter portion 232 with a reduced diameter of the cladding 13 is left, as shown in FIG. 48B.

Figure 49:
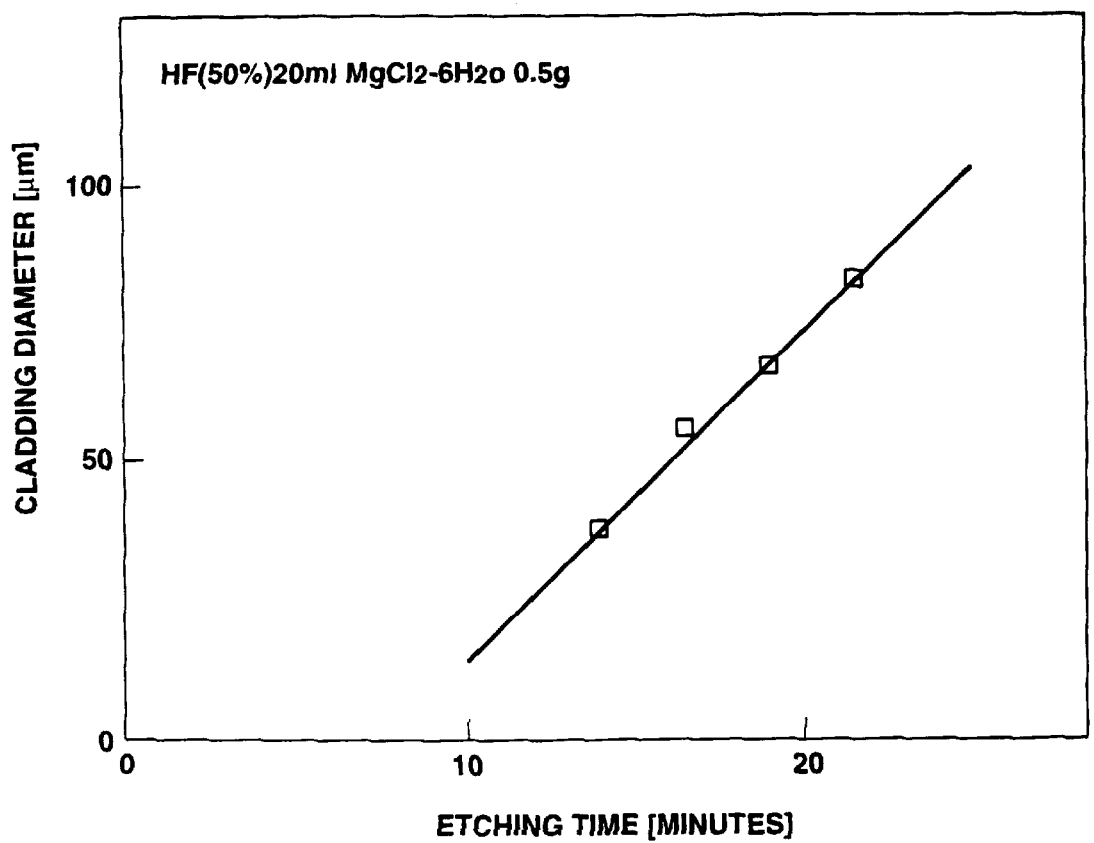
FIG. 49 shows the relation between the etching time in the etching step in the method for producing an optical fiber of the twenty-fifth embodiment and the clad diameter.

In this case, the optical fiber 11 is further etched after it is intruded a length L$_1$ into hydrofluoric acid. The cladding 13 is reduced in diameter in this manner while the tapered portion 231 and the reduced-diameter portion 232 are left. When the cladding 13 of the reduced-diameter portion 232 is dissolved completely, there is formed a reduced-diameter portion 235, in which the cladding 13 is reduced in diameter, between a tapered portion 233 at the foremost part of the cladding 13 and a tapered portion 234 formed on an interface 230 between hydrofluoric acid and silicon oil. As shown in FIG. 49 showing the relation between the timing of intruding the optical fiber into hydrofluoric acid by the length L$_1$ and the diameter of the cladding 13 of the resulting reduced-diameter portion 235, the diameter of the cladding 13 may be reduced at the reduced-diameter portion 235 by setting a faster time point as the timing of intruding the optical fiber into hydrofluoric acid.

If the etching of the sharpening step similar to that of the twenty-fourth embodiment is performed on the thus shaped optical fiber 236, the portion of the core 12 exposed from the foremost part of the tapered portion 233 is sharpened for forming the optical fiber 30 shaped as shown in FIG. 8. Since a diameter d$_2$ of the reduced-diameter portion 35 derived from the reduced-diameter portion 235 depends on the timing of intruding the optical fiber 11 into hydrofluoric acid in the course of the taper-forming etching step, such diameter d$_2$ can be set to a desired value by controlling the timing of intrusion of the optical fiber 11 into hydrofluoric acid in the taper forming etching step.

In addition, a length L$_0$ of the reduced-diameter portion 35 equal to the length L$_1$ of intrusion of the optical fiber 11 into hydrofluoric acid less the length of the tapered portion 35, the length L$_0$ of the reduced-diameter portion 35 can be set to a desired value by controlling the length by which the optical fiber 11 is intruded into hydrofluoric acid. The optical fiber 40 shaped as shown in FIG. 9 may be formed by performing he coating step and the aperture forming step on the optical fiber prepared as described above in the same way as in the twenty-third or twenty-fourth embodiment for forming the light-shielding coating layer.

In an optical fiber producing method according to a twenty-sixth embodiment of the present invention, an end of the optical fiber 11 is etched on an interface between hydrofluoric acid and a liquid lighter in specific gravity than hydrofluoric acid, for forming a tapered portion 221, as in the first etching step of the twenty-third embodiment. The tapered portion 221 thus formed is then etched in an etching solution composed of a buffered hydrogen fluoride similar to that used in the fourth etching step of the twenty-third embodiment.

If the specific refractive index difference Δn between the core 12 and the cladding 13 is not less than 2.5%, the volumetric ratio X of ammonium fluoride NH$_4$F is set to a value ranging from 1.25 to 20.

Figure 50:
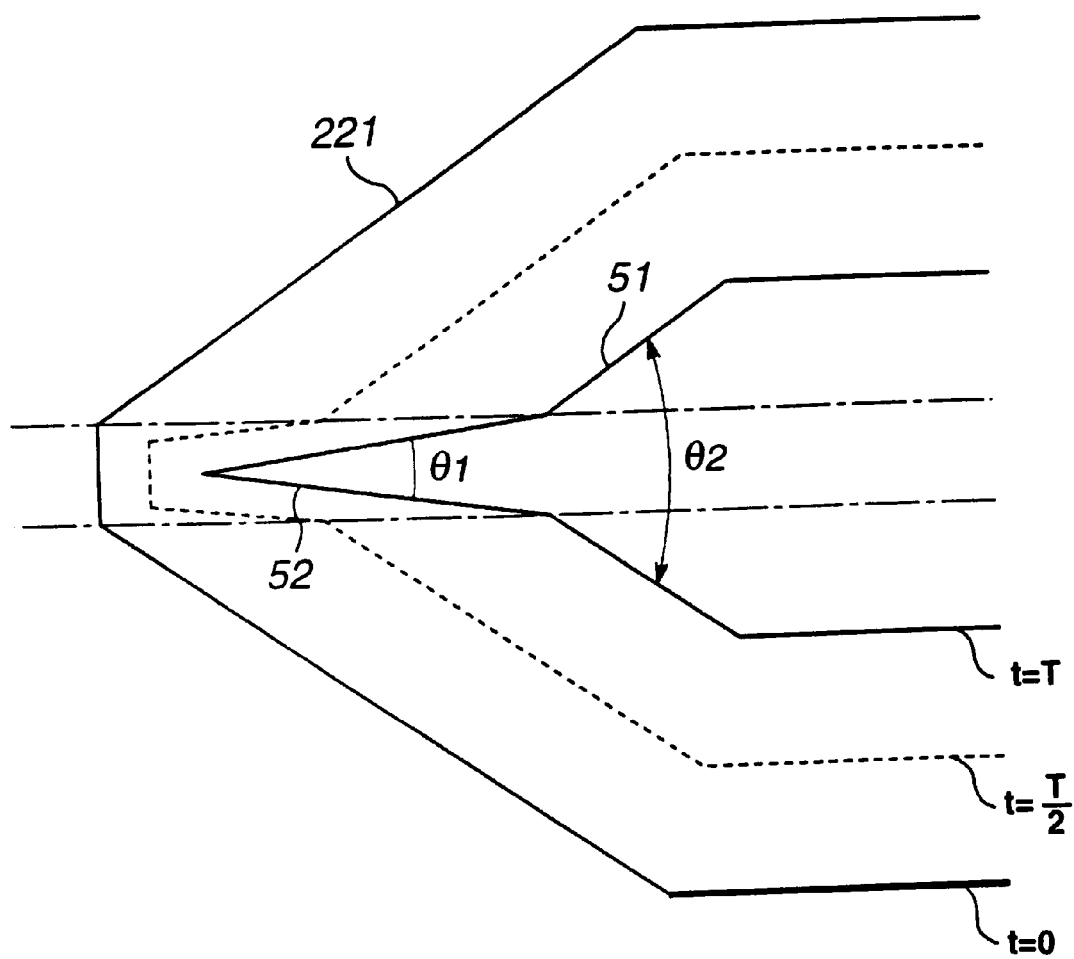
FIG. 50 shows an etching step of a method for producing an optical fiber according to a twenty-sixth embodiment of the present invention.
Figure 51:
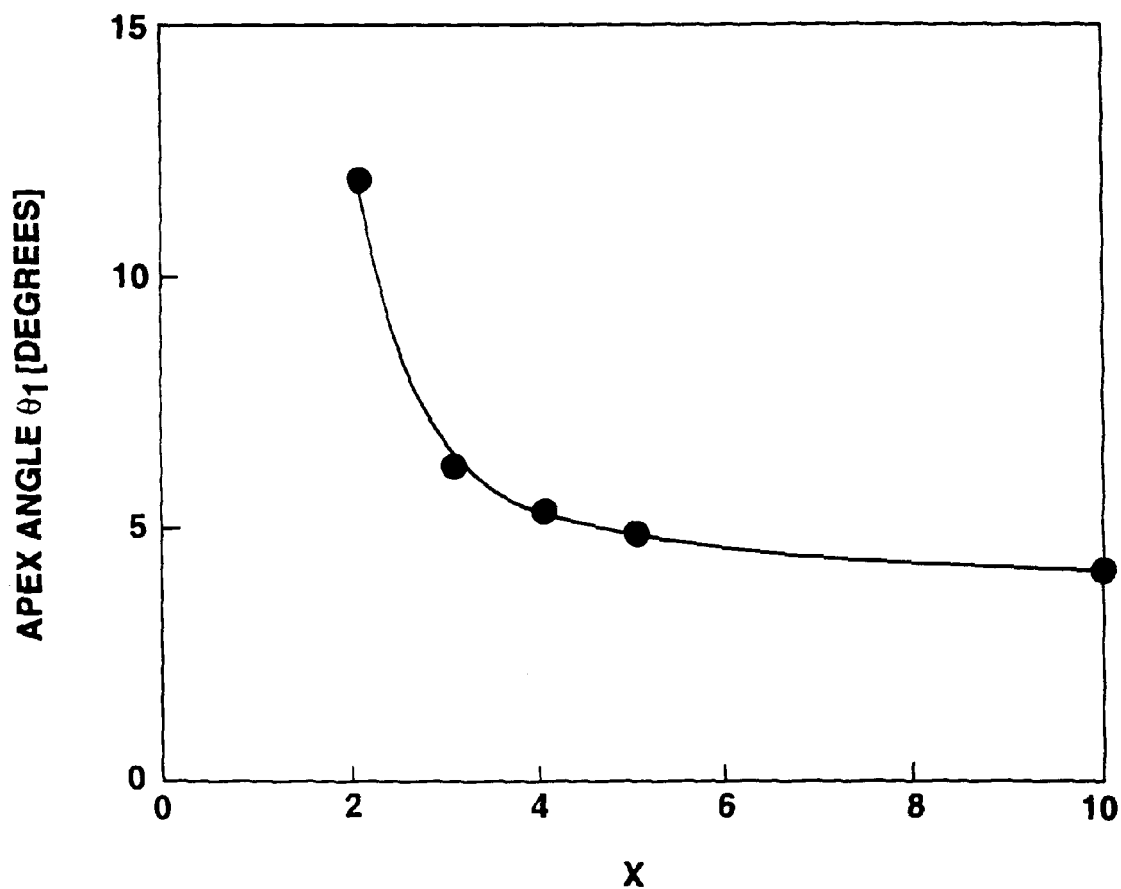
FIG. 51 shows an apex angle of a sharpened core formed by the etching step.

By such etching, the portion of the core 12 exposed from the foremost part of the tapered portion 221 is also etched from the lateral surface and sharpened for forming the predation 52, as shown in FIG. 50. Specifically, the apparent etching rate for the cladding 13 for exposing the core 12 from the tapered portion 221 is equal to 1/{sin(θ$_2$/2)} times the actual etching rate R$_{clad}$ for the cladding 253, where θ$_2$ is the cone angle of the tapered portion 221. Thus the cone angle θ$_1$ of the core 12 at the foremost part of the protrusion 52 can be reduced as compared to the case of the twenty-third embodiment. By increasing the volumetric ratio X of ammonium fluoride NH$_4$F in such etching, the cone angle θ$_1$ of the protrusion 52 can be decreased with increased value of X.

The light-shielding coating layer 53 is then formed on the surface of the protrusion 52 and etched for forming the aperture 54, in the same way as in the twenty-third or twenty=fourth embodiment as described above, for forming the optical fiber 50 shaped as shown in FIG. 10.

Thus, with the above-described optical fiber producing method, the cone angle θ$_2$ of the core 12 at the protrusion 52 can be reduced for producing the optical fiber having improved detection sensitivity.

Figure 52A:
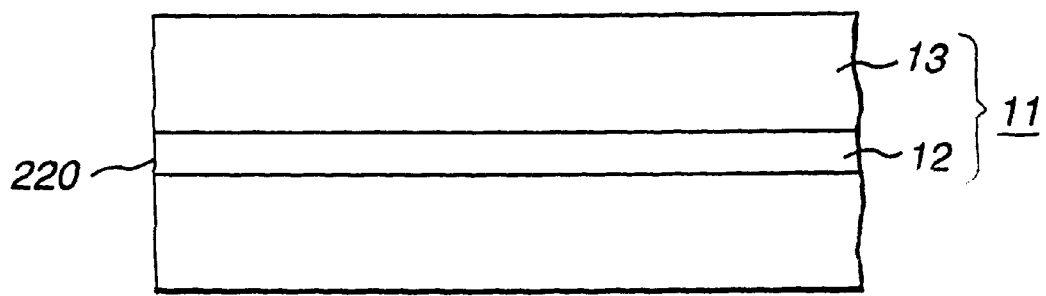
FIGS. 52(A)–52(C) show an etching step of a method for producing an optical fiber according to a twenty-seventh embodiment of the present invention.
Figure 52B:
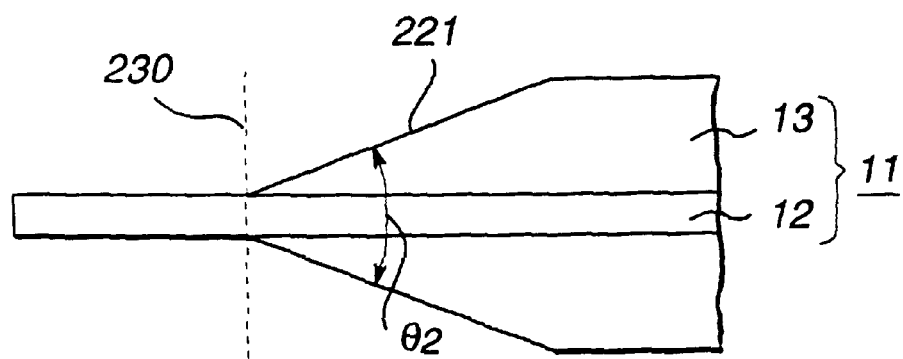
Figure 52C:
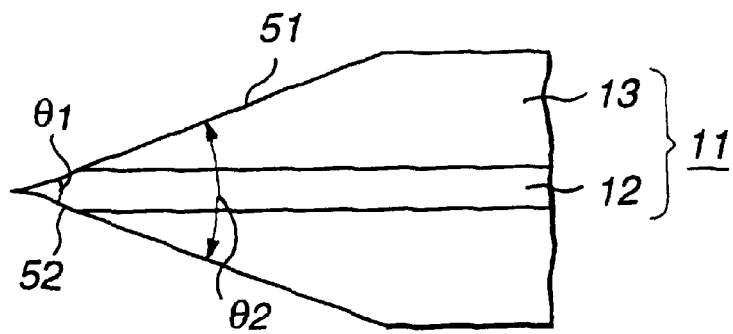

A method for producing an optical fiber according to a twenty-seventh embodiment of the present invention etches, as in the first etching step of the twenty-third embodiment, described above, the end 220 of the optical fiber 11 shown in FIG. 52A for about 21 minutes on an interface between hydrofluoric acid and a liquid lighter in specific gravity than hydrofluoric acid for forming a tapered portion 221 as shown in FIG. 52B. The etching is terminated in a state in which the core 12 is left at the foremost part of the tapered portion 221.

The optical fiber 11, thus formed with the tapered portion 221, is etched for about 10 to 15 minutes in an etching solution having the volumetric ratio X of ammonium fluoride NH$_4$ F equal to about 2. The core 12 is etched at this time from its lateral surface. However, by terminating the etching immediately before complete dissolution, the foremost part of the core 12 protruded from the tapered portion 221 is sharpened to form the protrusion. Although the cone angle θ$_1$ of the protrusion 52 at the foremost part of the core 12 becomes as small as 10 to 15°, the cone angle θ cannot be controlled since the etching state is a transient etching state. However, not only can the cone angle be decreased, but also the sharpening process can be simplified to lower the production cost.

The optical fiber, thus shaped, can be used in the processing downstream of the coating step of the twenty-third or twenty-fourth embodiments described above.

A method for producing an optical fiber according to a twenty-eighth embodiment of the present invention is directed to a method for producing the optical fiber 60 shown in FIG. 12. The optical fiber producing method includes a first etching step of etching an end of the optical fiber 11 made up of the core 12 and the cladding 13 for reducing the thickness of the cladding 13 for forming the reduced-diameter portion 64, a second etching step of etching the foremost part of the reduced-diameter portion 64 for sharpening the core 12 for forming the protrusion 65, a first coating step of forming the light-shielding coating layer 66 on the surface of the protrusion 65, a second coating step of forming the corrosion-resistant coating layer 67 on the surface of a portion other than the foremost part of the light-shielding coating layer 66, and an aperture forming step of etching the light-shielding layer 55 at the foremost part of the protrusion 65 for exposing the foremost part of the protrusion 65 from the light-shielding coating layer 66 for forming the aperture 68.

Figure 53A:
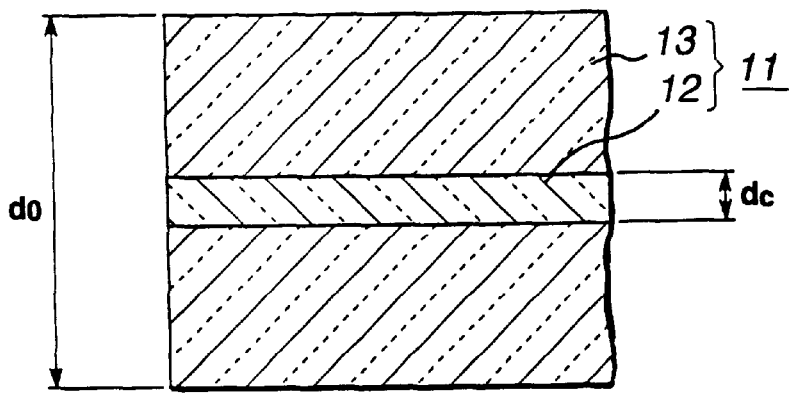
FIGS. 53(A)–53(C) show an etching step of a method for producing an optical fiber according to a twenty-eighth embodiment.
Figure 53B:
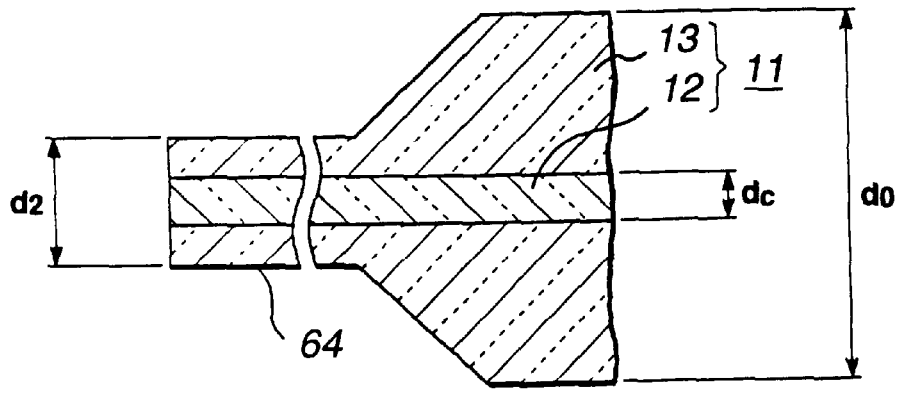
Figure 53C:
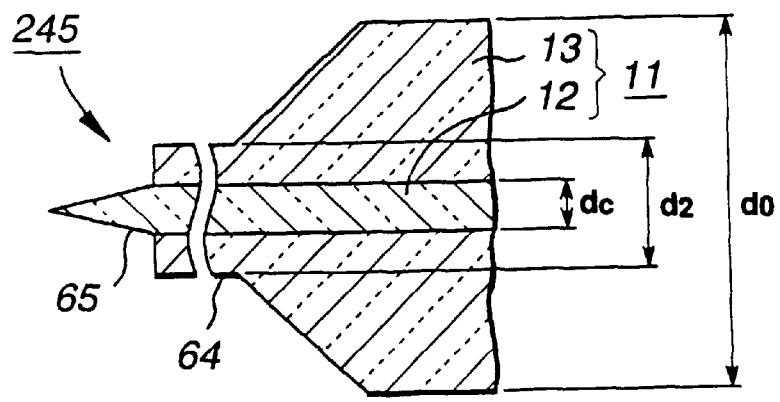
Figure 54:
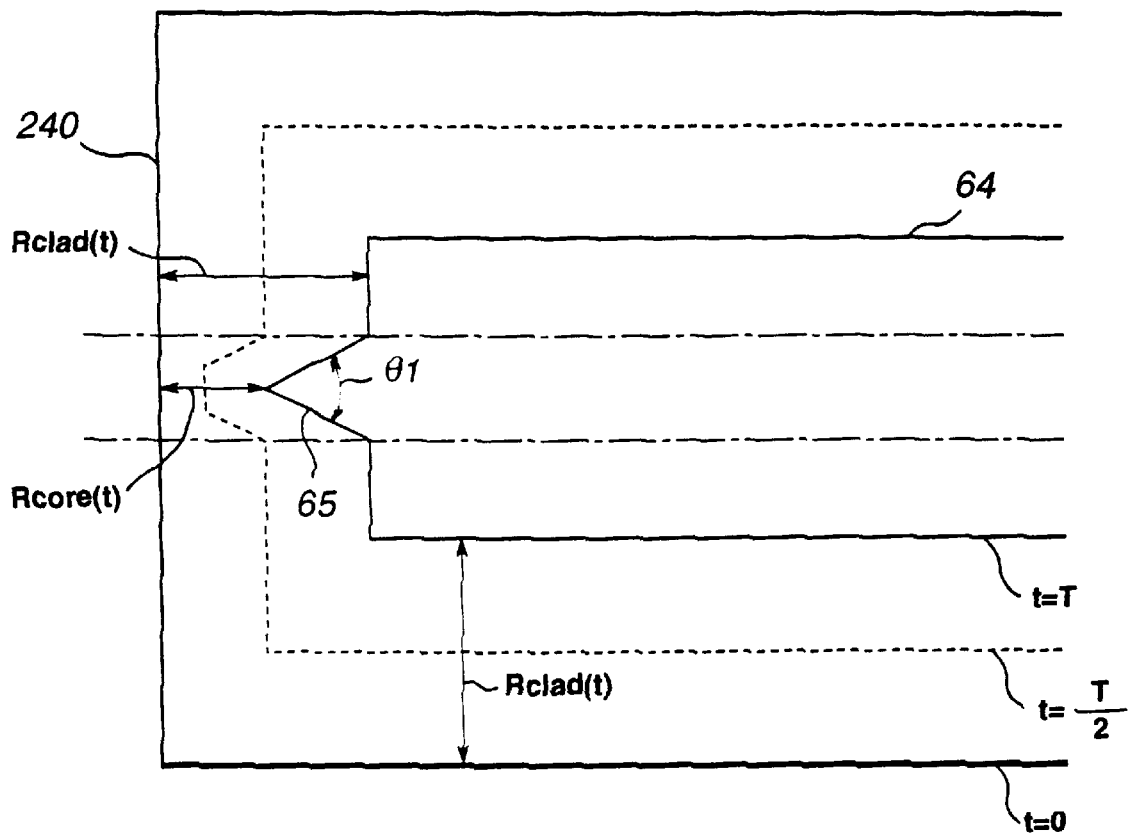
FIG. 54 shows a second etching step of the method for producing an optical fiber according to the twenty-eighth embodiment.

In the present optical fiber forming method, an optical fiber 245 shaped for having the reduced-diameter portion 64 and the protrusion 65 as shown in FIG. 53C is produced in the first and second etching steps shown in FIGS. 53(A) and 53(B). In the first and second coating steps, the light-shielding coating layer 66 and the corrosion-resistant coating layer 67 are formed in the protrusion 65 of the optical fiber 245, and the aperture 68 is formed in the aperture forming step.

A case in which an optical fiber 11 having the diameter $d_0$ of the cladding 13 of 3.4 μm and the diameter $d_c$ of the core 12 of 3.4 μm, with germanium dioxide $GeO_2$ added into the core 12, is used, is now explained. In the resent optical fiber 1, density distribution is set so that the density in the center of the core 12 of $GeO_2$ added to the core 2 is high and the density thereof in the outer periphery of the core 2 is low.

In the first etching step, an end 240 of the optical fiber 11 shown in FIG. 53A is etched for about 70 to 80 minutes, using an etching solution comprised of a buffered hydrogen fluoride solution having a volumetric ratio of an aqueous solution of ammonium fluoride with a concentration of 40 wt %, hydrofluoric acid with a concentration of 50 wt % and water, with the volumetric ratio of X:1:Y, where Y is arbitrary, with the volumetric ratio X of ammonium fluoride $NH_4F$ being on the order of 1.7.

In this manner, the cladding 13 contacted with the etching solution is etched to form the reduced-diameter portion 64, as shown for example in FIG. 53B. The diameter $d_2$ of the reduced-diameter portion 64 can be controlled by varying the etching time and the volumetric ratio X of ammonium fluoride $NH_4F$ in the etching solution. On the other hand, the length of the portion of the optical fiber 11 dipped in the etching solution can be adjusted for varying the length of the reduced-diameter portion 64.

In the second etching step, etching is carried out using an etching solution comprised of a buffered hydrogen fluoride solution having the volumetric ratio X of ammonium fluoride $NH_4F$ larger than 1.7. Specifically, an etching solution having the volumetric ratio X ranging from 5 to 10 is used at a temperature of 23° C. The etching is carried out for about 60 minutes and for about 120 minutes when the etching solution having the volumetric ratio X of 5 or the etching solution having the volumetric ratio X of 10 are used, respectively. Since the volumetric ratio X of ammonium fluoride $NH_4F$ in the etching solution used in the second etching step is 5 to 10, the etching rate for the cladding 13 is faster than that for the core 12.

With such etching, since the etching rate for the core 12 is faster than that for cladding 13, the cladding 13 is first etched with progress in etching, thus gradually exposing the core 12. Since the core 12 protruded from the cladding 13 is also etched from its lateral surface, the portion of the core 12 exposed from the cladding 13 is sharpened conically with progress in etching.

In this manner, the protrusion 65 in which the core 12 is protruded from the cladding 13 at the foremost part of the reduced-diameter portion 64 is formed, as shown in FIG. 53C.

Moreover, since the density of $GeO_2$ at the center of the core 12 of the present optical fiber is higher as described above, the etching rate at the center of the core 12 is somewhat lower, while the etching rate is increased towards the peripheral part of the core 12. Thus the peripheral part of the core 12 of the protrusion is etched first so that the foremost part of the core 12 becomes tapered and the protrusion 65 is sharpened conically.

The cone angle $\theta_2$ of the sharpened protrusion 65 depends on the distribution of germanium dioxide $GeO_2$ in the core 12 and the volumetric ratio X of ammonium fluoride $NH_4F$ in the etching solution. The cone angle $\theta_1$ of the protrusion 65 is determined by the etching rate of the core 12 and cladding 13, as in the twenty-third embodiment described above, such that, if the volumetric ratio X of ammonium fluoride $NH_4F$ is varied, the cone angle is changed as shown in FIG. 41. If, for example, the etching solution with the volumetric ratio X of ammonium fluoride $NH_4F$ of 5 is used, the cone angle $\theta_1$ can be set to about 20° depending on the etching time and the distribution of the density of $GeO_2$ in the core 12. Since the shape of the protrusion 65 is determined in this etching depending on the distribution of germanium dioxide $GeO_2$ added into the core 12, it is possible to produce a conical shape with good reproducibility and symmetry.

The optical fiber shaped as shown in FIG. 53C may also be formed with use of a single-mode optical fiber which is doped with germanium dioxide $GeO_2$ to a constant distribution in the core 12 and the refractive index of the core 12 and the cladding 13 of which are changed in steps.

In this case, sharpening of the protrusion 65 based on the distribution of $GeO_2$ cannot be expected in distinction from the case of using the optical fiber having the density distribution of $GeO_2$ added to the core 12 as described above. However, if the sharpening corresponding to the ratio of the etching rate for the core 12 and that for the cladding 13 is performed, such that a single-mode optical fiber having the diameter of the cladding 13 of 125 μm and the diameter of the cladding 13 of 8 μm is etched for 3 hours 15 minutes to 3 hours 20 minutes at a temperature of 25° using an etching solution having the composition similar to that of the etching solution used for the second etching and the volumetric ratio X of ammonium fluoride $NH_4F$ on the order of 10, the cone angle $\theta_1$ of the protrusion 65 becomes slightly larger to about 105°, however, the conically sharpened portion 65 is formed as in the above-mentioned second etching step. The protrusion 65 can be sharpened for the volumetric ratio X of ammonium fluoride $NH_4F$ in the usable etching solution other than 10. If the single-mode fiber is used, the reduced-diameter portion 64 can be formed by performing the etching similar to that performed on the single-mode fiber.

If a single-mode fiber having the core 12 of quartz $SiO_2$ and the cladding 13 of quartz $SiO_2$ doped with fluorine F is used, an optical fiber with the cone angle at the protrusion 65 of the order of 77°, shaped as shown in FIG. 53C, may be formed.

If such optical fiber is used, formation of the reduced-diameter portion 64 and sharpening of the protrusion 65 can be realized by a sole etching operation by employing an etching solution having the volumetric ratio X of ammonium fluoride $NH_4F$ of the order of 1.7 and a faster etching rate, such that the first and second etching steps can be carried out by a sole etching operation. The result is the simplified production step and the lowered production cost.

Figure 55:
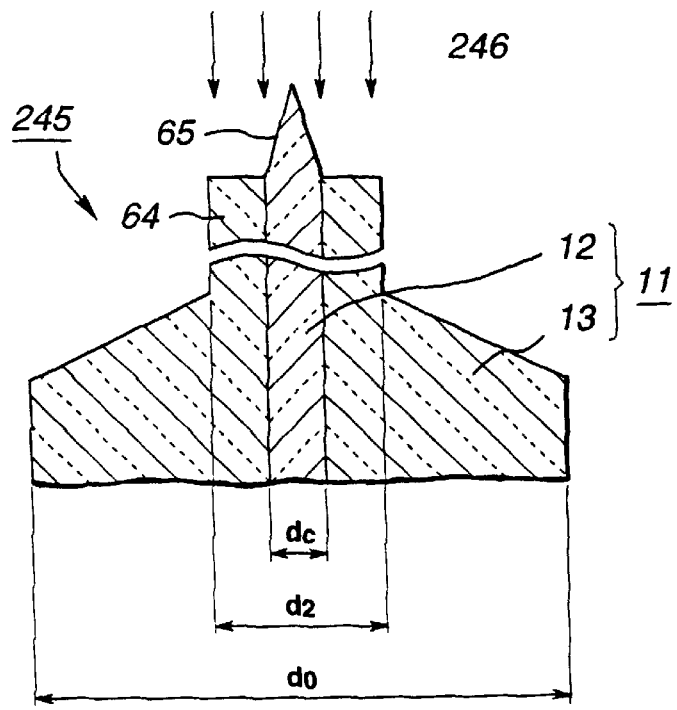
FIG. 55 shows a first coating step of the method for producing an optical fiber according to the twenty-eighth embodiment.
Figure 56:
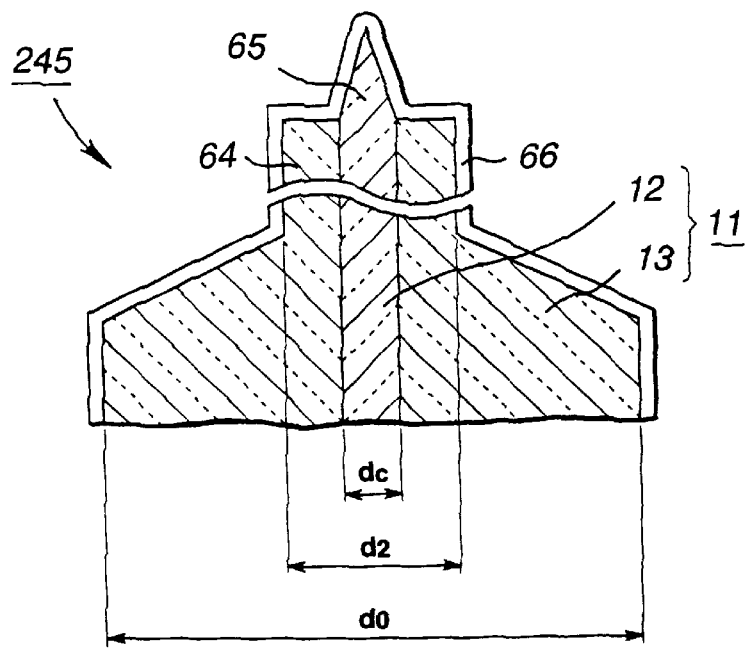
FIG. 56 shows the structure of an optical fiber after coating the tip in the first coating step in the method for producing the optical fiber in the twenty-eighth embodiment.

The first and second etching steps and the aperture forming step are explained. In the first coating step, the gold vapor is supplied from above the protrusion 65 to the optical fiber 245 formed by the above-mentioned first and second etching steps, as shown in FIG. 55. This forms the light-shielding coating layer 66 of gold on the surface of the protrusion 65 as shown in FIG. 56 to a film thickness of the order of 400 nm.

The material that can be used for the light-shielding coating layer 66 is not limited to aluminum and may be any one of materials having high light shielding properties and that can be etched in the aperture forming step as in the coating step of the twenty-third embodiment, such as gold, silver or platinum. Moreover, although the light-shielding coating layer 66 is formed with the first coating step by a sole aluminum coating layer, the light-shielding coating layer 66 with high peeling resistance may also be formed by first coating a material ready to be adsorbed to glass, such as chromium, germanium or silicon, on the protrusion 65, and then coating a material having high light-shielding properties, such as gold, for forming a dual coating layer. The coating by the first coating step may also be realized not only by evaporation but also by a method comprised of sputtering or electroless plating followed by hydrophilizing treatment, in which particles are not liable to proceed linearly. If the coating by the first coating step is carried out by sputtering, the number of the optical fibers that can be processed at a time in case of using an apparatus of the same scale may be larger than that in case of vacuum evaporation thus reducing the production cost.

In the second coating step, the optical fiber 245 provided with the light-shielding coating layer 66 in the first coating step is dipped in a solvent obtained on dissolving a synthetic resin. The optical fiber 245 is then hoisted from the solvent. Specifically, a commercially available acrylic paint has been used as the solvent in which the synthetic resin has been dissolved.

When the optical fiber is withdrawn from the solvent, the solvent which has become deposited on the light-shielding coating layer 66 on the protrusion 65 is attracted by surface tension towards the reduced-diameter portion 64. This exposes the light-shielding coating layer 66 at the foremost part of the protrusion 65 from the solvent. It suffices if the solvent in which the synthetic resin has been dissolved is of low viscosity such that the light-shielding coating layer 66 at the foremost part of the protrusion 65 is exposed from the solvent by surface tension. Also, it suffices if the synthetic resin cannot be etched with the etching solution used in the aperture forming step.

Figure 57:
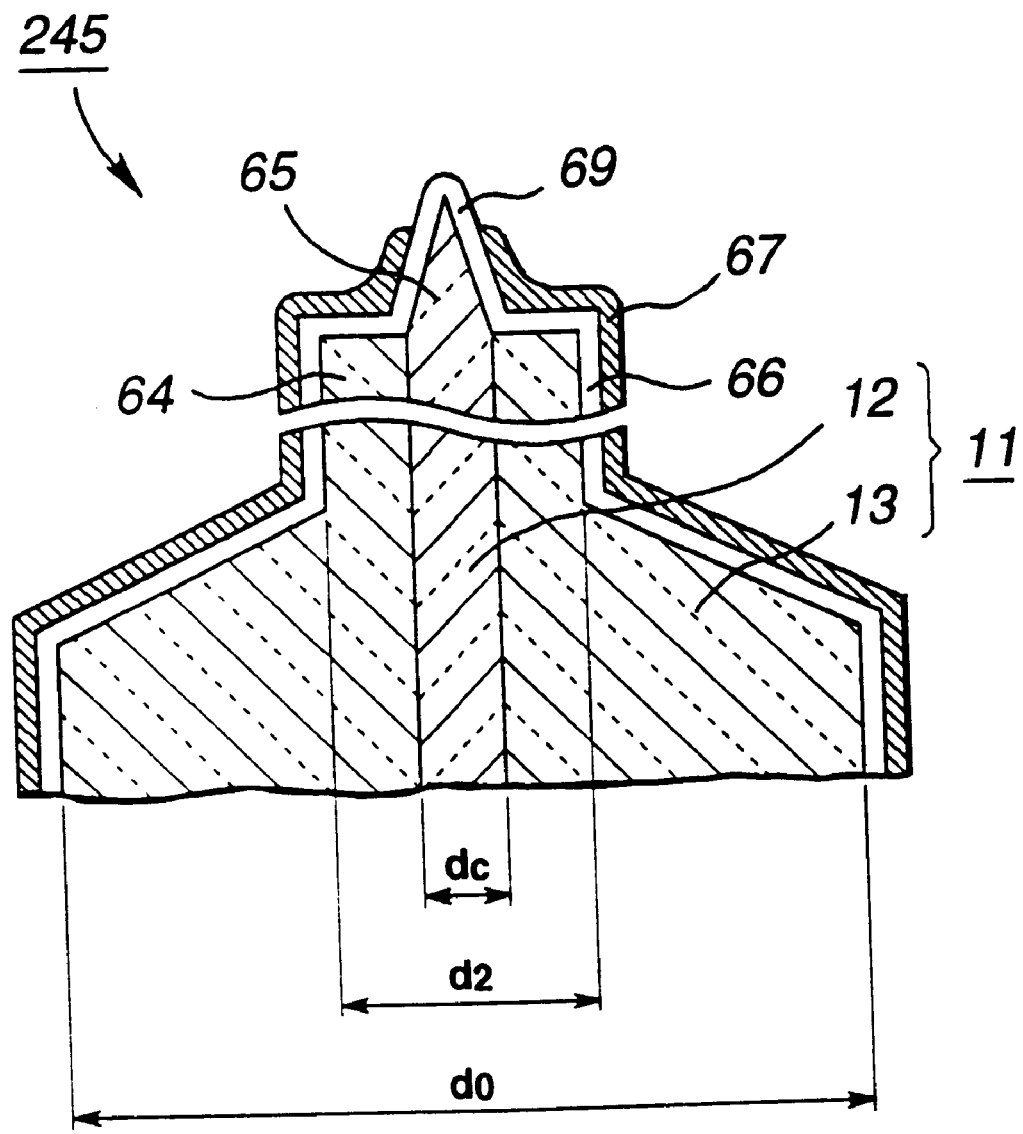
FIG. 57 shows the structure of an optical fiber after coating the tip in the second coating step in the method for producing the optical fiber in the twenty-eighth embodiment.

When the solvent is vaporized off, the synthetic resin is left on the surface of the light-shielding coating layer 66, such that an exposed portion 69, which is the portion of the light-shielding coating layer 66 at the foremost part of the protrusion 65 exposed from the corrosion-resistant coating layer 67 of synthetic resin, is formed, as shown in FIG. 57.

If the viscosity of the solvent having the synthetic resin dissolved therein is high, there are occasions wherein the light-shielding coating layer 66 at the foremost part of the protrusion 65 is not exposed from the corrosion-resistant coating layer 67. However, since the foremost part of the corrosion-resistant coating layer 67 is reduced in thickness, the exposed portion which is the exposed foremost part of the light-shielding coating layer 66 can be formed by etching the corrosion-resistant coating layer 67 in its entirety. The etching solution used at this time may be an alkaline solution such as NaOH or an acid such as dilute hydrochloric acid.

Then, at the aperture forming step, the optical fiber 245, having the light-shielding coating layer 66 and the corrosion-resistant coating layer 67 formed on the surface of the protrusion 65 as described above, is etched by an etching solution composed of an aqueous solution of potassium iodide $KI-I_2$ or an aqueous solution of potassium cyanide.

Since the synthetic resin making up the corrosion-resistant coating layer 67 is corrosion-resistant against the aqueous solution of $KI-I_2$, while the gold constituting the light-shielding coating layer 66 is dissolved in the aqueous solution of $KI-I_2$, the portion of the light-shielding coating layer 66 exposed from the exposed portion 69 is selectively etched, thus forming the aperture 68, which is the foremost part of the protrusion 65 exposed at the light-shielding coating layer 66, as shown in FIG. 12.

Specifically, the optical fiber 245 having the core 12 containing $GeO_2$ having the density distribution, having the cone angle of the protrusion 65 of 20° and coated with gold to a thickness of 400 nm, was etched for one to three minutes with an etching solution which is the solution of $KI-I_2$ with the $KI:I_2$:water weight ration of 20:1:100, diluted by a dilution ratio of 100 in water, to produce the aperture 68 of the order of 30 nm.

On the other hand, the optical fiber 245 of the single-mode fiber having the cone angle of 105° and coated with gold to a thickness of 150 nm was etched for about five minutes with an etching solution which is the solution of $KI-I_2$ with the $KI:I_2$:water weight ratio of 20:1:100, diluted by a dilution ratio of 50 in water, to produce the aperture 68 of the order of 100 nm. It suffices if the etching solution that can be used in the aperture forming step can etch the light-shielding coating layer 66 but cannot etch the corrosion-resistant coating layer 67 as in the aperture forming step of the above-described twenty-third embodiment. By employing such etching solution, the light-shielding coating layer 66 of the exposed portion 69 can be selectively etched in the aperture forming step for forming the aperture 68. The above process can also be executed by dry etching such as by plasma etching.

With the present method for producing the optical fiber, since the light-shielding coating layer 66 at the foremost part of the protrusion where the corrosion-resistant coating layer 67 is not formed can be selectively etched in the aperture forming step, the aperture 68 can be formed easily.

Figure 58A:
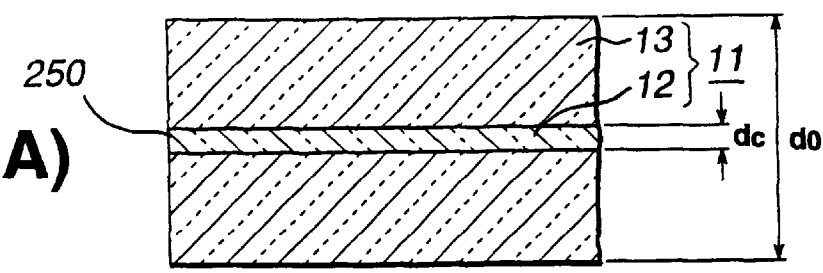
FIGS. 58(A)–58(E) show an etching step of a method for producing an optical fiber according to a twenty-ninth embodiment of the present invention.
Figure 58B:
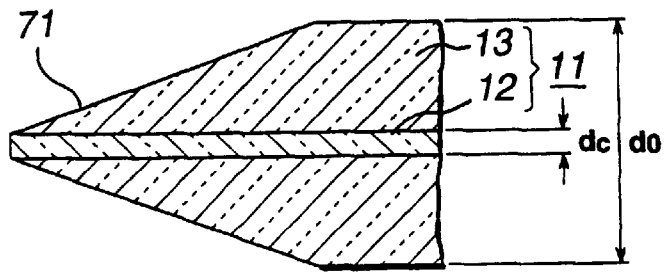
Figure 58C:
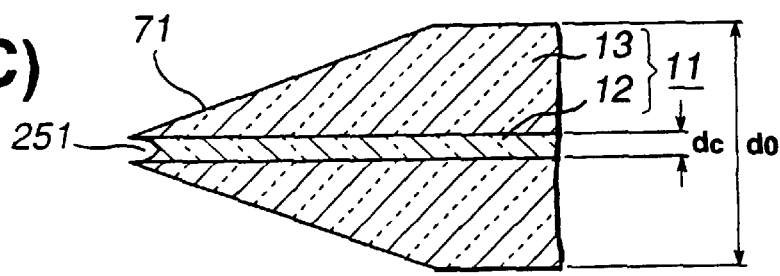
Figure 58D:
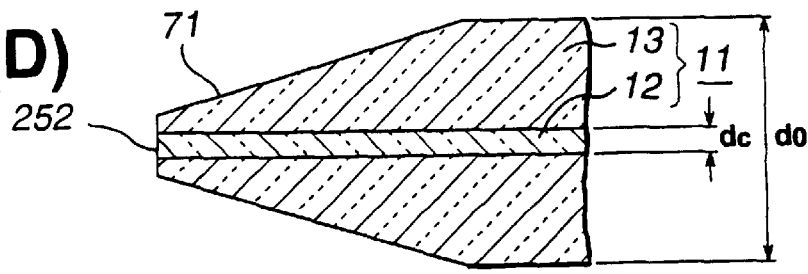
Figure 58E:
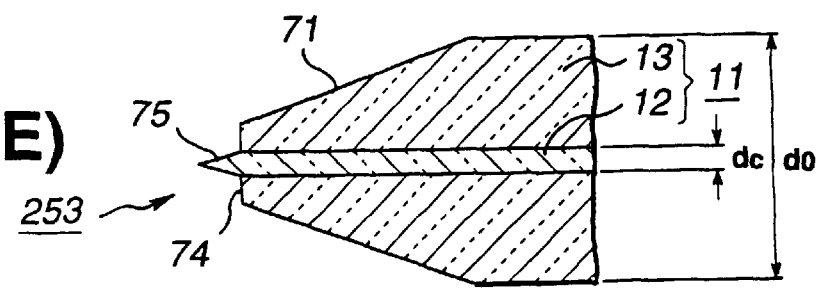

With the optical fiber producing method according to a twenty-ninth embodiment of the present invention, the optical fiber is first etched for forming an optical fiber 253 shaped as shown in FIG. 58E. The optical fiber 253 is then processed as in the processing downstream of the twenty-eighth embodiment described above for producing the optical fiber 70 shown in FIG. 13.

That is, with the method for producing the optical fiber, and end 250 of the optical fiber 11 shown in FIG. 58A is etched for 25 to 30 minutes, as an example, on an interface between hydrofluoric acid and a liquid lighter in specific gravity than hydrofluoric acid, such as spindle oil or silicon oil.

The meniscus is formed as described above in the vicinity of the interface between hydrofluoric acid and the spindle oil or silicon oil. Since this meniscus becomes lower in height as etching of the cladding 13 proceeds, the cladding 113 is etched in a tapering fashion, thus forming the tapered portion 71 in the cladding 13, as shown in FIG. 58B.

The tapered portion 71, thus formed, is etched for two to three minutes by hydrofluoric acid. Since the etching rate of the core 12 in hydrofluoric acid is faster than that of the core 12, a recess 251 receded with respect to the foremost part of the cladding 13 of the tapered portion 71 is formed in the core 12, as shown in FIG. 58C.

Moreover, the tapered portion 71 is etched for 90 minutes, as an example, using an etching solution comprised of a buffered hydrogen fluoride solution having the volumetric ratio X of ammonium fluoride $NH_4F$ of the order of 1.7 and the water volumetric ratio of 1. After etching for about 30 minutes, a flat end 252 comprised of a flat end of the core 12 and the flat end of the tapered portion 71 is formed, as shown in FIG. 58D. As the etching is continued further, since the etching rate of the cladding 13 is faster in the etching solution of the above composition than the etching rate of the core 12, the cladding 13 is first etched to form the flattened portion 74, with the core 12 being protruded from the cladding 13 of the flat portion 74 to form a protrusion 75 having a conically sharpened end, as shown in FIG. 58E.

By processing the optical fiber 253, thus shaped, with the first and second coating steps and opening steps similar to those of the above-described twenty-eighth embodiment, the light-shielding coating layer and the aperture are formed, so that the optical fiber 60 shaped as shown in FIG. 13 is produced.

With a method for producing an optical fiber according to a thirtieth embodiment of the present invention, the first and second etching steps similar to those of the above-described twenty-eighth embodiment are carried out for forming the optical fiber 245 shaped as shown in FIG. 53C. The light-shielding coating layer 66 is formed in the coating step on the surface of the protrusion 65, and a photosensitive layer is formed in a photosensitive layer forming step on the surface of the light-shielding coating layer 66. The light exposed photosensitive layer is removed in the exposed portion forming step for forming an exposed portion at the foremost part of the photosensitive layer. In the aperture forming step, the portion of the light-shielding coating layer 66 exposed from the exposed portion formed at the foremost part of the photosensitive layer is etched for forming the aperture 87 which is the foremost part of the protrusion 65 exposed from the light-shielding coating layer 66. In the photosensitive layer removing step, the photosensitive layer on the surface of the protrusion 65 is removed for producing the optical fiber 80 shaped as shown in FIG. 14.

In the above-described coating step, gold particles are supplied from the foremost part of the protrusion 65 to the protrusion 65 of the optical fiber 245 formed by the first and second etching steps. This forms the light-shielding coating layer 66 made up of a gold layer about 200 nm thick on the surface of the protrusion 65 from the foremost part of the protrusion 65. The thickness of the light-shielding coating layer 66 can be controlled by varying the coating time. The material that can be used as light-shielding coating layer 66 is not limited to gold and may be any of materials having high light shielding properties and that can be etched by the aperture forming step, such as aluminum, silver or platinum, as in the coating step of the twenty-third embodiment.

Figure 59:
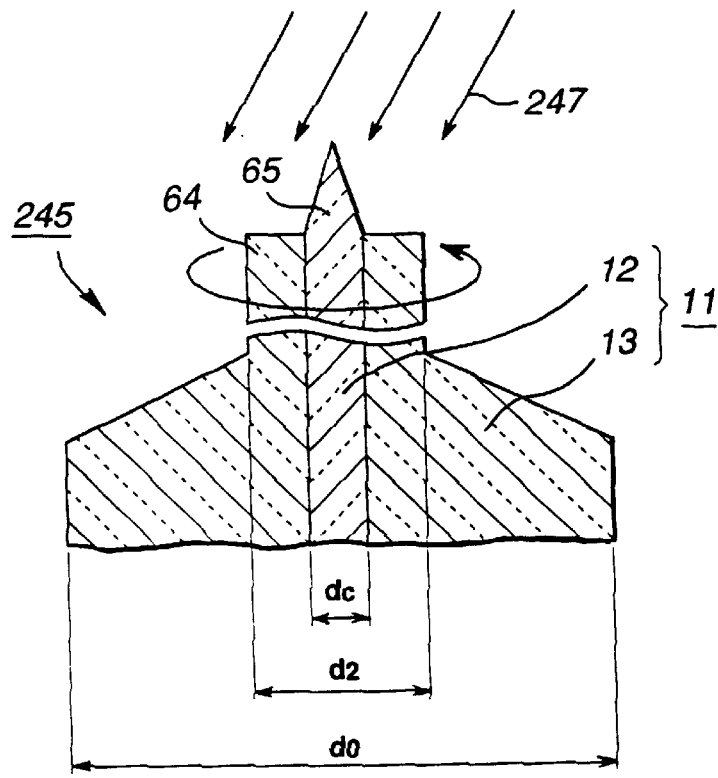
FIG. 59 shows an etching step of a method for producing an optical fiber according to a thirtieth embodiment of the present invention.

Alternatively, a gold vapor 247 may be supplied in vacuum in the coating step from a obliquely upward direction to the foremost part of the protrusion 65 for vacuum evaporation for forming the light-shielding coating layer 66, as shown in FIG. 59. Alternatively, the gold vapor 247 may be supplied in the coating step to the foremost part of the protrusion 65 in vacuum for performing vacuum evaporation for forming the light-shielding coating layer 66, as shown in FIG. 59. In this case, evaporation is carried out while the optical fiber 245 is rotated about its center axis for uniform evaporation on the surface of the protrusion 65. In the present coating step, a material such as chromium, germanium or silicon that can readily be adsorbed to glass can be coated on the protrusion 65 and subsequently a material having high light shielding properties such as gold can be coated thereon to provide a dual-layer structure of the light-shielding coating layer 66 having high peeling resistance.

If the light-shielding coating layer 66 can be formed, the coating in the present coating step can also be executed not only by the above-mentioned sputtering or evaporation but also by electroless plating.

If the coating of the present coating step is performed by sputtering as described above, the number of optical fibers that can be processed at a time using the same scale device can be increased as compared to that achieved with the use of vacuum evaporation thus enabling the production cost to be lowered.

Figure 60:
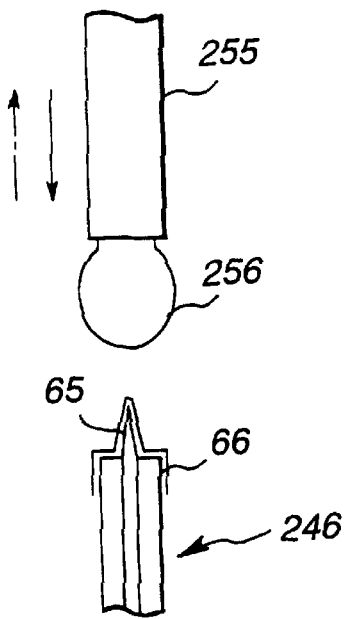
FIG. 60 shows a step of forming a photosensitive layer in the method for producing the optical fiber in the thirtieth embodiment.

Next, in the photosensitive layer forming step, a photosensitive material is deposited on the protrusion 65 of the optical fiber 245 on which the light-shielding coating layer 66 has been formed in the above coating step. A so-called photoresist is used as the photosensitive material of the photosensitive layer. A syringe filled with the photoresist is secured on a micro-motion table for extruding the photoresist for causing a drop 256 of the photoresist at the distal end of the syringe 255, as shown in FIG. 60.

Figure 61:
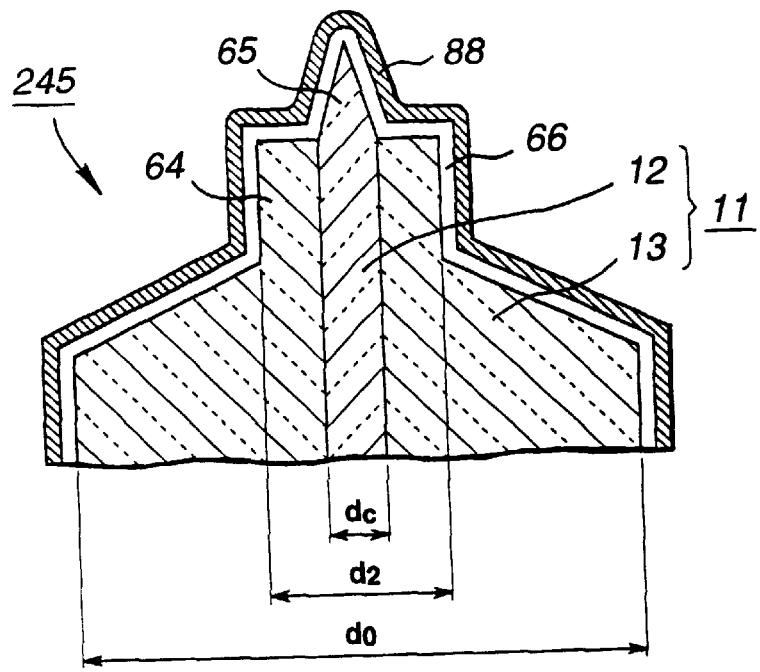
FIG. 61 shows a structure of an optical fiber after forming a photosensitive layer in the photosensitive layer forming step in the method for producing the optical fiber of the thirtieth embodiment.

Next, the optical fiber 245 is secured below the photoresist drop 256 with the protrusion 65 directed upwards. While the minute-motion table is moved quietly to prevent descent of the photoresist drop 256, the syringe is moved down for bringing the photoresist drop 256 into contact with the protrusion 65 as indicated by a solid-line arrow in FIG. 60. After deposition of the photoresist, the syringe is again raised, as indicated by a wavy line in FIG. 60. This deposits the photoresist on the surface of the light-shielding coating layer 66 of the protrusion 65. By drying the photoresist, a photoresist layer 88 is formed on the surface of the light-shielding coating layer 66, as shown in FIG. 61.

Figure 62A:
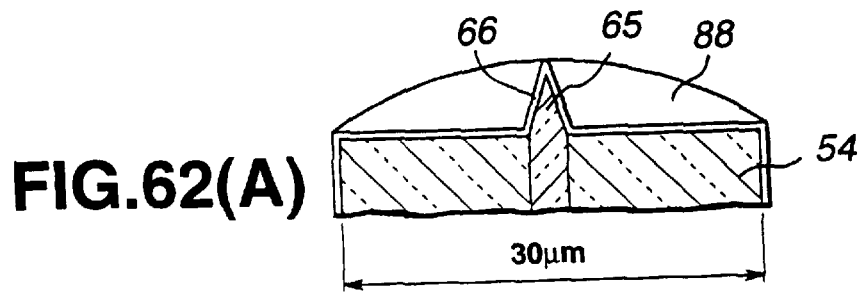
FIGS. 62(A)–62(C) illustrate a deposited photosensitive material in case the clad diameter is changed in the photosensitive layer forming step of the optical fiber producing method of the thirtieth embodiment.
Figure 62B:
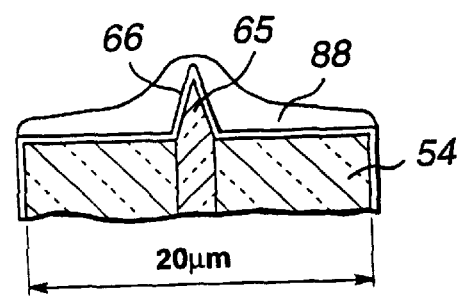
Figure 62C:
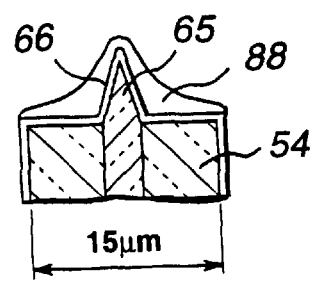

The thickness of the foremost part of the photoresist layer 88 is governed by the viscosity of the photoresist and by the diameter of the reduced-diameter portion 64. With the use of a photoresist having the viscosity of 50 mPa●s, the diameter of the reduced-diameter portion 64 was varied to 30 $\mu$m, 20 $\mu$m and 15 $\mu$m and the cross-sectional shape of the photoresist layer deposited on the tip 55 was checked. The results are shown in FIGS. 62a, 62b and 62c.

That is, if the diameter of the reduced-diameter portion 64 is enlarged, the thickness of the distal end of the photosensitive layer 88 is increased, whereas, if the diameter of the reduced-diameter portion 64 is decreased, the thickness of the distal end of the photosensitive layer 88 is decreased. If the diameter of the reduced-diameter portion 64 shown in FIG. 62b is 20 $\mu$m, the distal end of the photosensitive layer 88 is 100 nm, whereas, if the diameter of the reduced-diameter portion 64 shown in FIG. 62c is 15 $\mu$m, the distal end of the photosensitive layer 88 is 35 nm.

On the other hand, the distal end of the photosensitive layer 88 is increased and reduced in thickness with increase or decrease in the viscosity of the photoresist, respectively. The thickness of the photosensitive layer 88 is also changed with the thickness of the light-shielding coating layer 66, such that, if the light-shielding coating layer 66 is increased in thickness and the shape of the foremost part of the reduced-diameter portion 64 and the protrusion 65 approaches to the flat shape, the photoresist is more susceptible to deposition to increase the thickness of the photosensitive layer 88.

Since the diameter of the reduced-diameter portion 64 can be controlled by varying the etching time for the first etching step, the distal end of the photosensitive layer 88 can be set to a desired thickness. Alternatively, the distal end of the photosensitive layer 88 can be set to a desired thickness by controlling the coating time, or by controlling the thickness of the light-shielding coating layer 66.

Although the photosensitive layer 88 is formed in the above description by the photoresist, there is no particular limitation to the material making up the photosensitive layer 88 provided that it has photosensitivity and is not etched with the etching solution used in the aperture forming step. Although the syringe filled with the photoresist is moved for depositing the photoresist on the protrusion 65, the optical fiber 245 may be moved for depositing the photoresist thereon.

Figure 63:
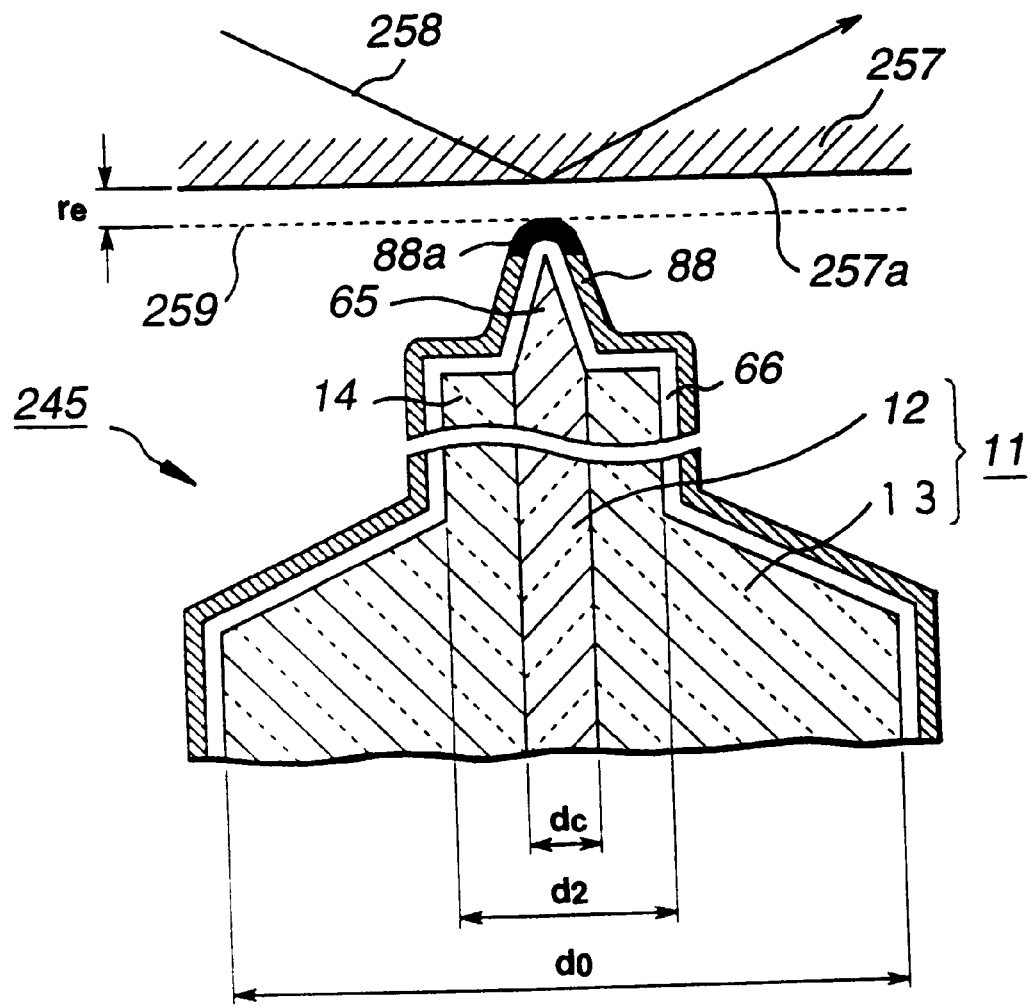
FIG. 63 illustrates a photosensitizing step in the method for producing the optical fiber of the thirtieth embodiment.

Next, only the distal end of the photosensitive layer 88 is selectively etched with the evanescent light. Specifically, a laser light beam 258, such as He-Cd laser, is caused to fall on a prism 257 at an angle exceeding the angle of total reflection for forming a field 258 of the evanescent light, as shown in FIG. 63. That is, while the laser light beam 258 incident at the angle exceeding the angle of total reflection is reflected by an interface 257a between the prism 257 and air, a field 259 of the evanescent light is formed in an area over a distance corresponding to the wavelength of the laser light beam 258 as measured from the surface of the prism 257.

The optical fiber 245, on which the photosensitive layer 88 has been formed, is caused to approach to the surface of the prism 257 on which the evanescent light field 259 has been formed as described above.

The intensity of the evanescent light in the evanescent light field 259 is adapted to be decreased exponentially with increased distance from the surface of the prism 259. Therefore, if a distance $R_e$ between the surface of the prism 257 and the foremost part of the optical fiber 245 is on the order of the wavelength of the laser light beam 258, the light intensity of the evanescent light at the distal end of the protrusion 65 becomes significantly higher than the light intensity at the proximal end of the protrusion 65. That is, a state equivalent to the state in which the light is directed only to the distal end of the photosensitive layer 88 is created, so that the distal end of the photosensitive layer 88 is exposed with the evanescent light and a light-exposed portion 88a is formed at the distal end of the photosensitive layer 88.

Figure 64:
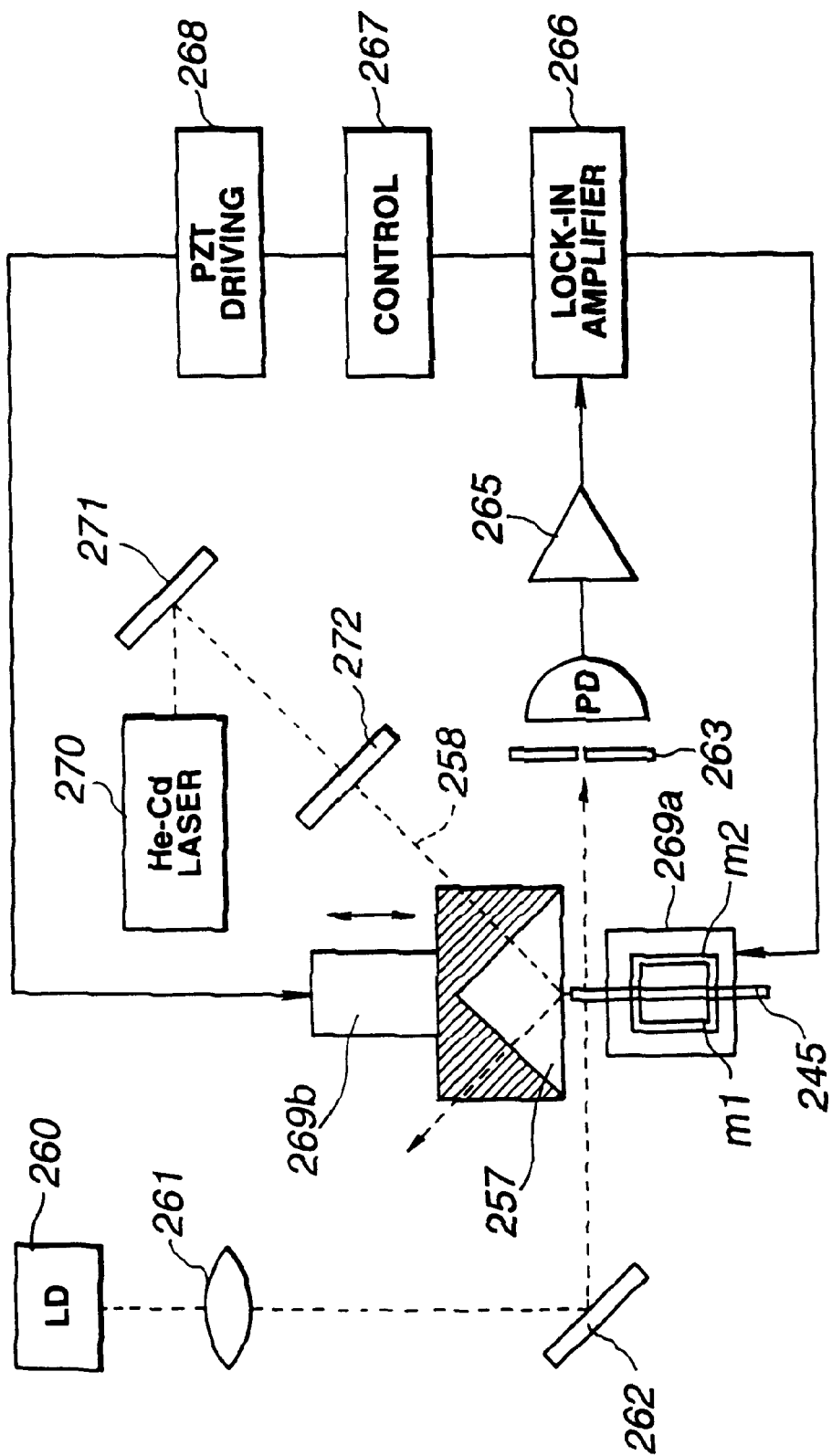
FIG. 64 illustrates a structure of an interatomic force microscope employed in the photosensitizing step of the thirtieth embodiment.

For such light exposure, the distal end of the protrusion 65 needs to approach to the surface of the prism 257 with precision not coarser than the wavelength of the laser light beam 258. To this end, in the present light exposure step, an atomic force microscope constructed as shown in FIG. 64 is used for controlling the position between the optical fiber 245 and the prism 257.

That is, the atomic force microscope is configured for detecting the atomic force acting between the surface of the prism 257 and the optical fiber 245 oscillated with the number of its natural oscillations for measuring the distance between the foremost part of the optical fiber 245 and the prism 257, and includes a deviation detector for detecting the amplitude of the oscillations of the optical fiber 245 derived from the interatomic force, a driving unit for moving the optical fiber 245 and the prism 257 and a controller for controlling the driving unit in response to the amplitude of oscillations of the optical fiber 245 as detected by the deviation detector.

The deviation detector collimate the laser light generated by a laser diode 260 by a lens 261 to form a deflection detection beam which is reflected by a mirror 262 so as to be radiated on a lateral surface of the optical fiber 245. The deflection detection light scattered by the optical fiber 245 is received by a photodiode 264 via a slit 263 provided facing the mirror 262. An output of the photodiode 264 is amplified by an amplifier 265 so as to be detected by a lock-in amplifier 266.

Figure 65:
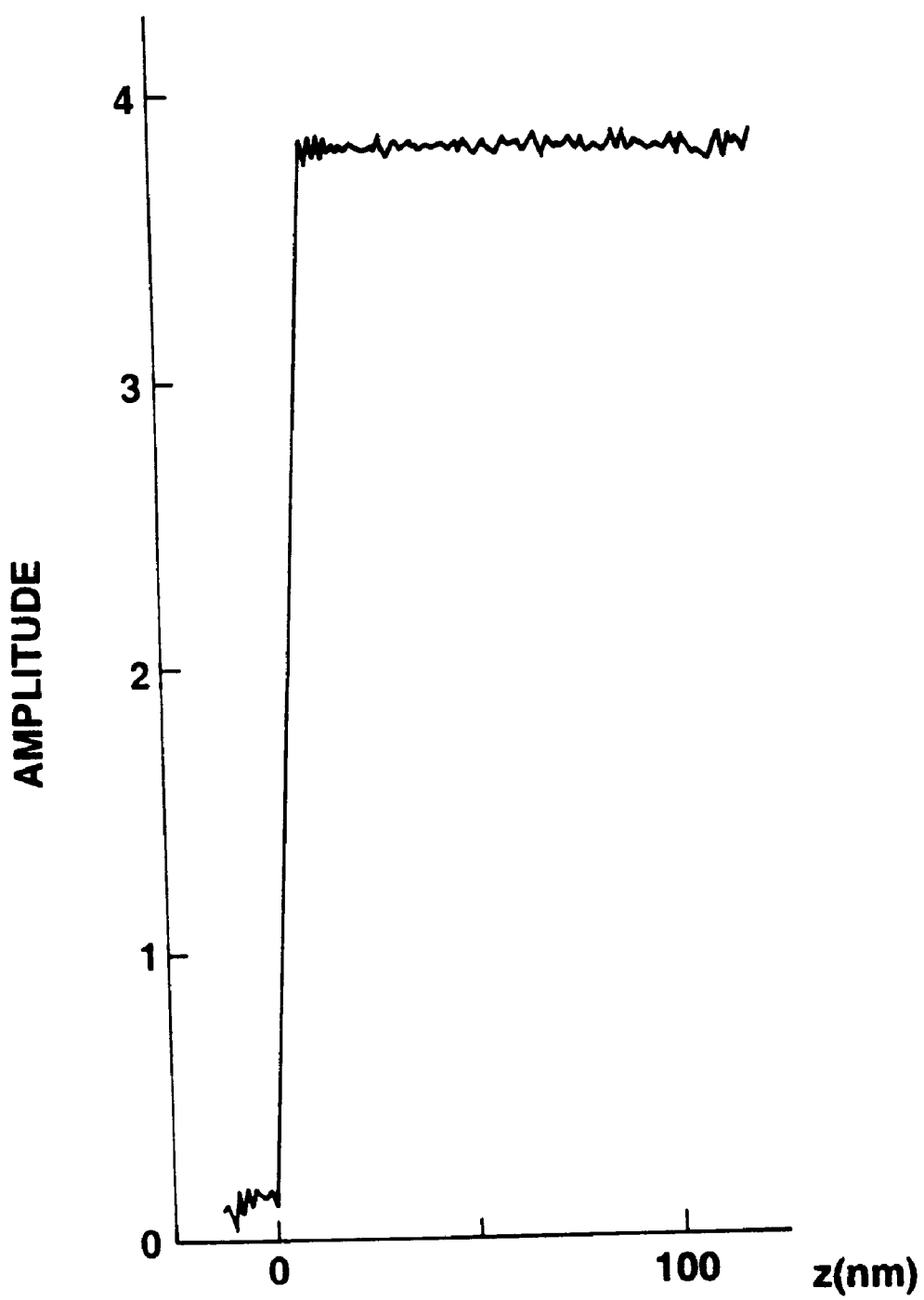
FIG. 65 shows the relation between the amplitude of optical fiber vibrations and the distance between the tip of the optical fiber and the surface of a prism in the interatomic force microscope.
Figure 66:
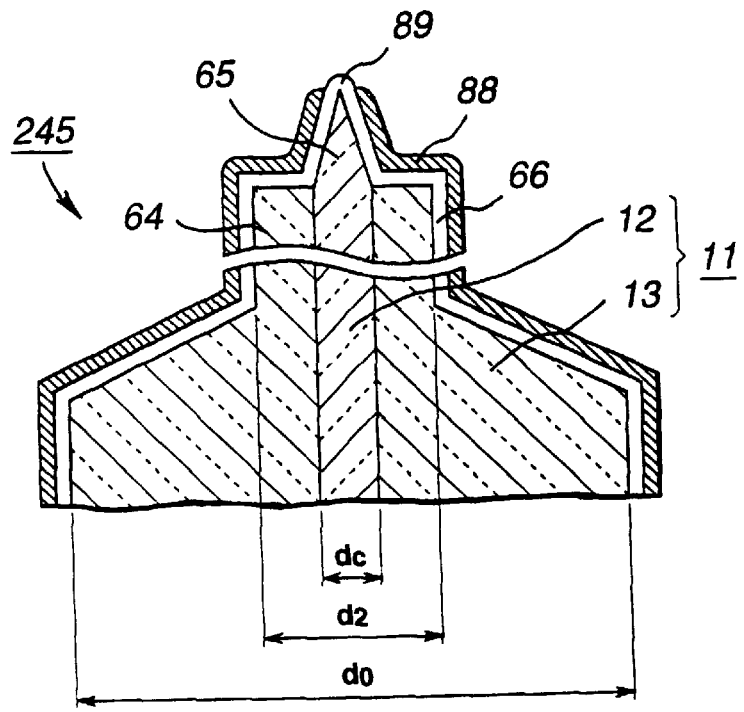
FIG. 66 shows a structure of an optical fiber in which an exposed portion has been formed in an exposed portion forming step of the thirtieth embodiment.

If, when the optical fiber oscillated with the number of natural vibrations by a piezoelectric element or the like, is caused to approach to the surface of the prism 257, the distance between the foremost part of the optical fiber 245 and the surface of the prism 257 becomes shorter than about 10 nm. The atomic force then acts in response to the distance between the foremost part of the optical fiber and the surface of the prism 257 thus decreasing the amplitude of the optical fiber 257. The amplitude of the optical fiber 245 is decreased abruptly when the distance between the foremost part of the optical fiber 245 and the surface of the prism 257 becomes not larger than 10 nm, as shown for example in FIG. 65.

If the amplitude of the optical fiber 245 is varied in this manner, the amplitude of the output of the photodiode 264 is changed. The lock-in amplifier 66 detects the amplitude of the output of the photodiode 264 supplied via amplifier 265 to find the amplitude of the optical fiber 245 to detect the distance between the optical fiber 245 and the surface of the prism 257.

The controller 267 controls the operation of the driving unit based on the distance between the optical fiber 245 and the surface of the prism 257 as detected by the deflection detector. The driving unit has a PZT driver 268 for driving a PZT 269a secured to the optical fiber 245 and a PZT 269b secured to the prism 257 under control by the controller 267. This drives the PZTs 269a and 269b depending on the distance between the optical fiber 245 and the surface of the prism 257 as detected by the deflection detector for maintaining distance between the optical fiber 245 and the surface of the prism 257 at a value of the order of the wavelength of the laser light beam. Since the optical fiber 245 needs to be dismounted after the end of the light exposure, it is secured by a magnet m1 attached to the optical fiber 245 to a magnet m2 provided on the PZT 269a. Since the optical fiber 245 is secured in this manner by the magnets m1 and m2, the optical fiber 245 can be exchanged easily.

If, in such state, the laser light beam 258 generated by a laser light source 270 is reflected by a mirror 271 and incident on the prism 257 via a shutter 272, the evanescent light field 259 is generated on the surface of the prism 257 as described above for forming the light-exposed portion 88a on the distal end of the photosensitive layer 88.

Figure 67:
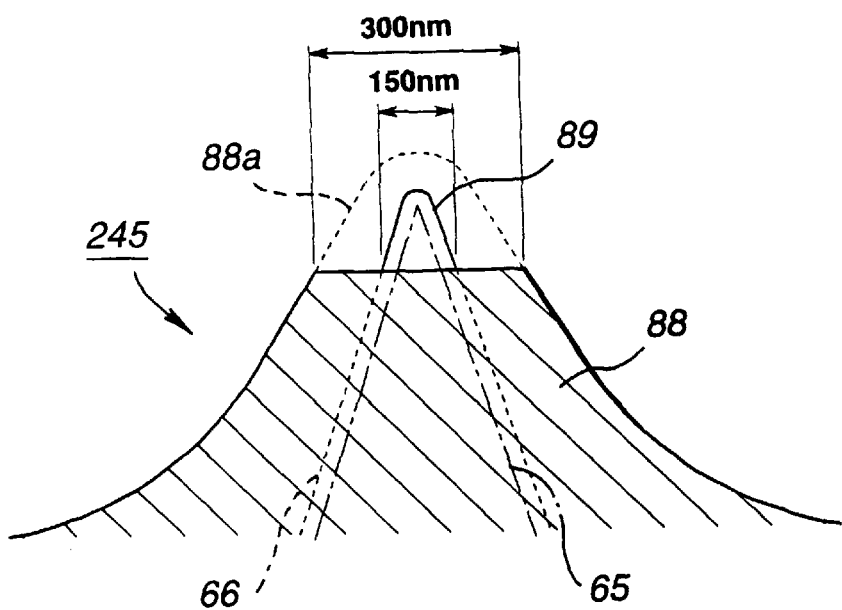
FIG. 67 is an enlarged view showing an exposed portion formed in the exposed portion forming step.

Next, in the light exposed portion forming step, the light-exposed portion 88a of the photosensitive layer 88, obtained by the above light exposure step, is removed for forming an exposed portion 89 on the distal end of the photosensitive layer 88. That is, on developing the photoresist forming the photosensitive layer 88 with a developing solution composed of an organic alkaline solution, the light-exposed portion 88a is removed to from the light-exposed portion 89 as shown in FIG. 67. The exposed portion 89 is the portion light-shielding coating layer 66 exposed from the photosensitive layer 88. FIG. 67 shows the shape resulting from etching for 78 minutes using an etching solution of a buffered hydrogen fluoride solution having a ratio of the aqueous solution of ammonium fluoride to hydrofluoric acid to water of 1.7:1:1, coating in the first etching step, etching for 120 minutes using an etching solution of a buffered hydrogen fluoride solution having the ratio of the aqueous solution of ammonium fluoride to hydrofluoride acid to water of 10:1:1 in the second etching step, gold coating to a thickness of 200 nm for forming a photoresist layer, light exposure for 0.125 second, with the laser power incident on the prism 257 set to 0.25 mW, and development for 30 seconds.

Next, in the aperture forming step, the optical fiber 245, on which the exposed portion 89 has been formed in the above exposed portion firming step, is etched for forming the aperture 87 which is the distal end of the protrusion 65 exposed from the light-shielding coating layer 66. Specifically, the gold constituting the light-shielding coating layer 66 is etched using an aqueous solution of potassium iodide KI-I$_2$ or an aqueous solution of potassium cyanide. Since the photoresist of the photosensitive layer 88 is corrosion-resistant against the aqueous solution of KI-I$_2$, while the gold of the light-shielding coating layer 66 is dissolved in the aqueous solution of KI-I$_2$, the light-shielding coating layer 66 exposed form the exposed portion 89 is selectively etched for forming the aperture 87 which is the distal end of the protrusion 65 exposed from the light-shielding coating layer 66.

As in the aperture forming step of the twenty-third embodiment, the etching solution that can be used in the aperture forming step can be a solution of halogens, such as aqua regia, iodine or bromine, provided that such etching solution can etch the light-shielding coating layer 66 without etching the photosensitive layer 88. Alternatively, dry etching such as plasma etching can be used, or the light-shielding coating layer 66 exposed from the exposed portion 89 in the aperture forming step may be selectively etched for forming the aperture 87.

Finally, in the photosensitive layer removing step, the photosensitive layer 88 on the surface of the optical fiber 245 is removed for forming the optical fiber 80 arranged as shown in FIG. 14. The diameter of the aperture 87 of the optical fiber 80 is on the order of 50 nm as shown in a microscopic photograph of the foremost part of the optical fiber 80 shown in FIG. 15.

The optical fiber 80 shown in FIG. 14 is produced by employing an optical fiber having the core 12 in which GeO$_2$ is added with a density distribution. The optical fiber 245, having the cone angle at the protrusion 85 of 20° and coated with gold to approximately 200 nm, is etched or 10 minutes using, as an etching solution, an aqueous solution obtained by diluting the aqueous solution of KI-I$_2$ by a dilution ratio of 50. The aqueous solution of KI-I$_2$ used has the KI:I$_2$:water ratio of 20:1:400. The photosensitive layer 88 may also be left on the surface of the light-shielding coating layer 66 by not performing the step of removing the photosensitive layer 88.

In the present optical fiber producing method according to the thirtieth embodiment of the present invention, since only the distal end of the photosensitive layer 88 is exposed to light using the evanescent light in the light exposure step, a minor area can be etched as compared to the case of using the usual light for light exposure. In addition, with the present optical fiber producing method, the exposed photosensitive material is removed for forming the exposed portion 89, after which the light-shielding coating layer 66 of the protrusion 65 is etched for selectively etching the light-shielding coating layer 66 exposed from the exposed portion 89, thus enabling the minute-sized aperture 87 to be formed easily for facilitating the production of the optical fiber for reducing the production cost.

Meanwhile, in the formation of the aperture in the above-described twenty-eighth embodiment, since the light-shielding coating layer 66 on the distal end of the protrusion 65, exposed by surface tension of the solvent obtained on dissolving the synthetic resin, is etched for forming the aperture 68, only the optical fiber having the reduced-diameter portion 64 at the proximal end of the protrusion 65 can be processed. Conversely, with the present thirtieth embodiment, since the portion of the light-shielding coating layer 66 exposed from the exposed portion 89 obtained on removing the light-exposed portion 88a of the photosensitive layer 88 can be selectively etched, the aperture can be formed not only on the optical fiber 245 shaped as shown in FIG. 53c but also on the foremost part of the optical fiber having the tip 14 sharpened from the outer rim of the cladding to the center of the core 12.

In the optical fiber producing method according to a thirty-first embodiment of the present invention, an optical fiber in which the corrosion-resistant coating layer 67 or the photosensitive layer 88 is left on the optical fiber surface as shown in FIG. 14 is formed by the first and second etching steps, coating step, photosensitive layer forming step, light exposure step, exposed portion forming step and the aperture forming step similar to those of the twenty-ninth or thirtieth embodiments described above.

Figure 68:
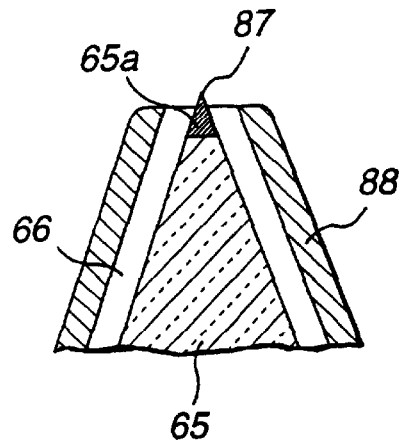
FIG. 68 illustrates a pit forming step in the optical fiber producing method of a thirty-first embodiment of the present invention.
Figure 69:
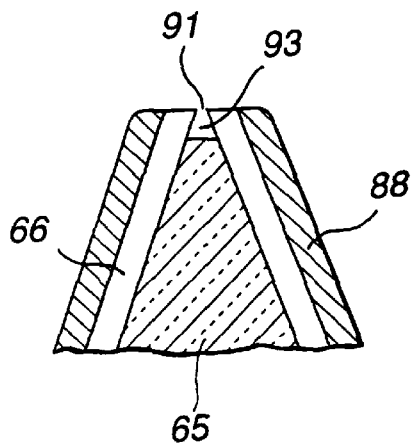
FIG. 69 shows the structure of an optical fiber in which a pit has been formed in the pit forming step of the optical fiber producing method in the thirty-first embodiment.
Figure 70:
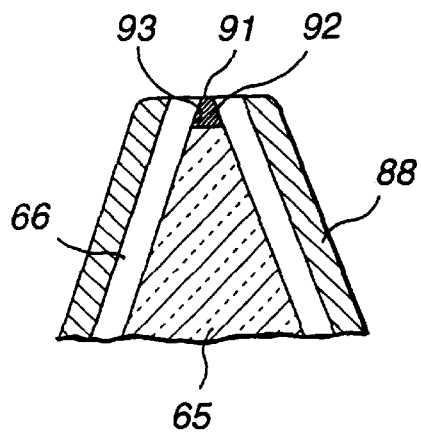
FIG. 70 shows the structure of an optical fiber in which a dye has been affixed in the dye affixing step of the optical fiber producing method of the thirty-first embodiment.

Next, in the pit forming step, the protrusion 65 exposed via the aperture 87 formed up to the aperture forming step is etched with a buffered hydrogen fluoride solution, as shown in FIG. 68. At this time, the gold of the light-shielding coating layer 66 is not etched with the buffered hydrogen fluoride solution, such that a distal end 55a of the protrusion 65 is receded from the foremost part of the light-shielding coating layer 66 to form a pit 93. An aperture 91 is formed at the distal end of the pit 93.

Although the photosensitive layer 88 need not necessarily be left in the pit forming step, the photosensitive layer 88 is not removed in performing the etching for forming the pit because the etching solution is intruded via a crack, if any, present in the light-shielding coating layer 66 formed by the coating step.

Figure 16:
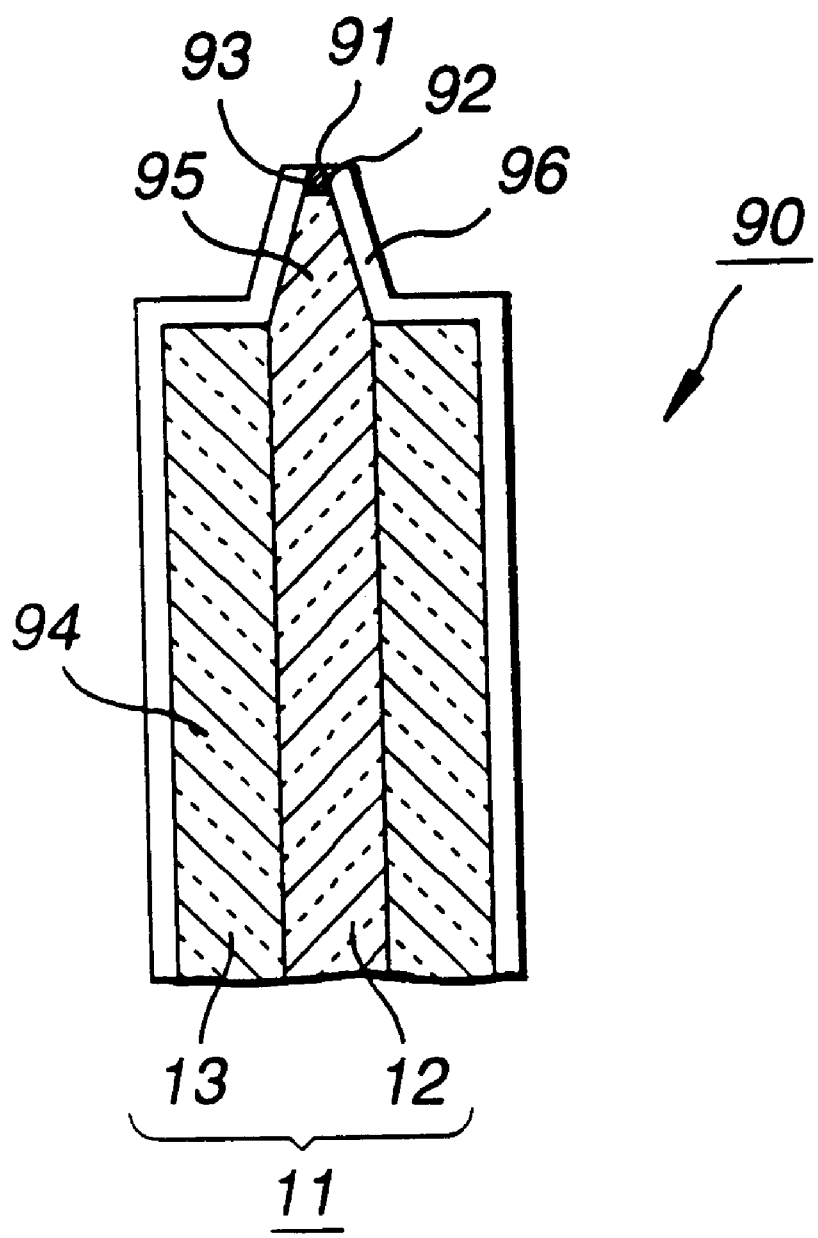
FIG. 16 illustrates a structure of an optical fiber according to a tenth embodiment of the present invention.

Next, a substance whose optical properties are changed in response to the surrounding environment, such as dye or reagent, is deposited on the pit 93 formed in the pit forming step. Specifically, the foremost part of the optical fiber is dipped in a solvent impregnated with the dye for depositing the solvent in the pit 93, after which the solvent on the surface of the photosensitive layer 88 is removed. This deposits the substance 92, such as dye, in the pit 93. The photosensitive layer 88 on the surface of the light-shielding coating layer 66 is removed to complete an optical fiber 90 shaped as shown in FIG. 16.

Alternatively, a substance composed of a dye or a solvent doped with a dye may be deposited after removal of the photosensitive layer 88 on the surface of the light-shielding coating layer 66 for forming the optical fiber 90 having the substance 92 such as the dye deposited in the pit 93.

Thus, with the present optical fiber producing method of the present invention, the substance for detecting the surrounding environment may be deposited in the pit 93 formed by recessing the core of the protrusion from the light-shielding coating layer 66 for producing the optical fiber having improved durability.

In addition, since the diameter of the aperture 91 of the optical fiber 90 is 50 nm, as mentioned above, it is possible with the present optical fiber producing method to produce the optical fiber having improved spatial resolution.

The optical fiber producing method according to a thirty-second embodiment of the present invention includes a step of forming a tip comprised of a tapered core 12 and a tapered cladding 13 by pulling the core 12 formed of quartz SiO$_2$ doped with germanium dioxide GeO$_2$ and the cladding 13 formed of quartz SiO$_2$ in the heated state, and an etching step of etching the tip for forming the protrusion which is the sharpened portion of the core 12 extended from the end of the tip.

Figure 71A:
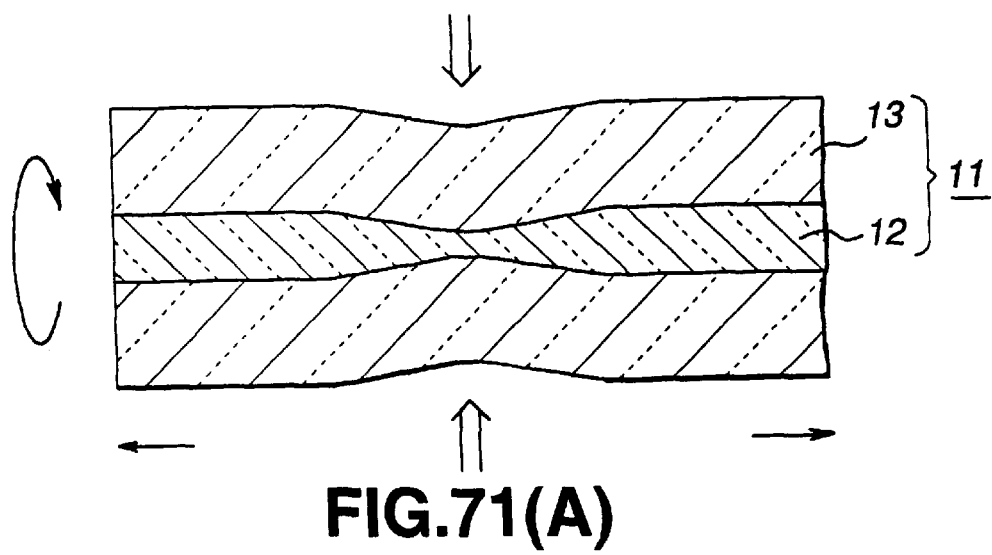
FIGS. 71A–71B show a method for producing an optical fiber according to a thirty-second embodiment of the present invention.
Figure 71B:
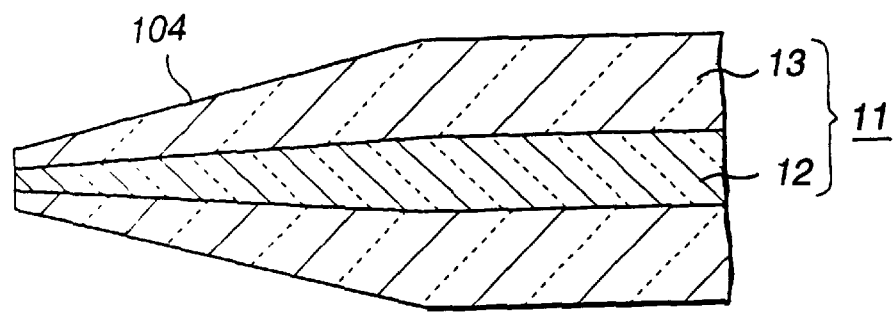

First, in the tip forming step, a micropipet puller is used for extending the optical fiber 11 under heating as shown in FIG. 71A for reducing the diameters of the core 12 and cladding 13. After the optical fiber 11 has been stretched until the desired diameters of the core 12 and the cladding 13 are reached, the optical fiber is cut to form the tip 104 at the end of the optical fiber 11. The tip 104 is formed by the core 12 and the cladding 13 both of which are tapered as shown in FIG. 71B.

Then, at the etching step, the tip 104 is etched, using the etching solution having a volume ratio of the aqueous solution of ammonium fluoride to hydrofluoric acid to water of X:1:Y, where Y is arbitrary, with the volume ratio of the aqueous solution of ammonium fluoride being on the order of 10.

If the optical fiber 11 of the above composition is etched using such etching solution, the core 13 at the foremost part of the tip 104 is first etched because the etching rate of the cladding 13 is faster than that of the core 12 as in the twenty-eighth embodiment described above. In this manner, a protrusion 105 which is the conically sharpened end portion of the core 12, is extended from the cladding 13 at the foremost part of the tip 104, as shown in FIG. 17.

Similarly to the twenty-third embodiment, described above, the present optical fiber has the increased density of germanium dioxide at the center of the core 12, so that the protrusion 105 is sharpened depending on the distribution of germanium dioxide $GeO_2$ thus assuring a conical shape having improved symmetry.

Thus, with the present optical fiber producing method, the protrusion 105 which is the conically sharpened end portion of the core 12 protruded from the foremost part of the cladding 13 can be formed easily at the foremost part of the tip 104 comprised of the tapered core 12 and the tapered cladding 13.

With the method for producing the optical fiber according to a thirty-third embodiment of the present invention, the tip 104 is formed at an end of the optical fiber 11, as shown in FIG. 71B, by the processing similar to that of the tip forming step of the above-described thirty-second embodiment.

Figure 72:
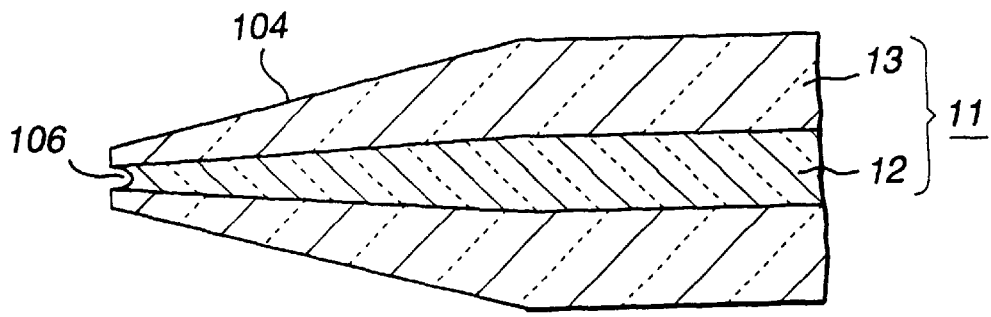
FIG. 72 shows a method for producing an optical fiber according to a thirty-third embodiment of the present invention.

The foremost part of the tip 104 thus formed is then etched with hydrofluoric acid. In hydrofluoric acid, since the etching rate of the core 12 is faster than that of the cladding 13, the core 12 is first etched for forming a recess 106, as shown in FIG. 72.

The tip 104 is then etched by an etching step similar to that of the thirty-third embodiment described above. If etching is continued for a time longer than the etching time of the thirty-second embodiment, the core 12 is protruded from the portion of the cladding 13 at the foremost part of the tip 104, as in the thirty-second embodiment, for forming the protrusion 105 which is the conically sharpened end portion of the protruded core 12.

In a method for producing an optical fiber according to a thirty-fourth embodiment of the present invention, processing similar to that of the thirty-second embodiment or the thirty-third embodiment is first carried out for forming the optical fiber 100 shaped as shown in FIG. 17.

The surface of the protrusion 105 of the optical fiber 100, thus formed, is coated in a similar manner to that of the twenty-ninth embodiment or the thirtieth embodiment, for forming a light-shielding coating layer 116. In addition, the processing similar to that of the twenty-ninth embodiment or the thirtieth embodiment, for forming an aperture 117 which is the distal end of the protrusion 105 exposed form the light-shielding coating layer 116. This completes the optical fiber 110 shaped as shown in FIG. 18.

In a method for producing an optical fiber according to a thirty-fifth embodiment of the present invention, etching similar to that of the first and second etching steps of the twenty-eighth embodiment is first carried out for forming the reduced-diameter portion 64 and the protrusion 65 as shown in FIG. 53C.

The optical fiber thus provided with the protrusion 65 is etched using, as an etching solution, the above-mentioned buffered hydrogen fluoride solution with the water volume ratio Y (Y:30 or higher). Specifically, the optical fiber is etched in the second etching step for about 20 minutes, using an etching solution of a buffered hydrogen fluoride solution having the ammonium fluoride volume ratio X of 10, for forming the protrusion 65. The optical fiber 11 is further etched for about 15 minuets using, as an etching solution, a buffered hydrogen fluoride solution having the ammonium fluoride volume ratio X of 10 and the water volume ratio Y of 30.

Figure 73:
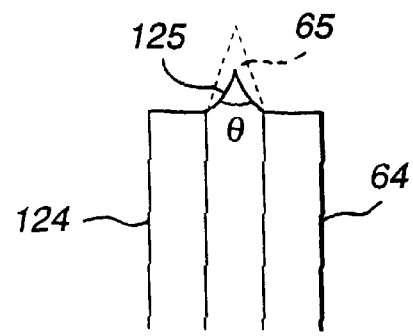
FIG. 73 shows a method for producing an optical fiber according to a thirty-third embodiment of the present invention.

By employing such etching solution for etching, the surface of the protrusion 65 is etched first and thus reduced in diameter because the etching rate for the core 12 is substantially equal to that for the cladding 13 and, with lapse of the etching time, the length L of the protrusion 65 (tip length) is decreased, while the core angle θ is increased, until a protrusion 125 having the cone angle θ which becomes smaller towards the distal end is formed, as shown in FIG. 73. The top length L and the end cone angle θ are 2.1 µm and 28°, respectively, as shown in an enlarged view for the protrusion 125 in FIG. 74.

Figure 77:
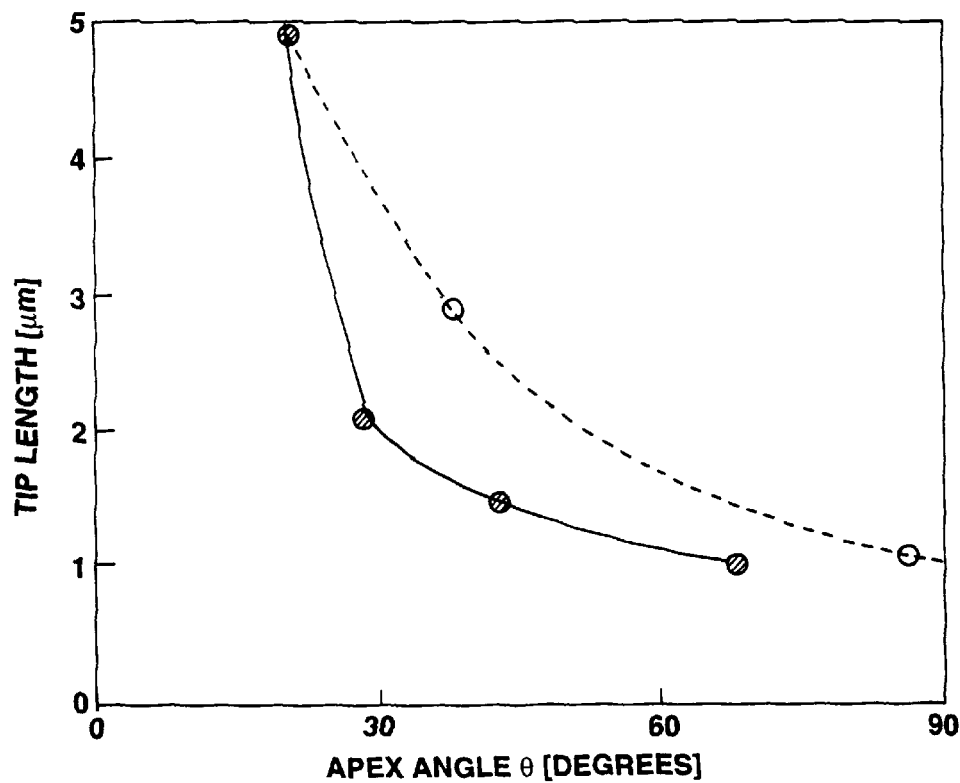
FIG. 77 shows the relation between the apex angle and the tip length of a sharpened core formed by the optical fiber producing method according to thirty-third and twenty-eighth embodiments.

The relation between the tip length L and the end cone angle θ for the protrusion 125 thus etched and the protrusion 65 formed by the first and second etching steps of the twenty-eighth embodiment was checked. Thus it was found that the tip length L of the protrusion 125 for the same cone angle θ is smaller, as shown in FIG. 77. In FIG. 77, black circle dots specify the protrusion, while square points specify the protrusion 65. That is, it is possible with the present optical fiber producing method to reduce the tip length L.

Finally, the light-shielding coating layer 116 and the aperture 127 similar to those of the twenty-ninth embodiment of the thirtieth embodiment are formed on the surface of the protrusion 125. This completes the optical fiber 120 shaped as shown in FIG. 21.

Figure 75:
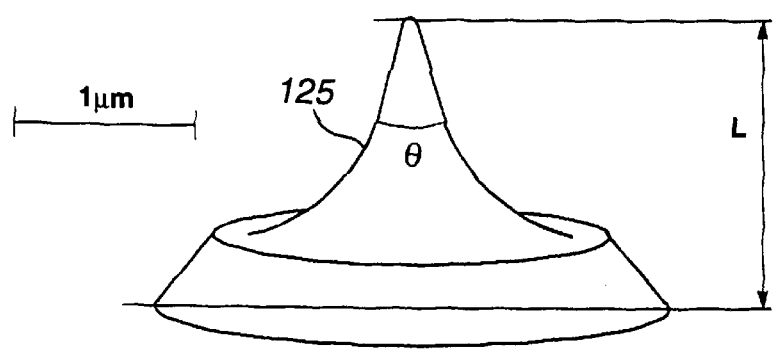
FIG. 75 is an enlarged perspective view showing the shape of another tip of an optical fiber produced by the optical fiber producing method of the thirty-third embodiment.
Figure 76:
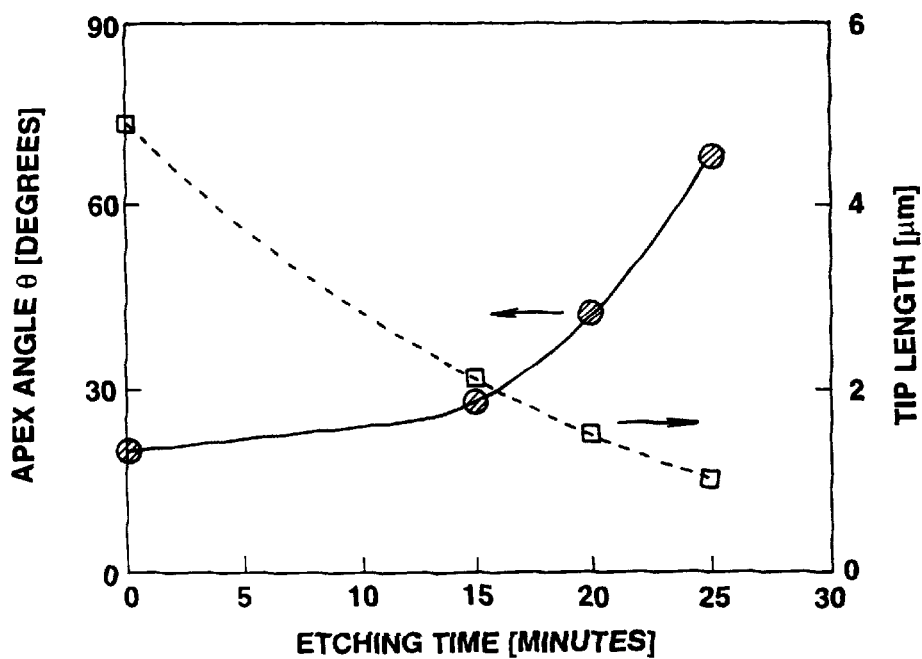
FIG. 76 shows the relation between the etching time in the etching step of the optical fiber producing method of the thirty-third embodiment on one hand and the tip length and the apex angle on the other hand of the third embodiment.

Also, in the second etching step, the optical fiber is etched for about 15 minutes, using an etching solution of a buffered hydrogen fluoride solution having the ammonium fluoride volume ratio X of 10, for forming the protrusion 65. The optical fiber 11 is further etched for about 15 minuets using, as an etching solution, a buffered hydrogen fluoride solution having the ammonium fluoride volume ratio X of 10 and the water volume ratio Y of 30. In such case, the tip length L and the end cone angel θ are 1.52 µm and 36.5°, respectively, as shown in FIG. 75. Since the etching rate for the core 12 in the buffered hydrogen fluoride solution having the ammonium fluoride volume ratio X of 10 and the water volume ratio Y of 30 is slightly faster than that for the cladding, the proximal end of the protrusion 125 is slightly recessed from the foremost part of the cladding 13.

Figure 78A:
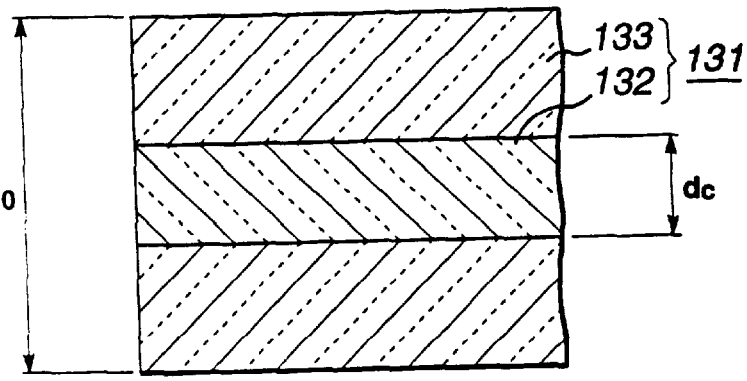
FIGS. 78(A)–78(B) illustrate a method for producing an optical fiber according to a thirty-sixth embodiment of the present invention.
Figure 78B:
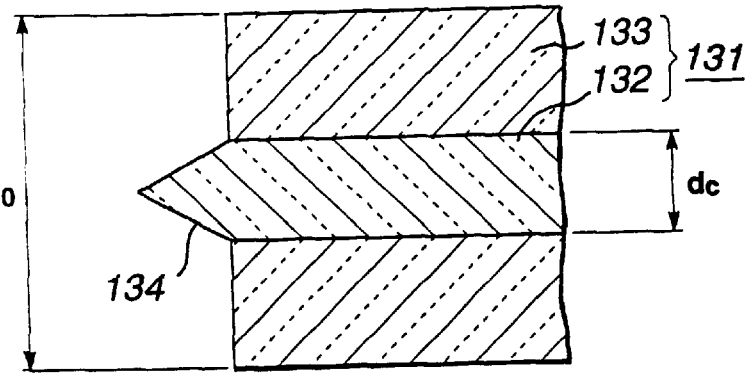

In a method for producing an optical fiber according to a thirty-sixth embodiment of the present invention, an optical fiber 131 having a core 132 protruded form the end of the cladding 133 is formed by etching an end of the optical fiber 131 composed of a multi mode fiber having a specific refractive index difference Δn of 1% and a graded index type refractive index distribution having gradually changing refractive index distribution, as shown in FIG. 78B, for forming the protrusion 134 which is a conically sharpened portion of the core 132 protruded from an end of the cladding 133. This multi mode optical fiber has a cladding diameter $d_o$ of approximately 250 nm and a core diameter $d_o$ of approximately 50 µm.

Figure 24:
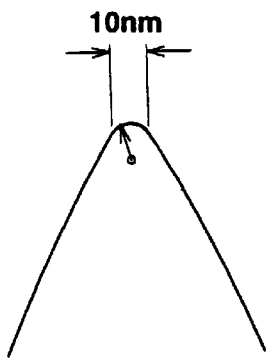
FIG. 24 shows a specified structure of an apex of the optical fiber of the fourteenth embodiment.
Figure 25:
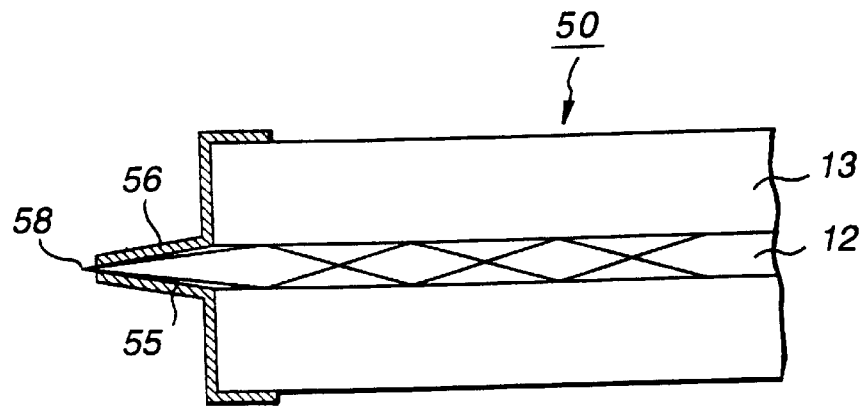
FIG. 25 illustrates light propagation in the optical fiber of the single mode.
Figure 26:
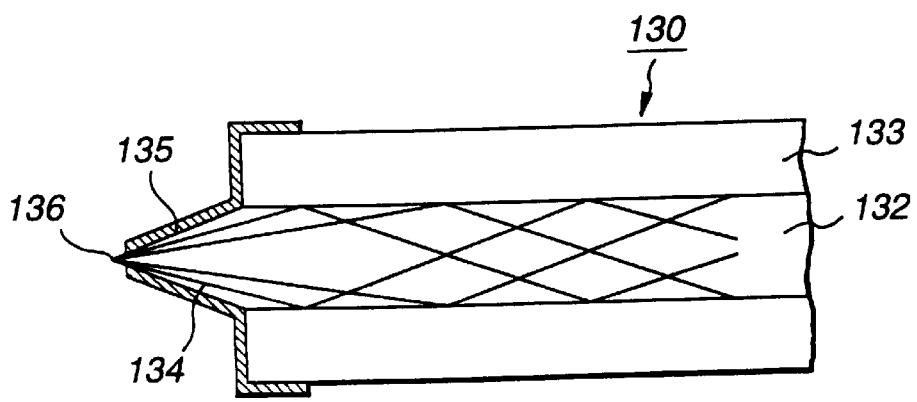
FIG. 26 illustrates light propagation in the optical fiber of the fourteenth embodiment.

Specifically, the optical fiber is etched for 17 hours using an etching solution of a buffered hydrogen fluoride solution having a ratio of the aqueous solution of ammonium fluoride to hydrofluoric acid to water of 10:1:1 for forming the protrusion 134 having the cone angle of 50° and the end radius of curvature of approximately 5 nm, as shown in FIG. 24. For carrying out such etching, it is necessary for the diameter ratio of the core 132 to the cladding 133 to be not less than 1:5.

Before carrying out such etching, a reduced-diameter portion may be formed by decreasing the diameter of the cladding 133 in a buffered hydrogen fluoride solution having a ratio of the aqueous solution of ammonium fluoride to hydrofluoric acid to water of 1:7:1:1.

The surface of the protrusion 134 is then coated in a manner similar to the twenty-ninth embodiment or the thirtieth embodiment for forming the light-shielding coating layer 135. The aperture forming step is then carried out as in the twenty-ninth embodiment or the thirtieth embodiment for forming an aperture 136 which is the distal end of the protrusion 134 exposed from the light-shielding coating layer 135. Thus, the optical fiber 130 shaped as shown in FIG. 22 is formed, using a multi mode fiber.

Twenty samples each were prepared by etching three sorts of optical fibers with different core diameters and different refractive index distributions as shown in FIG. 79 in a manner similar to the second etching step of the twenty-eighth embodiment. It was found that the distal ends of the protrusions thus formed differed in diameter distribution, as shown in FIGS. 80 to 82.

Figure 79A:
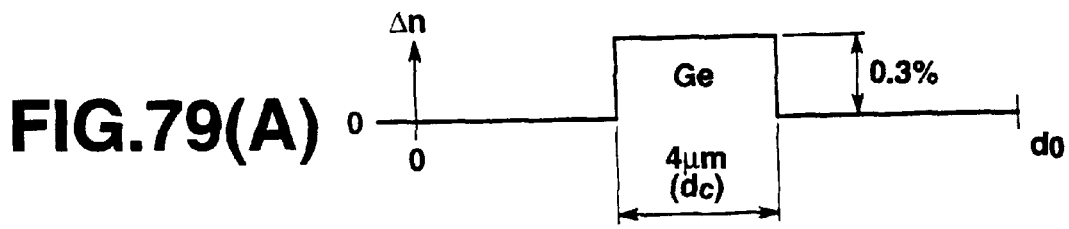
FIGS. 79(A)–79(C) illustrate the refractive index distribution of three sorts of the optical fibers having different core diameters and refractive indices.
Figure 80:
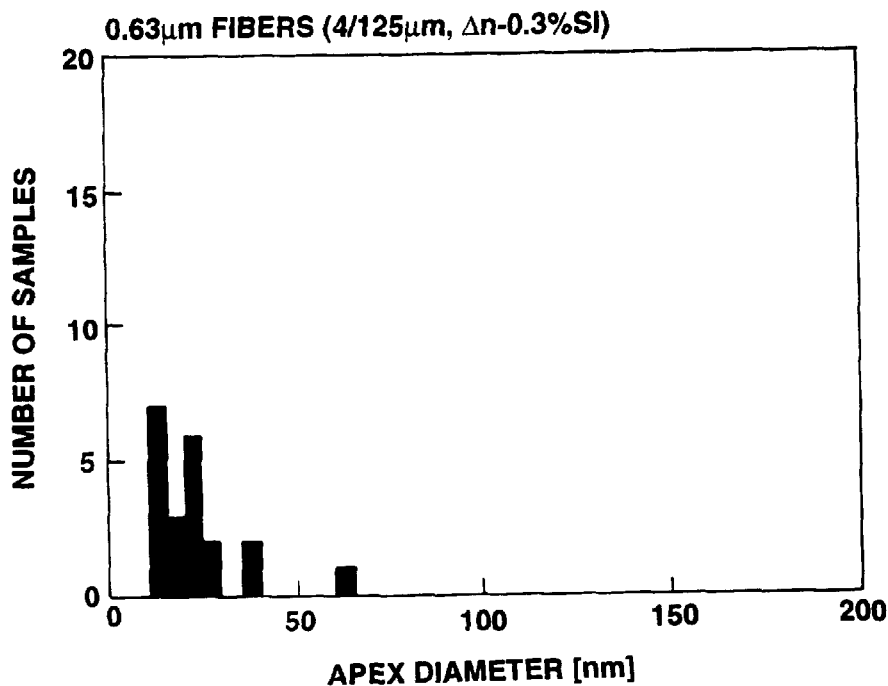
FIG. 80 shows the distribution of the tip of the sharpened core obtained in sharpening the optical fiber.

That is, if an optical fiber having the diameter of the core 12 of 4 µm and the refractive index distribution of the core 12 and the cladding 13 of a step index type as shown in FIG. 79A is used, the diameter of the distal end of the protrusion is distributed about 10 to 25 nm as center, as shown in FIG. 80.

Figure 79B:
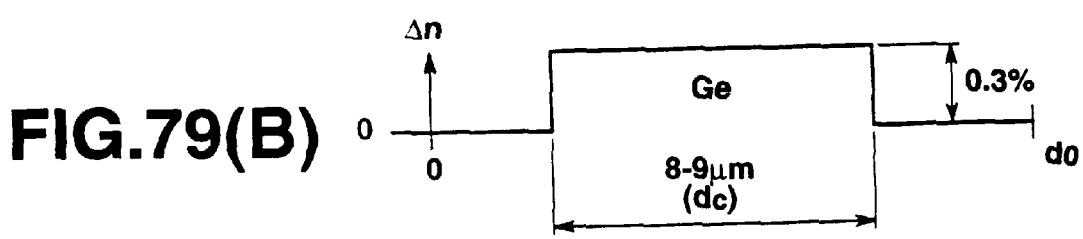
Figure 81:
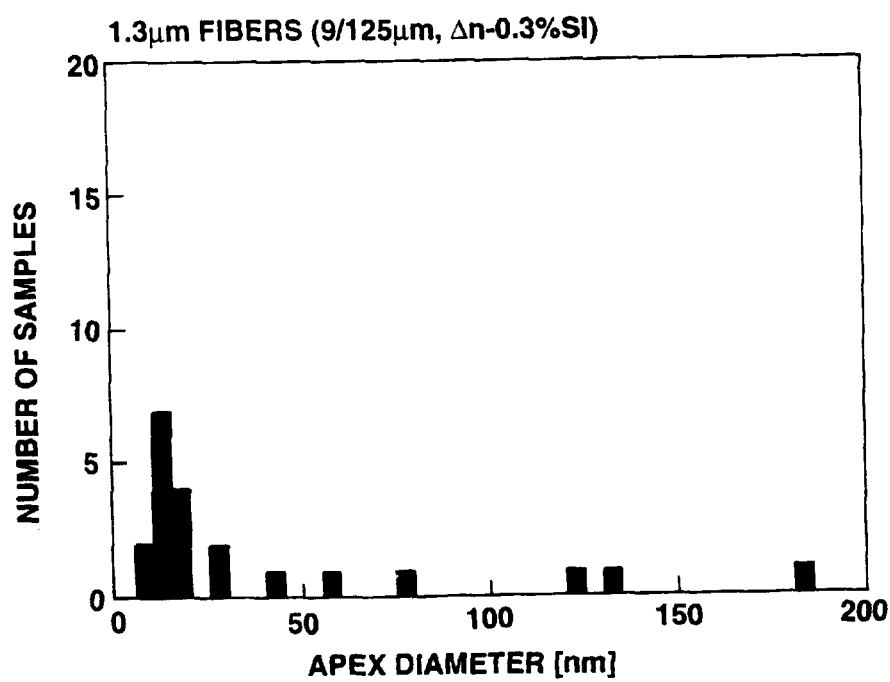
FIG. 81 shows the distribution of the tip of the sharpened core obtained in sharpening the optical fiber.
Figure 82:
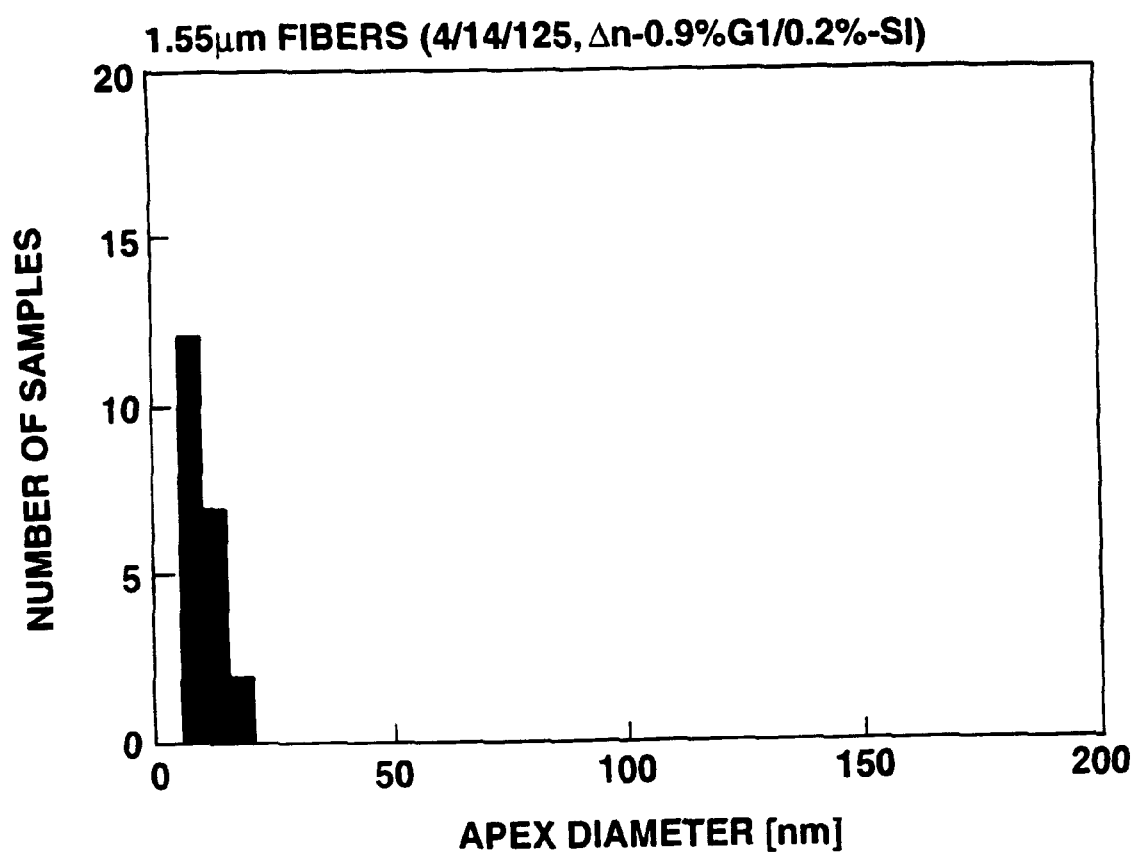
FIG. 82 shows the distribution of the tip of the sharpened core obtained in sharpening the optical fiber.

If an optical fiber having the diameter of the core 12 of 8 to 9 µm and the refractive index distribution of the core 12 and the cladding 13 of a step index type as shown in FIG. 79B is used, the diameter of the distal end of the protrusion is distributed about 10 to 15 nm as center, as shown in FIG. 81. However, the distribution showed variations larger than those shown in FIG. 81.

Figure 79C:
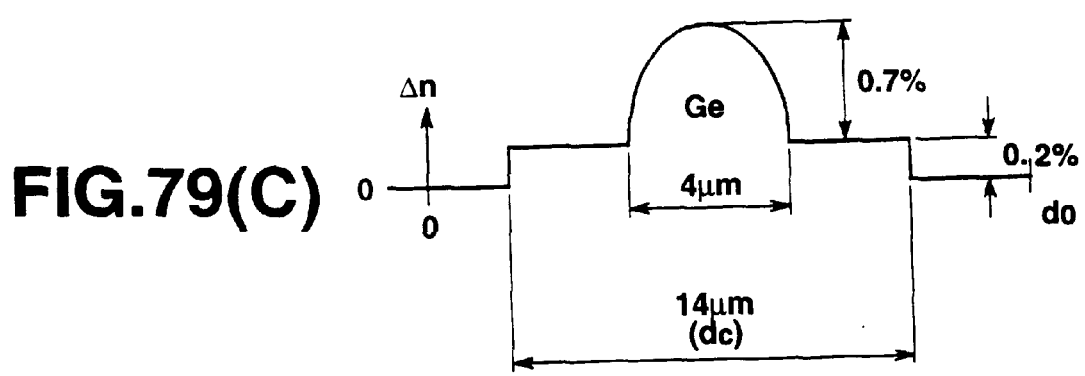

If an optical fiber used has the diameter of the core 12 of 14 µm, the refractive index distribution of the core 12 and the cladding 13 is of a step index type and the refractive index distribution in a range of 4 µm at the center of the core 12 is of the graded index type, as shown in FIG. 79C, the diameter of the distal end of the protrusion is distributed about 5 nm as center, as shown in FIG. 81, with less variations than in FIGS. 80 and 81.

It is seen from these results that the smaller the diameter of the core 12, the less are variations of the diameter of the distal end of the protrusion, and that, if the specific refractive index difference distribution is of the graded index type, the diameter of the distal end of the protrusion becomes smaller thus reducing the variations.

A method for producing an optical fiber according to a thirty-seventh embodiment of the present invention includes a diffusion step of gradually diffusing a dopant in the core 12 of the optical fiber 11 into the cladding 13 for equivalently increasing the diameter of the core 12 for forming a core diameter increased portion 144 and an etching step of etching an end of the optical fiber 11 provided with the core diameter increased portion 144 for forming a protrusion comprised of the portion of the core 12 protruded from the cladding 13.

Figure 83A:
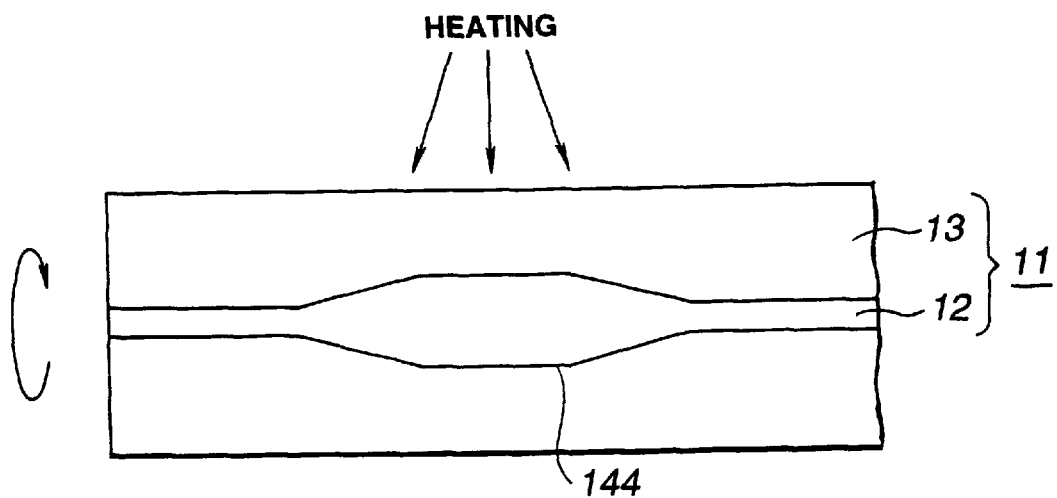
FIGS. 83(A)–83(B) illustrate a method for producing an optical fiber according to a thirty-seventh embodiment of the present invention.

First, in the diffusion step, a portion of the optical fiber 11 is heated, as it is rotated, as shown in FIG. 83A. This diffuses the dopant added to the core 12 into the cladding 13 for equivalently increasing the diameter of the core 12 for forming the core diameter increased portion 144. In the core diameter increased portion 144, the dopant density is decreased gradually from the center towards the periphery of the core 12. If an end of the optical fiber 11 is contacted with a heating element for heating the optical fiber in its longitudinal direction, instead of rotating and heating it, the core diameter increased portion 144 can be increased further in diameter.

Figure 83B:
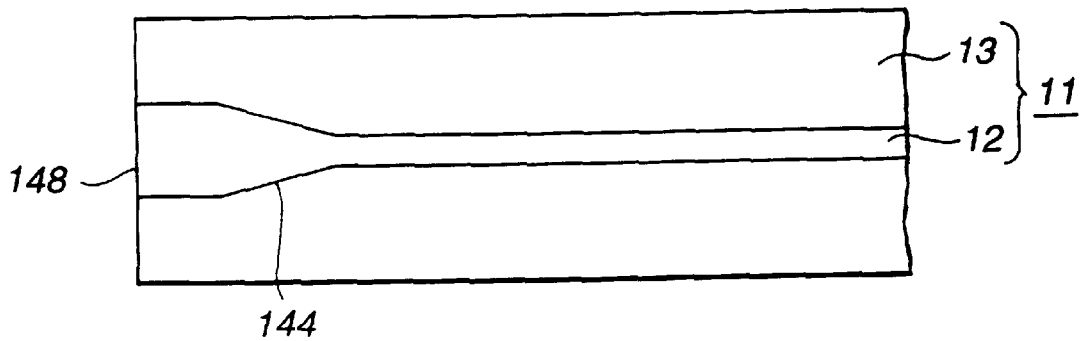
Figure 84:
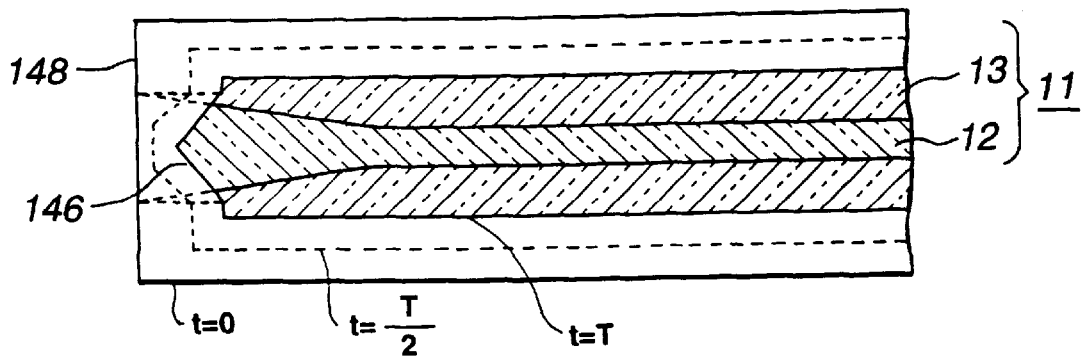
FIG. 84 illustrates etching of an etching step in the optical fiber producing method according to the thirty-seventh embodiment.

The optical fiber is cut at a position corresponding to the maximum diameter of the core 12 of the core diameter increased portion 144 for forming an end 148 shown in FIG. 83B. The end 148 is etched in a buffered hydrogen fluoride solution having a ratio of the aqueous solution of ammonium fluoride to hydrofluoric acid to water of 10:1:1. Since the etching rate for the cladding 13 is faster in such buffered hydrogen fluoride solution than that for the core 12, the cladding is etched first so that the core 12 of the core diameter increased portion 144 is protruded from the cladding 13. The core protruded from the cladding 13 is etched from its lateral side so that the foremost part of the core 12 is conically sharpened for forming the protrusion 145.

Also, since the dopant density in the core diameter center decreases towards the periphery of the corner 12, etching rate becomes slightly faster at the periphery than at the center of the protruded core 12, thus diminishing the radius of curvature of the distal end of the protrusion 145.

The surface of the protrusion 145 thus formed is coated as in the twenty-ninth embodiment or the thirtieth embodiment for forming the light-shielding coating layer 146. The aperture forming step similar to that of the twenty-ninth embodiment or the thirtieth embodiment is carried out for forming an aperture 147 comprised of the distal end of the protrusion 145 exposed from the light-shielding coating layer 146 for completing an optical fiber 140 shaped as shown in FIG. 27.

In a method for producing an optical fiber according to a thirty-eighth embodiment of the present invention, the processing similar to that of the first and second etching steps of the twenty-eighth embodiment is carried out for producing the optical fiber 245 having the reduced-diameter portion 64 which is the reduced diameter portion of the core 12 of FIG. 53C and a protrusion 65.

The coating similar to that performed in the second coating step of the twenty-eighth embodiment is then carried out for forming a hydrophobic coating layer of resin on the surface of the protrusion 65 and the aperture comprised of the core 12 at the distal end of the protrusion 65 exposed from the hydrophobic coating layer.

The protrusion 65 of the optical fiber 245, thus formed, is dipped in an $H_2SiF_6$ solution which is in a saturated state due to dissolution of an excess amount of quartz $SiO_2$. Such quartz $SiO_2$ in the $H_2SiF_6$ solution is ready to be deposited on the surface of a hydrophilic substance, such as quartz, while it is not ready to be deposited on the surface of a hydrophobic substance, such as resin. Consequently, quartz $SiO_2$ is not deposited on the surface of the protrusion, while quartz $SiO_2$ is deposited on the surface of the core 12 in the exposed aperture for forming a quartz coating layer.

By previously mixing the dye in the above $H_2SiF_6$ solution, a coating layer 157 of quartz doped with the dye is formed on the surface of the aperture, which is the distal end of the protrusion 155 exposed from the coating layer 156, thus providing the optical fiber 150 arranged as shown in FIGS. 28 and 29. By forming the coating layer 157 of, for example, quartz, doped with the dye, it becomes possible to improve the peeling strength of the dye for producing an optical fiber with improved durability.

By mixing a substance whose optical properties are varied depending on the surrounding environment, such as pH, into the $H_2SiF_6$ solution in place of the dye, it becomes possible to form the coating layer 157 containing these substances.

In a method for producing an optical fiber according to a thirty-ninth embodiment of the present invention, the processing similar to that of the first and second etching steps and the aperture forming step of the twenty-eighth embodiment is carried out for producing the optical fiber 60 shaped as shown in FIG. 12.

The resulting optical fiber 60 is then dipped in the $H_2SiF_6$ solution doped with the dye as in the thirty-eighth embodiment described above. Thus quartz $SiO_2$ is deposited in the $H_2SiF_6$ solution on the surface of the core 12 exposed from the aperture 68 for completing the optical fiber 160 provided with a coating layer of for example, quartz doped with the dye.

In a method for producing an optical fiber according to a fortieth embodiment of the present invention, the double-core optical fiber 171 having two sorts of cores 172, 173 with different refractive index values and the cladding 174 is etched to form the optical fiber 170 shown in FIG. 31.

With the optical fiber 171, the cladding 174 is formed of pure quartz, while the cores 172, 173 are formed of quartz doped with germanium dioxide. The germanium dioxide doping ratios for the cores 172, 173 are 0.9 mol %, and 0.2 mol %, with the inner core 172 being higher in the germanium dioxide doping ratio.

Figure 85:
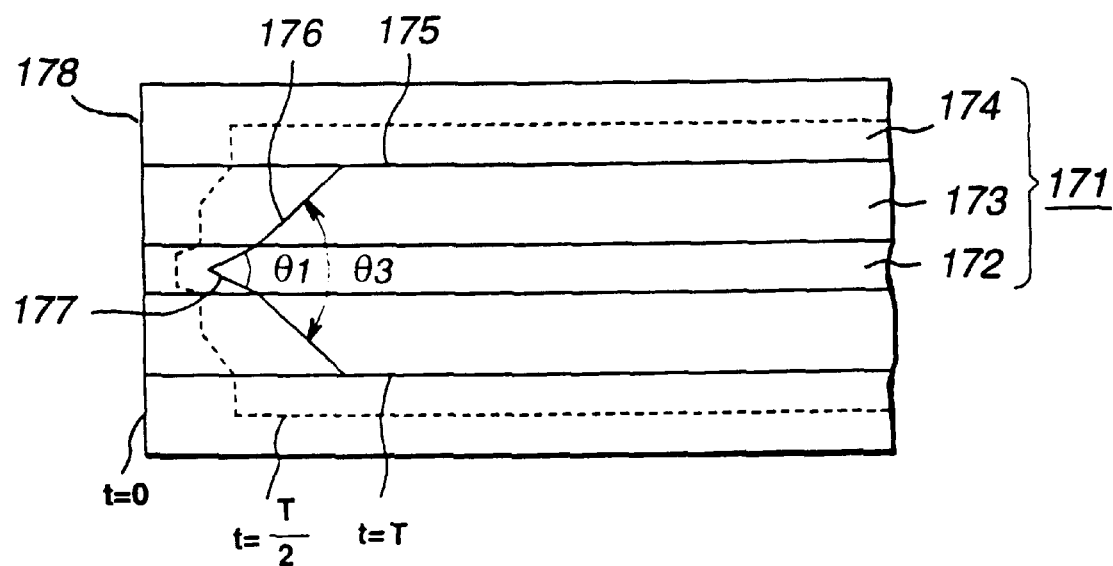
FIG. 85 illustrates etching in the method for producing an optical fiber according to a fortieth embodiment of the present invention.

Such optical fiber 171 is etched for about ten hours in a buffered hydrogen fluoride solution having a ratio of the aqueous solution of ammonium fluoride to hydrofluoric acid to water of 10:1:1. Since the etching rate for the cladding 174 is faster in such buffered hydrogen fluoride solution than that of the core 173, the cladding is etched first, as shown in FIG. 85, so that the core 173 is gradually exposed from the cladding 174. The exposed core 173 is also etched from its lateral side and sharpened for forming the tapered portion 176.

Also, since the etching rate for the core 173 in such buffered hydrogen fluoride solution is faster than that for the core 172, the core 173 is etched first at the distal end of the tapered portion 176 so that the core 172 is exposed gradually from the core 173. The core 172 thus exposed is etched from lateral sides and sharpened for forming the protrusion 177.

If etching is performed in a buffered hydrogen fluoride solution having the ammonium fluoride ratio X of 10, the cone angle $\theta_3$ of the tapered portion 176 is determined depending on the etching rate ratio between the core 173 and the cladding 174, as in the fourth etching step of the above-described twenty-third embodiment, such that the cone angle $\theta_3$ may be represented by $$sn(\theta_3/2)=R_2/R_3$$

where $R_1$, $R_2$ and $R_3$ denote the etching rates of the cores 172, 173 and the cladding 173 in the above-described buffered hydrogen fluoride solution respectively. The cone angle $\theta_1$ of the protrusion 177 determined by the ratio of the etching rate for the core 172 to that for the core 173, as in the fourth etching step of the above-described twenty-third embodiment, and is related by the equation $$\sin(\theta_1/2)=R_1/R_2$$

where $R_1$ is the etching rate for the core 172.

Although the ratio X of ammonium fluoride in the buffered hydrogen fluoride solution is set to 10 in the above description, since the etching rates $R_1$ and $R_2$ for the cores 172, 173 and the etching rate $R_3$ for the cladding 174 become equal for the ratio X of 1.7, the diameter of the cladding 174 can be controlled by carrying out etching using the buffered hydrogen fluoride solution having the ratio X of ammonium fluoride of 1.7. The protrusion 177 can be formed by employing the buffered hydrogen fluoride solution having the ratio X of ammonium fluoride larger than 1.7.

The above etching rates $R_1$, $R_2$ and $R_3$ are varied depending on the rates of germanium dioxide added to quartz. Since the refractive index is changed with the ratio of germanium dioxide, the above $\sin(\theta_3/2)$ and $\sin(\theta_1/2)$ are varied depending on the specific refractive index difference $\Delta n_2$ between the core 173 and the cladding 174 and the specific refractive index difference $\Delta n_1$ between the core 172 and the core 173, as shown in FIG. 41.

Thus, by using the double-core optical fiber 171 as described above in the optical fiber producing method, the foremost part of the optical fiber 171 can be sharpened based on the etching rate difference between the cladding 174 and the cores 172, 173. Since the optical fiber 170 shown in FIG. 31 can be formed by one or two etching operation, the optical fiber can be produced more easily.

In the present optical fiber producing method, the cone angle $\theta_3$ of the tapered portion 176 and the cone angle $\theta_1$ of the protrusion 177 can be controlled by adjusting the ratio of the germanium dioxide added to the cores 172, 173.

In the above-described twenty-third embodiment, the tapered portion 221 shown in FIG. 38B is formed by taking advantage of the phenomenon in which the height of the meniscus is decreased depending on the diameter of the optical fiber. However, the state of the interface is susceptible to external vibrations, so that problems are raised in connection with etching stability and reproducibility of the cone angle $\theta_2$ of the tapered portion 221.

With the optical fiber producing method, the cone angle $\theta_3$ of the tapered portion 176 is determined depending on the etching rate ratio between the cladding 174 and the core 173, so that it becomes possible to improve etching stability and stability of the cone angle $\theta_3$.

With a method for producing an optical fiber according to a forty-first embodiment of the present invention, a double-clad optical fiber comprised of a core formed of quartz doped with germanium dioxide, a first cladding of quartz covering the core and a second cladding doped with fluorine or boron, covering the first cladding, is etched for producing an optical fiber shaped as shown in FIG. 31.

Figure 86A:
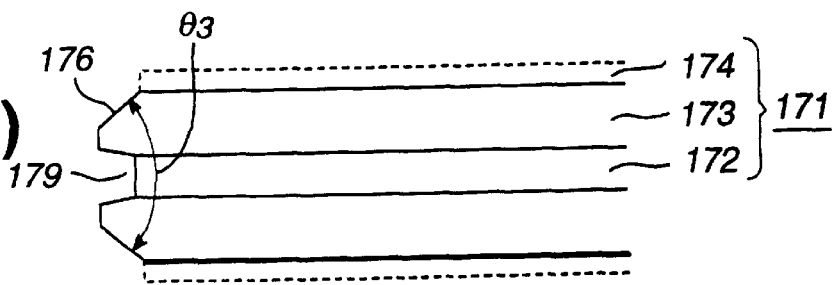
FIGS. 86A–86C show the shape of an optical fiber formed when changing the composition of an etching solution used in the etching step of the fortieth embodiment.

If the double-cladding optical fiber, in which the cladding is doped with fluorine or boron and the center core is doped with germanium dioxide, is etched with a buffered hydrogen fluoride solution having the ammonium fluoride ratio X of 0, the etching rate for the core 172 becomes faster than that for the core 172, so that the recess 179 receded from the core 173 at the foremost part of the tapered portion 176 is formed, as shown in FIG. 86A.

Figure 86B:
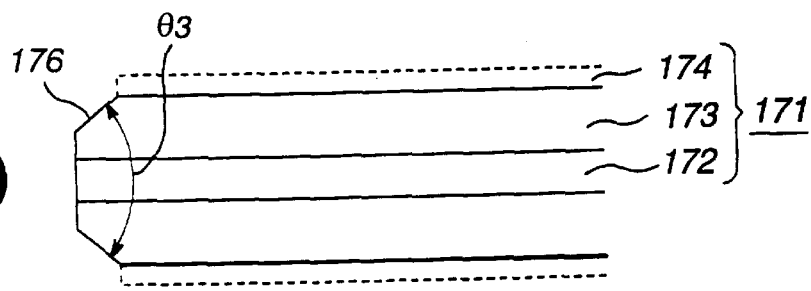
Figure 86C:
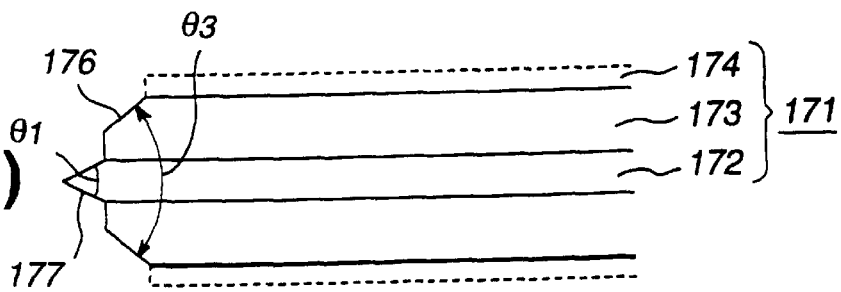

If such optical fiber is etched with a buffered hydrogen fluoride solution having the ammonium fluoride ratio X of 1.7, the etching rate for the core 172 becomes equal to that for the core 173, so that the end faces of the core 172 and the core 173 on the foremost part of the tapered portion 176 can be made flush with each other as shown in FIG. 86B.

If such optical fiber is etched with a buffered hydrogen fluoride solution having the ammonium fluoride ratio X of 10, the etching rate for the core 173 becomes equal to that for the core 172, so that the core 172 on the foremost part of the tapered portion 176 sharpened to form the protrusion 177.

Thus, with the present optical fiber producing method, the tapered portion and the flattened portion are formed at an end of the optical fiber as shown in FIG 86B. Specifically, the end 250 of the optical fiber 251 is etched with a buffered hydrogen fluoride solution having the ammonium fluoride ratio X of 1.7, as shown in FIG. 86B.

Figure 87:
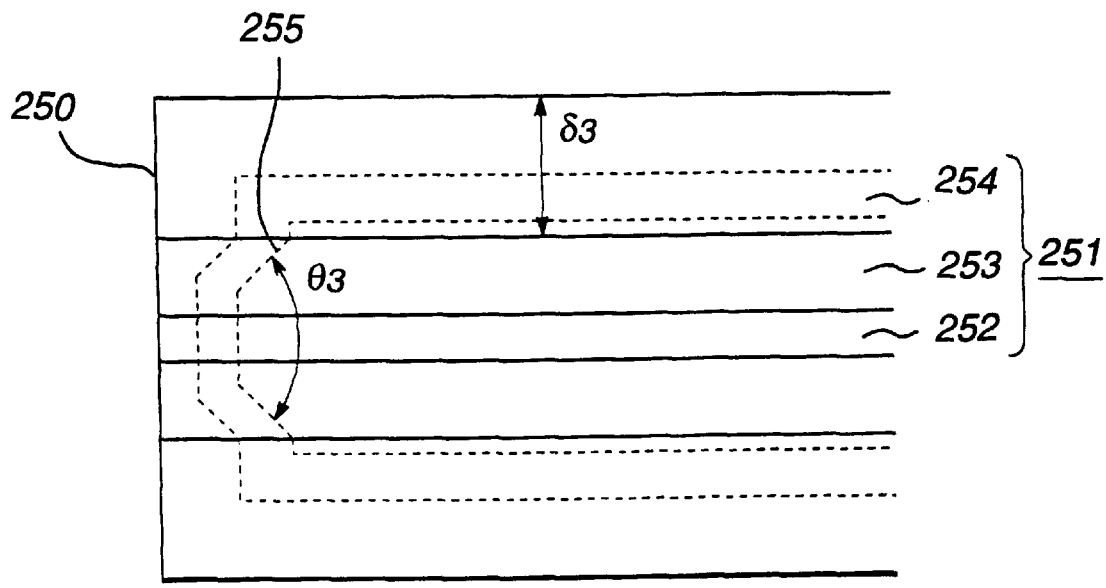
FIG. 87 illustrates a method for producing an optical fiber according to a forty-first embodiment of the present invention.

In such buffered hydrogen fluoride solution, the etching rate of the outermost cladding 254 doped with fluorine or boron is faster than that for the cladding 253 of quartz or that for the core 252 doped with germanium dioxide, the cladding 253 is protruded from the cladding 254 with progress in etching. Since the cladding 252 is also etched from the lateral side, it is sharpened as shown by a broken line in FIG. 87. The cone angle $\theta_3$ is determined in response to the ratio of the etching rate for the cladding 254 to that for the cladding 253.

Thus, the foremost part of the cladding 253 is sharpened portion 256 in which the core 252 and the cladding 253 at the foremost part of the tapered portion 255 becomes flush with each other.

If the etching time at the first etching step is prolonged, the flattened part 256 is further etched and sharpened. For etching in the next following second etching step, the cladding 254 needs to be etched completely. Thus the diameter of the cladding 254 is preferably diminished to such an extent that the cladding 254 is completely etched in the first etching. That is, with the etching rate $R_3$ of the cladding 254, and with the etching time $t_1$ until the tapered portion 255 is formed with the exception of the flat portion 256, it is sufficient if the thickness $\delta_3$ of the cladding 254 is such that $\delta_3 \leq R_1 t_1$.

Next, in the second etching step, the optical fiber provided with the tapered portion 255 and the flat portion 256 as described above is etched with a buffered hydrogen fluoride solution having the ammonium fluoride ratio X larger that 1.7, such as 10.

Figure 88:
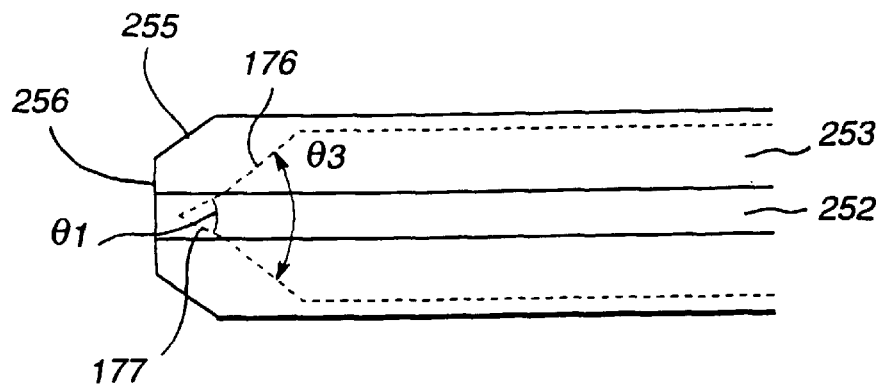
FIG. 88 illustrates sharpening in the etching step in the optical fiber producing method according to the forty-first embodiment.

In such buffered hydrogen fluoride, since the etching rate for the core 252 is slower than that if the core 252, the core 252 is protruded gradually from the cladding 253 as the etching proceeds. The core 252 thus protruded is etched also from the lateral side and sharpened so that a protrusion 177 contiguous to the tapered portion 176 is formed, as indicated by a broken line in FIG. 88, as in the fortieth embodiment described above.

The cone angle $\theta_1$ of the protrusion 177 is determined in response to the etching rate for the cladding 253 and the core 252 as in the fortieth embodiment described above.

Specifically, if the double-clad optical fiber is etched with the buffered hydrogen fluoride solution having a ratio of the aqueous solution of ammonium fluoride to hydrofluoric acid to water of 10:1:1, the value of sin ($\theta_1$/2), denoting the ratio of the etching rate for the core 252 to that of the core 253, is on the order of 0.63 and 0.87 for the specific refractive index difference $\Delta n$ of 0.2% and 0.7%, respectively, as indicated by square-shaped dots in FIG. 41.

With the present optical fiber producing method, since the cone angle $\theta_3$ of the tapered portion 176 is determined in response to the ratio of the etching rate for the cladding 254 to that for the core 253, it becomes possible to improve etching stability and stability of the cone angle $\theta_3$.

With a method for producing the optical fiber according to a forty-second embodiment of the present invention, a double-clad optical fiber similar to one according to the forty-first embodiment as described above, is etched for sharpening.

First, in the first etching step, a double-clad optical fiber has its one end etched using a buffered hydrogen fluoride solution having the ammonium fluoride ratio X larger than 1.7, such as the ratio X equal to 10.

In such buffered hydrogen fluoride solution, the etching rate for the cladding 253 is faster than that for the cladding 254, while the etching rate for the core 252 is faster than that for the cladding 253.

Figure 89:
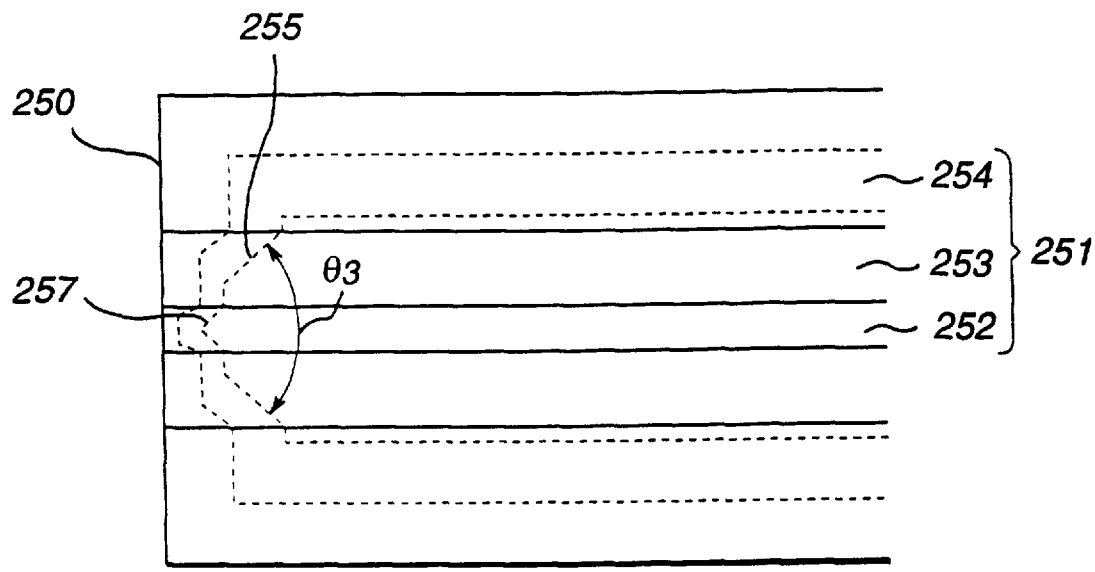
FIG. 89 illustrates a method for producing an optical fiber according to a forty-second embodiment of the present invention.
Figure 90:
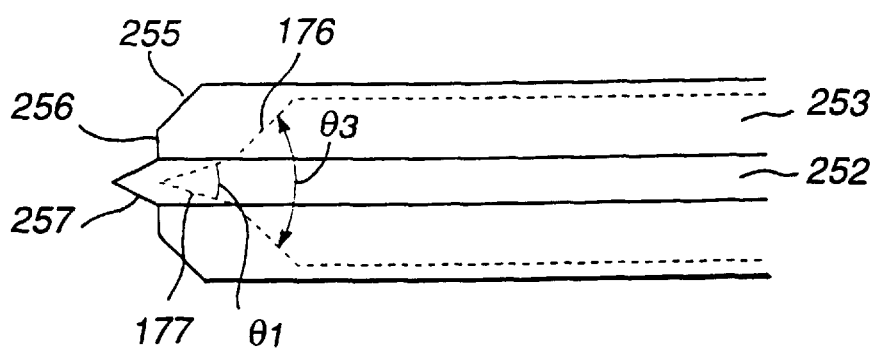
FIG. 90 illustrates sharpening in the etching step in the optical fiber producing method according to the forty-second embodiment.

Thus, if etching is performed in such buffered hydrogen fluoride solution, the cladding 253 is gradually protruded from the cladding 254, while the cladding exposed from the cladding 254 is etched from its lateral side to form the tapered portion 255, as shown in FIG. 89. On the other hand, the core 252 is protruded form the foremost part of the cladding 253 of the tapered portion 255 and the protruded core 252 is etched from its lateral side to form the protrusion 257 sharpened with a cone angle $\theta_1$.

Next, in the second etching step, such optical fiber is etched, in a buffered hydrogen fluoride solution having the ammonium fluoride ratio X larger than 1.7, since the protrusion 257 which is the protruded portion of the core 252 is formed at the foremost part of the tip 255, in distinction from the second etching step of the above-described forty-first embodiment described above, the protrusion 257 is etched form the lateral side while the core 252 at the proximal end of the protrusion 255 is etched from the lateral side, thus generating the protrusion 177 with the small cone angle $\theta_1$.

During this etching, the apparent etching rate for the cladding 253, from which is exposed the core 252 at the proximal end of the protrusion 257, is equal to $1/\{\sin(\theta_3)\}$ times the actual etching rate $R_2$ of the cladding 253, because the tapered portion 255 with the cone angle $\theta_3$ has been formed.

Therefore, if the etching rates for the core 252 and the claddings 253, 254, are $R_1$, $R_2$ and $R_3$, respectively, the cone angle $\theta_3$ is given by $$\sin(\theta_1/2) = \sin(\theta_3/2) \cdot (R_1/R_3)$$
$$= (R_2/R_3) \times (R_1/R_3)$$
$$= R_1/R_3$$

The optical fiber thus shaped can also be formed by extending the etching time of the above-described fortieth and forty-first embodiments described above. For example, etching can be carried out in the fortieth embodiment by setting the ratio X for ammonium fluoride to about 10.

In a method for producing the optical fiber according to a forty-third embodiment of the present invention, the optical fiber 170 shaped as shown in FIG. 31 is formed by etching similar to that of the fortieth embodiment described above. Alternatively, the optical fiber thus shaped may also be formed by etching similar to that in the forty-first and forty-second embodiments described above.

The surface of the protrusion 177 of the optical fiber 170 this formed is coated as in the twenty-ninth embodiment or the thirtieth embodiment, for forming the light-shielding coating layer 186. In addition, the aperture forming step similar to that performed in the twenty-ninth embodiment or the thirtieth embodiment is performed for forming the aperture 189 which is the distal end of the protrusion 177 exposed from the light-shielding coating layer 186. This competes the optical fiber shaped as shown in FIG. 32.

Figure 91A:
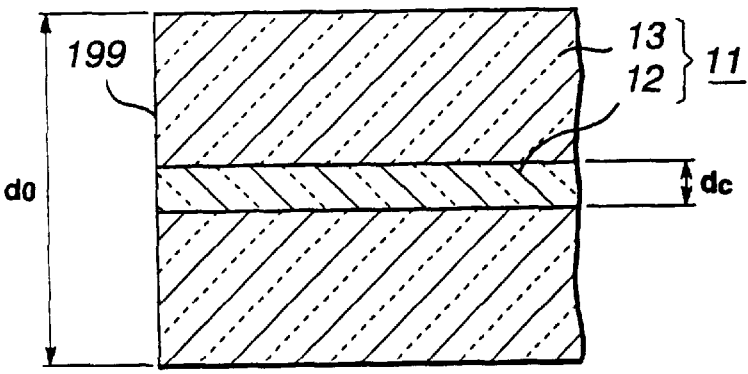
FIGS. 91(A)–91(C) illustrate a method for producing an optical fiber according to a forty-fourth embodiment of the present invention.
Figure 91B:
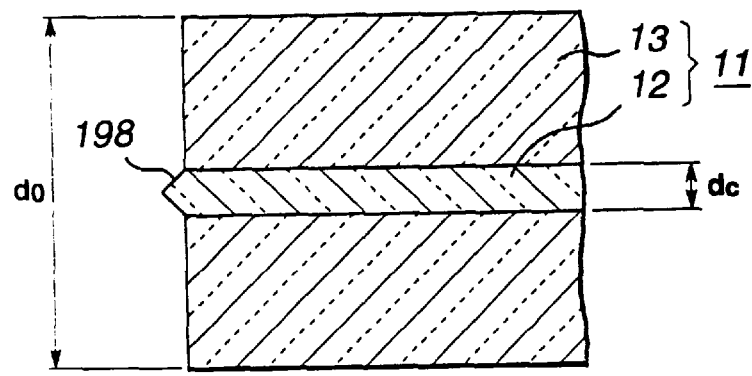

In a method for producing the optical fiber according to a forty-fourth embodiment of the present invention, the optical fiber 11 shown in FIG. 91A has its one end etched for about 85 minutes with a buffered hydrogen fluoride solution having a ratio of the aqueous solution of ammonium fluoride to hydrofluoric acid to water of 1.8:1:1. Since the etching rate for the cladding 13 in such buffered hydrogen fluoride solution is slightly faster than that for the core 12, there is formed a protrusion 198 which is the portion of the core protruded from the cladding 13, as shown in FIG. 93B.

Figure 33:
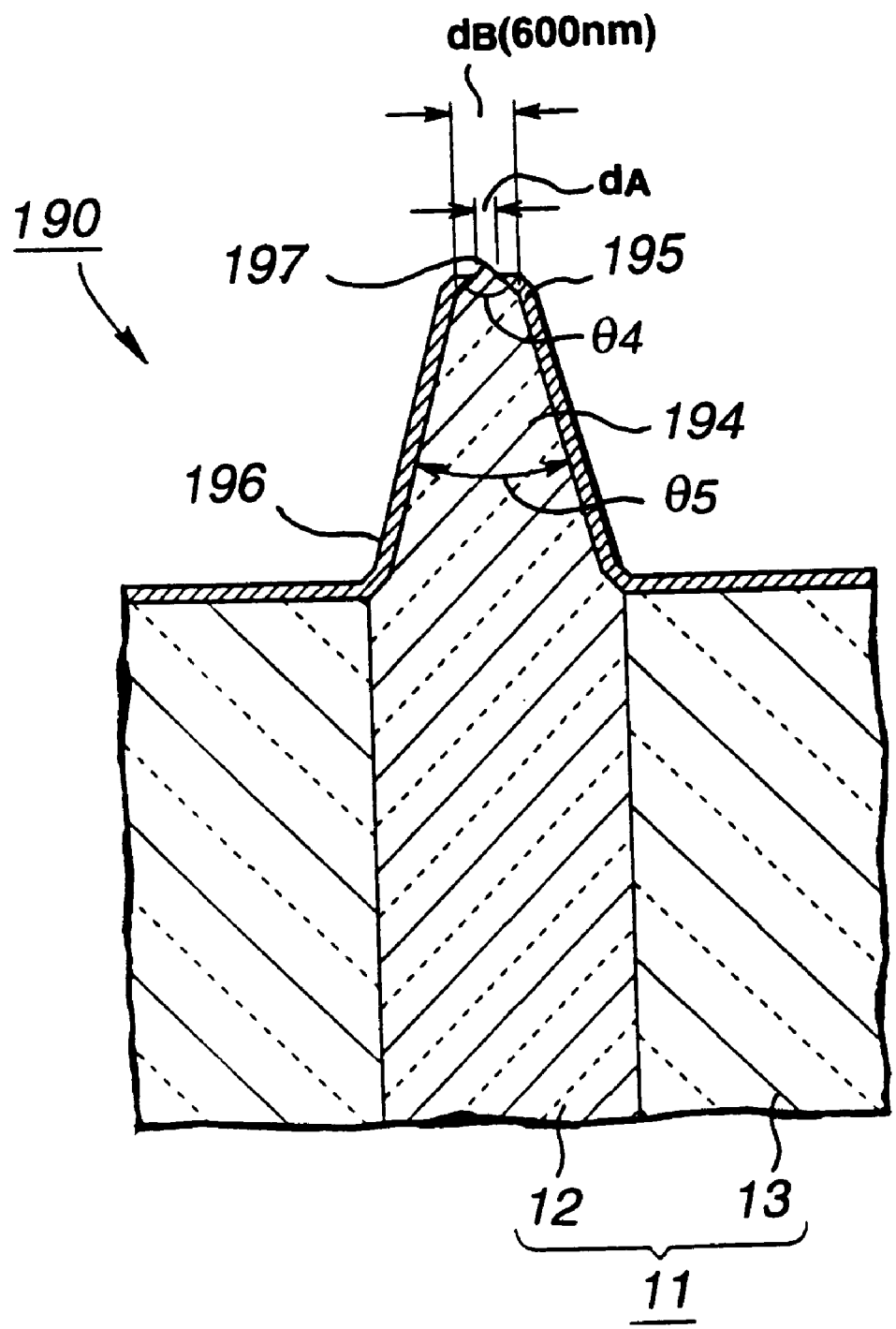
FIG. 33 illustrates a structure of an optical fiber according to a twentieth embodiment of the present invention.
Figure 91C:
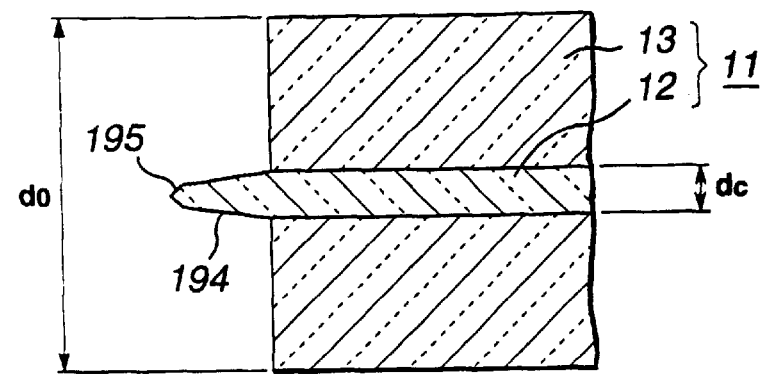
Figure 92:
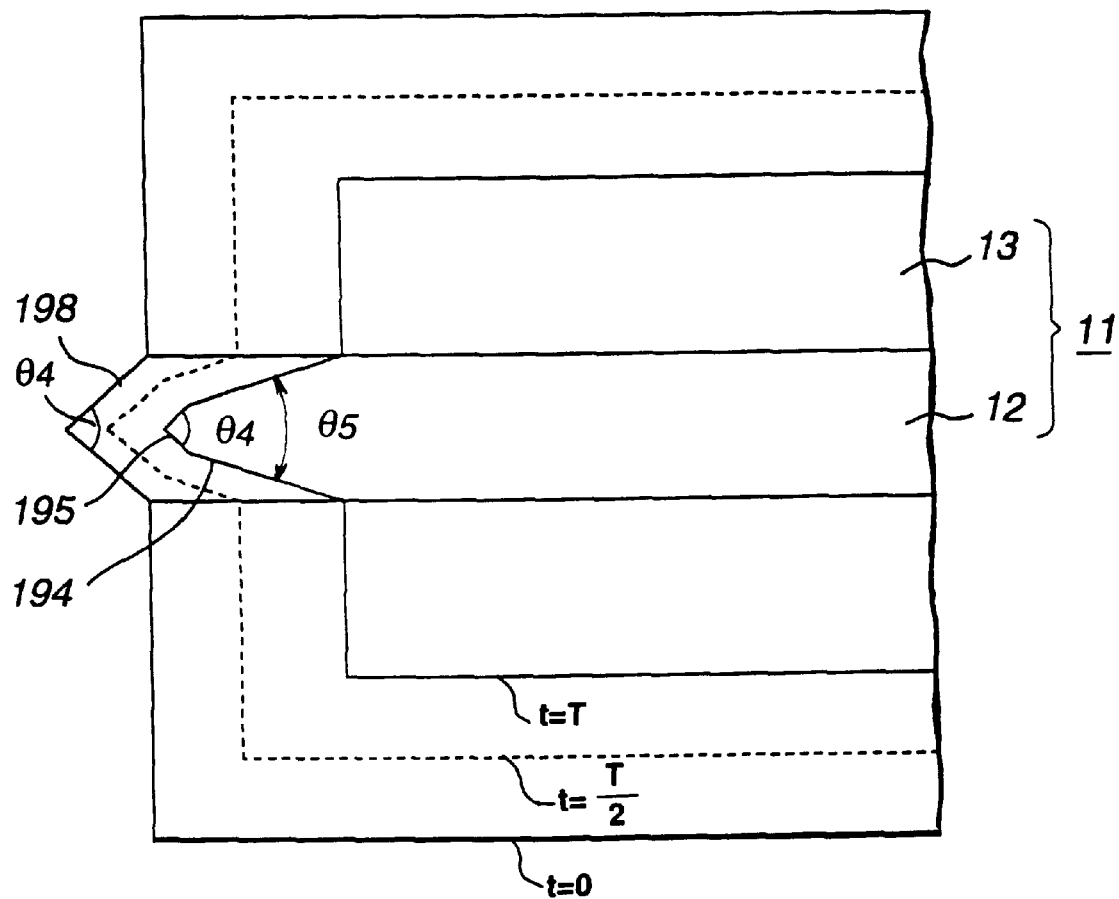
FIG. 92 illustrates etching of the second etching step in the optical fiber producing method according to the forty-fourth embodiment.

Next, in the second etching step, the optical fiber, thus provided with the protrusion 198, is etched in a buffered hydrogen fluoride solution having a ratio of the aqueous solution of ammonium fluoride to hydrogen fluoride to water of 10:1:1. Since the etching rate for the cladding 13 in such buffered hydrogen fluoride solution is faster than that for the core 12, the cladding 13 is first etched, as shown in FIG. 92. At this time, the core 12 protruded from the cladding 13 is sharpened as the shape of the protrusion 198 is maintained, so that the protrusion 194 which is the portion of the core 12 protruded from the cladding 13 and sharpened and the detection end 195 having an enlarged cone angle at the distal end of the protrusion 194, are formed, as shown in FIG. 91C. This completes the optical fiber 190 shaped as shown in FIG. 33.

Meanwhile, when forming the aperture 197 at the foremost part of the detection end 195 by the second coating method and the aperture forming method of the above-described twenty-eighth embodiment, since the cone angle of the detection end 195 is larger and hence the diameter of the exposed portion of the light-shielding coating layer 186 exposed from the corrosion-resistant plating layer is difficult to control, it is difficult to control the diameter of the aperture 197.

In this consideration, the processing similar to that of the second coating step and the aperture forming step of the twenty-eighth embodiment is performed for forming the first coating layer 198 shown in FIG. 34. The second light-shielding coating layer 199 is then formed by vacuum evaporation on the surfaces of the detection end 195 and the protrusion 194 exposed form the first coating layer 198. Finally, the second light-shielding layer 199 is etched as in the aperture forming step of the twenty-third embodiment or the twenty-fourth embodiment for forming the aperture 197.

By forming the double-layer coating layer in this manner, the aperture 197 having the aperture diameter not larger than the wavelength of the detection light can be formed easily.

In a method for producing an optical fiber according to a forty-fifth embodiment of the present invention, the processing similar to that of the first and second etching steps of the twenty-eighth embodiment is performed for forming the optical fiber 245 having the reduced-diameter portion 64 which is the reduced diameter portion of the core 12 shown in FIG. 53C and the protrusion 65.

The distal end of the protrusion 65 is then dipped in a sol comprised of the alcoholic solution of a metal alkoxide doped with water and a catalyst. If the distal end of the protrusion 654 is dipped in this manner in a sol, a sol layer is formed by the sol becoming attached to the surface of the protrusion 65. If the sol layer is dried, the sol is turned into a solid sol, so that the coating layer 207 formed by the gel layer is formed. Since the coating layer 207 functions similarly to the cladding 13, the light reflectance at a boundary between the protrusion 65 and the coating layer 207 is increased thus improving the transmission efficiency.

The gel layer formed as described above may also be heated to form a an amorphous layer. After forming the gel layer as described above, the sol may be affixed to the protrusion 65 for laminating the gel layer.

In a method for producing an optical fiber according to a forty-sixth embodiment of the present invention, the processing similar to that of the first and second etching steps of the twenty-eighth embodiment is performed for forming the optical fiber 245 having the reduced-diameter portion 64 which is the reduced diameter portion of the core 12 shown in FIG. 53C and the protrusion 65.

Figure 93:
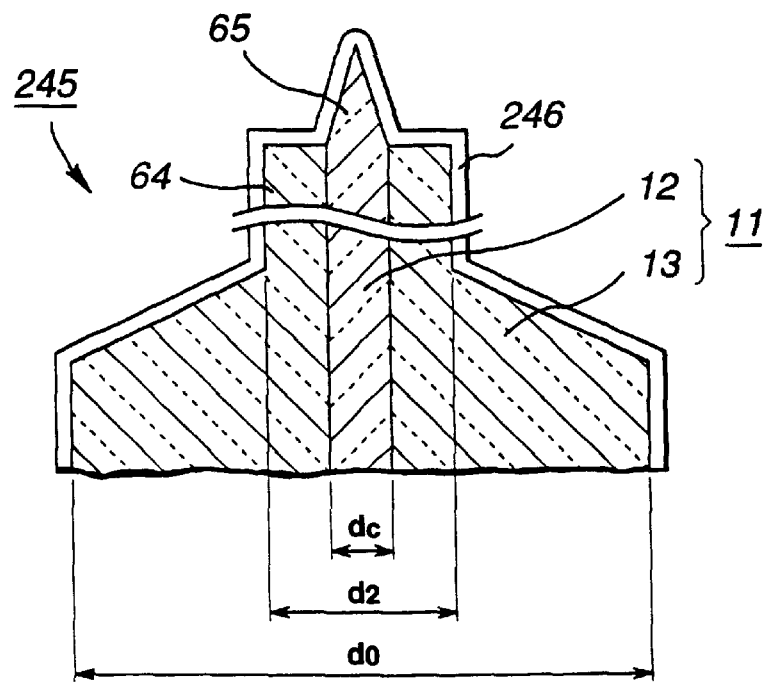
FIG. 93 illustrates a method for producing an optical fiber according to a forty-sixth embodiment of the present invention.
Figure 94:
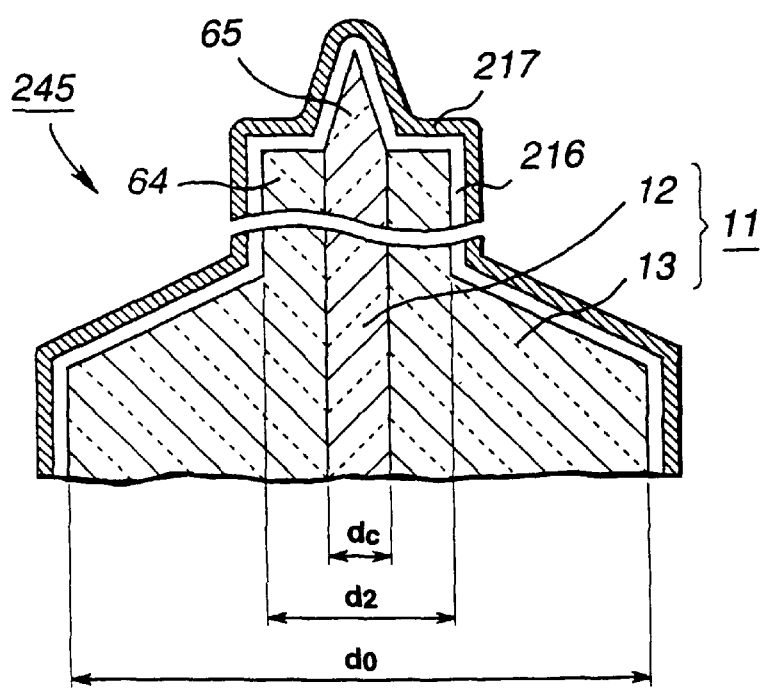
FIG. 94 illustrates the method for producing the optical fiber according to the forty-sixth embodiment.
Figure 95:
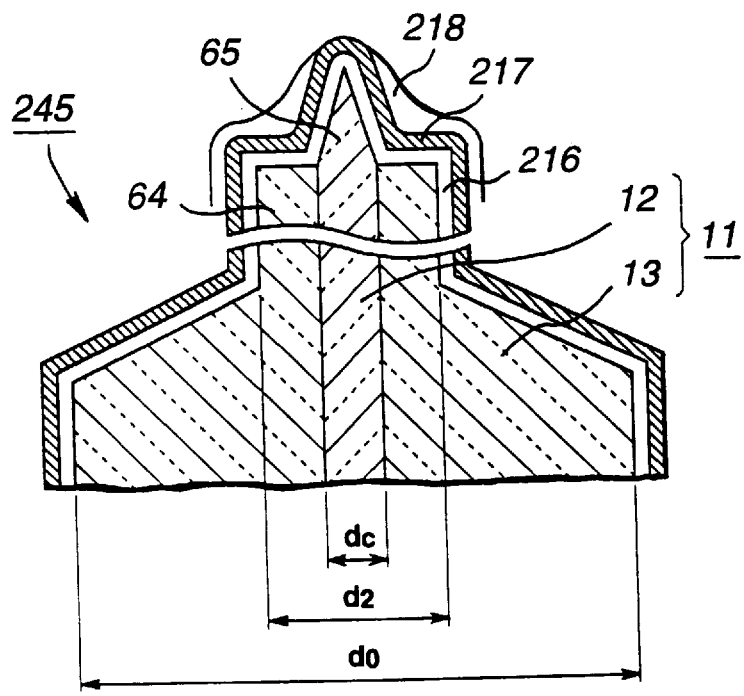
FIG. 95 illustrates the method for producing the optical fiber according to the forty-sixth embodiment.
Figure 96:
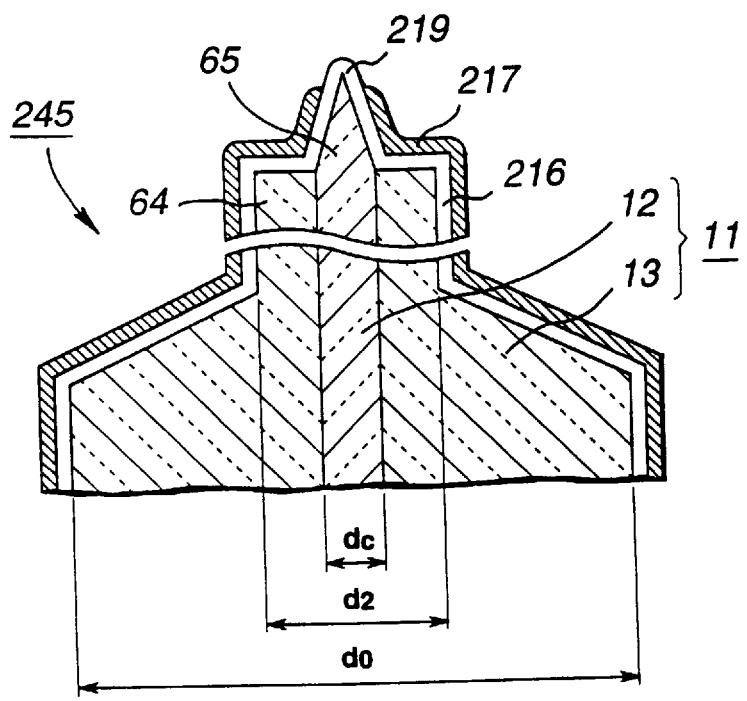
FIG. 96 illustrates the method for producing the optical fiber according to the forty-sixth embodiment.

The protrusion 65 of the optical fiber 245, thus formed, is dipped in an $H_2SiF_6$ solution which is in a saturated state by quartz $SiO_2$ dissolved in an excess amount, as in the thirty-eight embodiment described above. If the protrusion 65 is dipped in such solution, quartz $SiO_2$ in the $H_2SiF_6$ solution is deposited on the surface of the protrusion 65, thus forming the quartz coating layer 216 on the surface of the protrusion 65, as shown in FIG. 93. A light-shielding material, such as gold, is coated on the surface of the quartz coating layer 216. This forms the light-shielding layer 217 on the surface of the quartz coating layer 216, as shown in FIG. 94.

Next, the light-shielding coating layer 217 is dipped in a solvent in which a synthetic resin is dissolved, and the solvent affixed to the surface of the light-shielding coating layer 217 is vaporized off. This forms the corrosion-resistant coating layer 218 on the surface of the light-shielding coating layer 217. The foremost part of the light-shielding coating layer 217 is exposed for the corrosion-resistant coating layer 218 by the solvent surface tension.

The foremost part of light-shielding coating layer 217 is etched and the exposed for the corrosion-resistant coating layer 218 is etched for removing the corrosion-resistant coating layer 218. This forms an exposed portion 219 which is the foremost part of the corrosion-resistant coating layer 218 exposed from the light-shielding coating layer 217.

Figure 37:
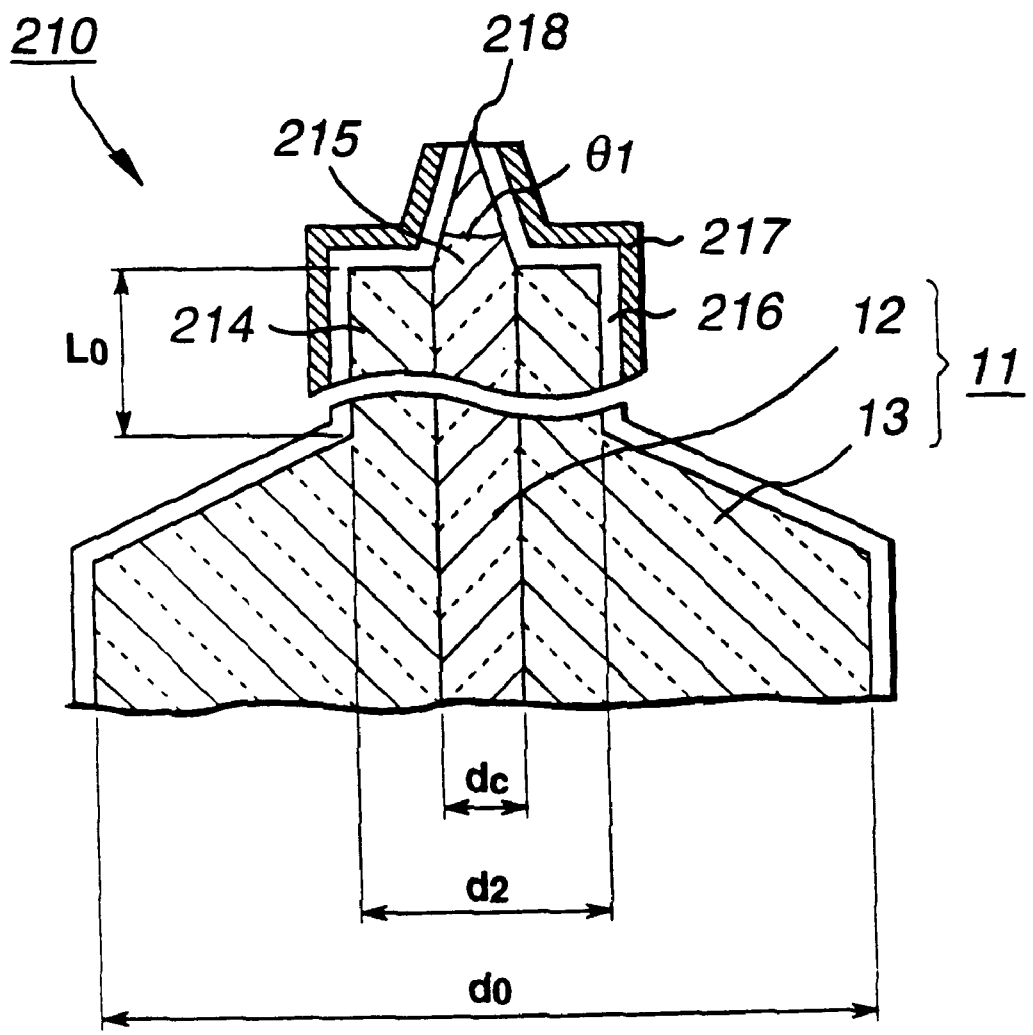
FIG. 37 illustrates a structure of an optical fiber according to a twenty-second embodiment of the present invention.

Finally, this exposed portion 219 is etched with a buffered hydrogen fluoride solution composed of the aqueous solution of ammonium fluoride, hydrofluoric acid and water, or with an aqueous solution of sodium hydroxide. This forms the aperture 218 by the distal end of the protrusion 65 exposed from the quartz coating layer 216, thus forming the optical fiber 210 shaped as shown in FIG. 37.

In a method of producing an optical fiber according to a forty-seventh embodiment of the present invention, the processing similar to that of the first and second etching steps of the twenty-eighth embodiment is performed for forming the optical fiber 245 having the reduced-diameter portion 64 which is the reduced diameter portion of the core 12 shown in FIG. 53C and the protrusion 65.

Then, for facilitating plating, nuclei of catalytic metals, such as palladium, are absorbed on the surface of the protrusion 65 for activation. Specifically, the protrusion 65 is dipped in a mixed solution of tin dichloride $SnCl_2$, palladium dichloride $PdCl_2$ and hydrochloric acid for precipitating palladium on the surface of the protrusion 65.

Alternatively, for activation, the protrusion 65 is dipped in an aqueous solution of tin dichloride $SnCl_2$. This causes tin to be adsorbed on the surface of the protrusion 65. The protrusion 65, from which tin has been precipitated as described above, is dipped in an aqueous solution of palladium dichloride $PdCl_2$. This substitutes palladium for tin on the surface of the protrusion 65.

Figure 97:
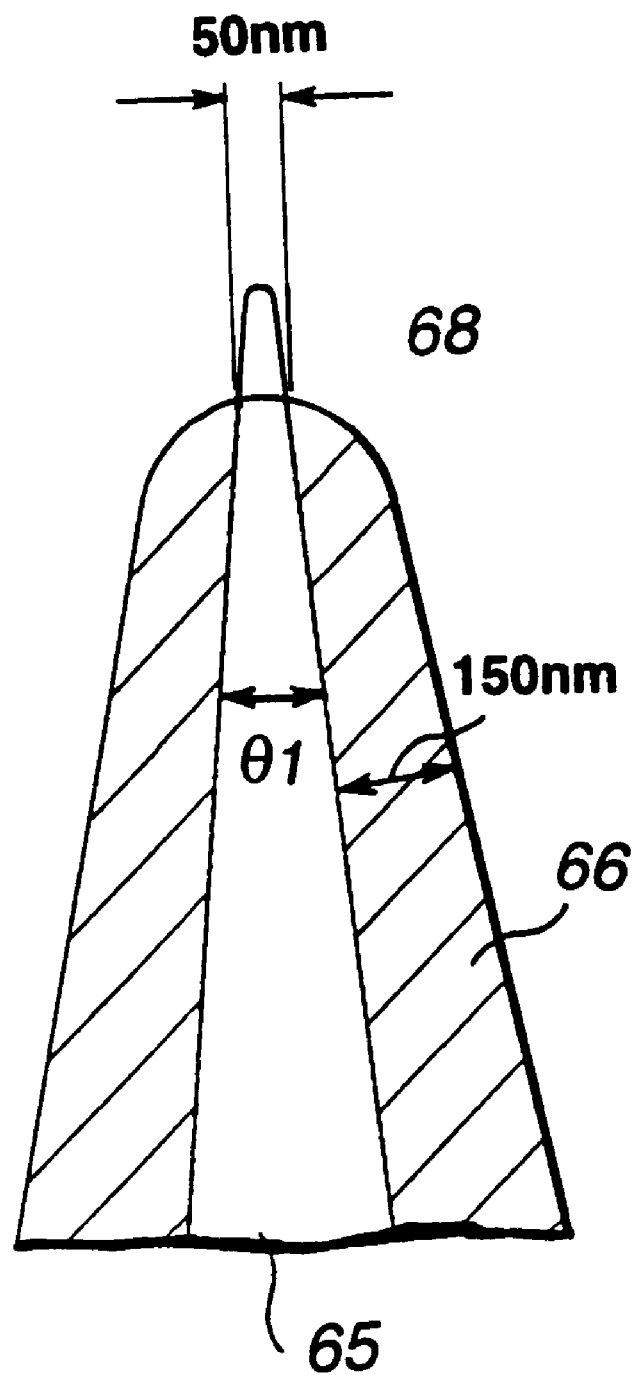
FIG. 97 is an enlarged view showing the foremost part of the sharpened core on which a coating layer has been formed in the optical fiber producing method according to a forty-seventh embodiment of the present invention.

If a nickel coating layer is formed by electroless plating on the surface of the protrusion 65 which has been activated as described above, the aperture 68 which is the distal end of the protrusion 65 exposed from the nickel plating layer is formed, as shown in FIG. 97, because the nickel coating layer is not liable to be formed on the distal end of the protrusion 65.

By activating the surface of the protrusion 65 and subsequently proceeding to electroless plating, the aperture 68 can be formed easily.

Meanwhile, since nickel is higher in electric resistance, gold may be plated by electroless plating on the nickel coating layer for forming the gold coating layer.

In a method for producing an optical fiber according to a forty-eighth embodiment of the present invention, the processing similar to that of the first to fourth etching steps of the twenty-third embodiment is performed for forming the optical fiber 225 having a conically sharpened tip 14 from the outer periphery of the cladding 13 towards the center of the core 12, as shown in FIG. 38E.

Next, by activation and electroless plating similar to those in the forty-seventh embodiment, described above, the light-shielding coating layer may be formed on the surface of the tip 143 and the aperture may be easily formed on the foremost part of the light-shielding coating layer.

INDUSTRIAL APPLICABILITY

As described above, the optical fiber of the present invention has a tip at one end of the optical fiber which is sharpened from the peripheral part of the cladding to the center of the core. The light-shielding coating layer is formed on the surface of the tip, while the aperture is exposed from the light-shielding coating layer. In such optical fiber, the light-shielding coating layer on the surface of the tip operates as a light-shielding portion for interrupting the light radiated to other than the aperture. This enables the light entrance and light exiting only via the aperture for reducing the effect of scattered light for improving the detection efficiency.

By employing such optical fiber as an optical probe for scattering and detecting the evanescent light in a photon scanning tunneling microscope designed for detecting the evanescent light, and by approaching the foremost part of the tip to the surface of the material for scattering the evansecent light on the surface of the material at the foremost part of the tip for conducting the scattered light to the core, the evanescent light can be detected with a high detection efficiency.

In addition, the optical fiber of the present invention has a reduced-diameter portion, formed by reducing the thickness of the cladding, at one end of the optical fiber, and a tip is formed by sharpening the core at the foremost part of the reduced-diameter portion. The foremost part of the tip is exposed and recessed relative to the light-shielding coating layer to form a pit within which is disposed a functional substance the optical properties of which are changed in response to the surrounding environment, such as a phosphorescent substance or a reagent. In such optical fiber, the optical properties of the functional substance in the pit are changed in response to surrounding environment. Such changes in the optical properties may be detected at the opposite end of the optical fiber for performing the detection with improved sparial resolution in measurement.

In such optical fiber, since the functional substance is affixed in the pit recessed from the foremost part of the light-shielding coating layer, the dye can be protected from directly impinging on the article being measured in case the foremost part of the optical fiber impinges on the article, thus improving durability of the optical fiber.

We claim:

1. A method for producing an optical fiber comprising:
  a sharpening step of etching an end of an optical fiber, made up of a core for propagating the light and a cladding covering said core for interrupting the light propagated within said core for forming a tip conically sharpened from the outer periphery of the cladding towards the center of the core;
  a coating step of coating said tip with a light-shielding material for forming a light-shielding coating layer; and
  an aperture forming step of exposing the foremost part of said tip from the light-shielding coating layer for forming an aperture.

2. The method for producing an optical fiber as claimed in claim 1 wherein said core is formed of quartz doped with germanium dioxide to a high concentration;
  said cladding is formed of quartz;
  said sharpening step comprising a first etching step, a second etching step, a third etching step and a fourth etching step;
  said first etching step being a step of etching one end of said optical fiber on an interface between an etching solution composed of hydrofluoric acid or an aqueous solution of hydrofluoric acid, hydrofluoric acid and water and a fluid lighter in specific gravity than said etching solution for forming a tapered portion which is a tapered portion of said cladding;
  said second etching step being a step of etching said tapered portion with hydrofluoric acid for forming a recess which is the portion of said core receded from the foremost part of said cladding;
  said third etching step being a step of etching said tapered portion with an etching solution composed of an aqueous solution of hydrofluoric acid, hydrofluoric acid and water for forming a flat portion which is the end of said core and an end of said cladding made flush with each other;
  said fourth etching step being a step of etching said tapered portion with an etching solution composed of an aqueous solution of ammonium fluoride, hydrofluoric acid and water for forming a tip conically sharpened from the outer periphery of said cladding to the center of said core.

3. The method for producing an optical fiber as claimed in claim 2 wherein, in said fourth etching step, etching is carried out using an etching solution composed of an aqueous solution of ammonium fluoride having a concentration of 40 wt %, hydrofluoric acid having a concentration of 50 wt % and water, with a volume ratio of the aquesous solution of ammonium fluoride hydrofluoric acid and water being X:1:Y, where X>1.7 and Y is arbitrary.

4. The method for producing an optical fiber as claimed in any one of claims 1 to 3 wherein the optical fiber is rotated about its center axis and wherein vapor of a light-shielding material is supplied from the lateral side of the tip or an obliquely lower position for forming a light-shielding coating layer on the foremost part of said tip.

5. The method for producing an optical fiber as claimed in any one of claims 1 to 3 wherein the light-shielding coating layer is etched in said aperture forming step for forming an aperture.

6. The method for producing an optical fiber as claimed in claim 5 wherein said light-shielding coating layer is a gold coating layer and wherein said gold coating layer is etched in said aperture forming step with a $KI-I_2$ aqueous solution for forming an aperture.

7. The method for producing an optical fiber as claimed in claim 5 wherein said light-shielding coating layer is an aluminum coating layer and wherein said aluminum coating layer is etched in said aperture forming step with a NaOH or KOH aqueous solution for forming an aperture.

8. The method for producing an optical fiber as claimed in claim 5 wherein the optical fiber is rotated about its center axis and wherein vapor of a light-shielding material is supplied from the lateral side of the tip or an obliquely lower position for forming a light-shielding coating layer on the foremost part of said tip.

9. The method for producing an optical fiber as claimed in claim 1 wherein said coating step includes a first coating step of coating the surface of said tip with a light-shielding material for forming a light-shielding coating layer and a second coating step of coating the surface of other than the foremost part of the light-shielding coating layer with a corrosion-resistant material for forming a corrosion-resistant coating layer, and wherein, in said aperture forming step, the light-shielding coating layer of said tip etched for forming an aperture by exposing the foremost part of said tip form the light-shielding coating layer.

10. The method for producing an optical fiber as claimed in claim 9 wherein, in said first coating step, said tip is coated with chromium and subsequently with aluminum for forming the light-shielding coating layer.

11. The method for forming an optical fiber as claimed in claims 9 or 10 wherein the optical fiber is rotated about its center axis and wherein the vapor of a light-shielding material is supplied from the lateral side of the tip or from an obliquely lower position for forming a light-shielding coating layer on other than the foremost part of said tip.

12. The method for producing an optical fiber as claimed in claim 11 wherein, in said second coating step, gold is coated on the surface of other than the foremost part of said tip for forming a corrosion-resistant coating layer and wherein, in said aperture forming step, said tip is etched with a $KI-I_2$ aqueous solution for forming an aperture.

13. The method for producing an optical fiber as claimed in claim 1 wherein said sharpening step includes a tapering step of etching one end of said optical fiber on an interface between an etching solution composed of hydrofluoric acid or an aqueous solution of ammonium fluoride, hydrofluoric acid and water and a fluid lighter in specific gravity than said etching solution for forming a tapered portion which is a tapered portion of said cladding; and a sharpening etching step of etching said tapered portion with an etching solution composed of an aqueous solution of hydrofluoric acid and water for forming a tip conically sharpened from the outer periphery of said cladding to the center of said core.

14. A method for producing an optical fiber comprising:
a first etching step of etching an end of an optical fiber having a core for propagating the light and a cladding covering said core for interrupting the light propagated within said core for reducing the thickness of the cladding for producing a reduced-diameter portion;
a second etching step of etching the distal end of said protrusion for sharpening said core for forming a protrusion;
a first coating step of forming a light-shielding coating layer on the surface of said protrusion;
a second coating step of forming a corrosion-resistant coating layer on the surface of a portion other than the foremost part of said light-shielding coating layer; and
an aperture forming step of etching the light-shielding coating layer exposed from said corrosion-resistant coating layer for forming an aperture.

15. The method for producing an optical fiber as claimed in claim 14 wherein, in said first coating step, gold is coated for forming said light-shielding coating layer; wherein, in said second coating step, said protrusion is dipped in a solvent in which synthetic resin has been dissolved and is subsequently withdrawn therefrom for forming said corrosion-resistant coating layer on the surface of other than the foremost part of said light-shielding coating layer; and wherein, in said aperture forming step, the gold of said light-shielding coating layer is etched for forming an aperture.

16. The method of producing an optical fiber as claimed in claims 14 or 15 wherein said protrusion is etched using an etching solution different in the ratio of the etching rate for the core and that for the cladding from the etching solution used in said second etching step for forming a detection end at the distal end of said protrusion which is larger in cone angle than said protrusion and for subsequently forming a light-shielding coating layer by said first coating step.

17. The method for producing an optical fiber as claimed in claims 14 or 15 wherein the protrusion formed by said second etching step is etched using an etching solution having an etching rate for the core substantially equal to that for the cladding for reducing the cone angle and the length of said protrusion.

18. A method for producing an optical fiber comprising:
a sharpening step of etching an end of an optical fiber having a core for propagating the light and a cladding covering said core for interrupting the light propagated within said core for sharpening the foremost part of said core for producing a protrusion;
a coating step of forming a light-shielding coating layer on the surface of said protrusion;
a photosensitive layer forming step of forming a photosensitive layer of the surface of said light-shielding coating layer;
a light-exposure step of selectively exposing only the foremost part of said photosensitive layer by evanescent light; and exposed portion forming step of removing the photosensitive layer exposed to light for exposing the foremost part of said light-shielding coating layer from said photosensitive layer for forming a portion exposed to light; and an aperture forming step of etching the light-shielding coating layer exposed from the exposed portion for exposing the distal end of said protrusion from the light-shielding coating layer.

19. The method for producing an optical fiber as claimed in claim 18 wherein, in said photosensitive layer forming step, a drop of a liquid photosensitive material forming the photosensitive layer is caused to depend for being contacted with said protrusion from below and said protrusion is spaced apart therefrom for forming the photosensitive layer on the distal end of said protrusion.

20. A method for producing an optical fiber comprising:
a sharpening step of etching an end of an optical fiber having a core for propagating the light and a cladding covering said core for interrupting the light propagated within said core for sharpening the foremost part of said core for producing a protrusion;
a coating step of forming a light-shielding coating layer on the surface of said protrusion;
a photosensitive layer forming step of forming a photosensitive layer on the surface of said light-shielding coating layer;
a light-exposure step of selectively exposing only the foremost part of said photosensitive layer by evanescent light; and exposed portion forming step of removing the photosensitive layer exposed to light for exposing the foremost part of said light-shielding coating layer from said photosensitive layer for forming a portion exposed to light;
an aperture forming step of etching the light-shielding coating layer exposed from the exposed portion for exposing the distal end of said protrusion from the light-shielding coating layer; and a pit forming step of etching the foremost part of said tip exposed from said aperture for forming a pit which is the foremost part of said tip recessed from the light-shielding coating layer.

21. The method for producing an optical fiber as claimed in claim 20 further comprising a charging step of charging a functional substance the optical properties of which are changed in response to the surrounding environment in said pit formed in said pit forming step.

22. The method for producing an optical fiber as claimed in claim 20 wherein, in said charging step, said functional substance is mixed into a solvent formed by dissolving an amorphous material to saturation and wherein said pit is dipped in said solvent for precipitating the amorphous material having the functional coating layer diffused therein on said pit.

23. A method for producing an optical fiber comprising:

a sharpening step of stretching an end of an optical fiber under heating, said optical fiber having a core for propagating the light and a cladding for interrupting the light propagated within the core, for sharpening both the core and the cladding for forming a tip; and an etching step of etching said tip for sharpening the core protruded from said cladding for forming the protrusion.

24. The method for producing an optical fiber as claimed in claim 23 comprising a coating step of forming a light-shielding coating layer on the surface of said protrusion; and an aperture forming step of etching the light-shielding coating layer for exposing the distal end of said protrusion from the light-shielding coating layer for forming an aperture.

25. A method for producing an optical fiber comprising:

a first etching step of etching an end of a multi mode optical fiber having a core for propagating the light and a cladding covering said core for interrupting the light propagated within said core for sharpening the foremost part of said core for producing a protrusion;

a coating step of forming a light-shielding coating layer on the surface of said protrusion; and an aperture forming step of exposing the distal end of said protrusion for forming an aperture at the foremost part of said light-shielding coating layer.

26. A method for producing an optical fiber comprising:

a core diameter increasing step of forming a core diameter increasing portion having the gradually increased core diameter at an end of an optical fiber having a core for propagating the light and a cladding covering said core for interrupting the light propagated within said core;

a sharpening step of etching an end of the optical fiber provided with the core diameter increased portion for sharpening the foremost part of said core diameter increased portion for forming a protrusion;

a coating step of forming a light-shielding coating layer on the surface of said protrusion; and an aperture forming step of exposing the distal end of said protrusion at the foremost part of said light-shielding coating layer for forming an aperture.

27. The method for producing an optical fiber as claimed in claim 26 wherein said core diameter increased portion is formed by heating an end of said optical fiber in said core diameter increasing step for diffusing a dopant in said core into said cladding.

28. A method for producing an optical fiber comprising:

a sharpening step of etching an end of an optical fiber having a core for propagating the light and a cladding covering said core for interrupting the light propagated within said core for sharpening the foremost part of said core for producing a protrusion;

a coating step of forming a hydrophilic coating layer on the surface of said protrusion other than the distal end thereof; and an amorphous layer forming step of forming an amorphous layer doped with a dye on the surface of the distal end of said protrusion exposed from said coating layer.

29. The method for producing an optical fiber as claimed in 28 wherein, in said coating step, the light-shielding coating layer is first formed on the surface of said protrusion and the hydrophobic coating layer is subsequently formed.

30. A method for producing an optical fiber comprising:

etching one end of an optical fiber having a first core for propagating the light, a second core covering said first core and a cladding covering said second core for exposing the second core at an end of the optical fiber from the cladding for forming an exposed portion;

forming a tapered portion of said second core at the distal end of said exposed portion; and sharpening the first core protruded from the foremost part of said tapered portion for forming a protrusion.

31. A method for producing an optical fiber comprising:

etching one end of an optical fiber having a core for propagating the light, a first cladding covering said core and a second cladding covering said first cladding for exposing the first cladding at an end of the optical fiber from the second cladding for forming an exposed portion;

forming a tapered portion of said first cladding at the distal end of said exposed portion; and sharpening the core protruded from the foremost part of said tapered portion for forming a protrusion.

32. The method for producing an optical fiber as claimed in claim 31 wherein said core is formed of quartz doped with germanium dioxide to a high concentration; said first cladding is formed of quartz; said second cladding is formed of quartz doped with fluorine or boron; and wherein the optical fiber is etched using an etching solution composed of an aqueous solution of ammonium fluoride, hydrofluoric acid and water, with a volume ratio of 1.7:1:Y, where Y is arbitrary, for exposing the first cladding from the second cladding for forming an exposed portion and for sharpening the first cladding, forming a flat portion which the end of the sharpened first cladding and an end of the core are flush with each other, the optical fiber provided with the flat portion being then etched using an etching solution having a volume ratio of the aqueous solution of ammonium fluoride, hydrofluoric acid and water being X:1:Y, where X>1.7, for forming said tapered portion and said flat portion.

33. The method for producing an optical fiber as claimed in claims 30, 31 or 32 comprising a coating step of forming a light-shielding coating layer on the surface of said protrusion and an aperture forming step of exposing the distal end of the protrusion at the foremost part of said light-shielding coating layer for forming an aperture.

34. A method for producing an optical fiber comprising:

a sharpening step of etching an end of an optical fiber, made up of a core for propagating the light and a cladding covering said core for interrupting the light propagated within said core, for sharpening the foremost part of said core for forming a protrusion;

a coating layer forming step of forming a coating layer composed of a gel layer on the surface of said protrusion; and an aperture forming step of exposing the distal end of said protrusion form the coating layer for forming an aperture.

35. The method for producing an optical fiber as claimed in claim 34 wherein the gel layer formed in said coating layer forming step is heated form forming an amorphous layer for forming a coating layer.

36. A method for producing an optical fiber comprising:
   a sharpening step of etching an end of an optical fiber, made up of a core for propagating the light and a cladding covering said core for interrupting the light propagated within said core, for sharpening the foremost part of the core for forming a protrusion;
   an amorphous layer forming step of forming an amorphous coating layer on the surface of said protrusion;
   a coating step of forming a light-shielding coating layer on the surface of said amorphous coating layer; and
   an aperture forming step of exposing the distal end of said protrusion from the amorphous coating layer and the light-shielding coating layer for forming an aperture.

37. The method for producing an optical fiber as claimed in claim 36 wherein, in said amorphous layer forming step, the protrusion is dipped in a solvent in which the amorphous is dissolved to saturation for depositing the amorphous on the surface of said protrusion for forming the coating layer.

38. A method for producing an optical fiber comprising:
   a sharpening step of etching an end of an optical fiber, made up of a core for propagating the light and a cladding covering said core for interrupting the light propagated within said core, for sharpening the foremost part of the core for forming a protrusion;
   an activation step of activating the surface of the tip; and
   a coating step of forming a light-shielding coating layer on the surface of the tip by electroless plating and exposing the foremost part of said tip from the light-shielding coating layer for forming an aperture.

\* \* \* \* \*